US012635594B2

(12) United States Patent   (10) Patent No.:   US 12,635,594 B2
Kikuchi et al.   (45) Date of Patent:   May 26, 2026

(54) AGRICULTURAL WORK ASSISTANCE SYSTEM, AGRICULTURAL MACHINE, AND AGRICULTURAL WORK ASSISTANCE DEVICE

(71) Applicant: Kubota Corporation, Osaka (JP)

(72) Inventors: Ryota Kikuchi, Sakai (JP); Fumiya Yoshimura, Sakai (JP); Shogo Hayashida, Sakai (JP); Ryo Kuboshima, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 96 days.

(21) Appl. No.: 18/743,187

(22) Filed: Jun. 14, 2024

(65) Prior Publication Data

US 2024/0324488 A1      Oct. 3, 2024

Related U.S. Application Data

(63) Continuation of application No. PCT/JP2022/040137, filed on Oct. 27, 2022.

(30) Foreign Application Priority Data

Dec. 28, 2021   (JP) ................................. 2021-214364

(51) Int. Cl.
    *G05D 1/646*      (2024.01)
    *A01B 69/04*      (2006.01)
        (Continued)
(52) U.S. Cl.
    CPC .......... *A01B 79/005* (2013.01); *A01B 69/008* (2013.01); *G05D 1/6484* (2024.01); *G05D 2105/15* (2024.01); *G05D 2107/21* (2024.01)

(58) Field of Classification Search
    CPC ............. G05D 1/6484; G05D 2105/15; G05D 2107/21; G05D 1/646; G05D 1/246; A01B 79/005; A01B 69/00; A01B 69/008
    See application file for complete search history.

(56) References Cited

U.S. PATENT DOCUMENTS

| | | | |
|---|---|---|---|
| 7,747,370 B2 | 6/2010 | Dix | |
| 2007/0016328 A1* | 1/2007 | Ziegler | ................. B60R 19/483 |
| | | | 318/609 |

(Continued)

FOREIGN PATENT DOCUMENTS

| | | | | |
|---|---|---|---|---|
| EP | 3351903 A1 * | 7/2018 | ......... | G01C 21/3407 |
| JP | 2018-000039 A | 1/2018 | | |

(Continued)

OTHER PUBLICATIONS

English translation of Written Opinion of the International Searching Authority for PCT/JP2022/040137. Date of mailing recorded Dec. 6, 2022. Retrieved from https://patentscope.wipo.int/search/en/detail.jsf?docId=WO2023127267 (Year: 2022).*

(Continued)

*Primary Examiner* — Calvin Cheung
(74) *Attorney, Agent, or Firm* — Keating & Bennett, LLP

(57)      ABSTRACT

An agricultural work assistance system includes an input to input agricultural field information about a contour of an agricultural field, dimension information of an agricultural machine or a working device coupled to the agricultural machine, and a work condition about agricultural work on the agricultural field by the agricultural machine and the working device, a route creator to create a traveling route along which the agricultural machine travels within a map of the agricultural field based on the agricultural field information, the dimension information, and the work condition and to secure a turning space where the agricultural machine turns, a turning margin calculator to calculate a turning (Continued)

margin, i.e., a size of the turning space, and determine that the turning margin is insufficient when the turning margin is less than a threshold, and a notifier to provide notification of a place where the insufficient turning margin determined by the turning margin calculator exists.

9 Claims, 36 Drawing Sheets

(51) Int. Cl.

| | | |
|---|---|---|
| *A01B 79/00* | (2006.01) |
| *G05D 1/648* | (2024.01) |
| *G05D 105/15* | (2024.01) |
| *G05D 107/20* | (2024.01) |

(56) References Cited

U.S. PATENT DOCUMENTS

| | | | | |
|---|---|---|---|---|
| 2008/0269956 | A1* | 10/2008 | Dix | G05D 1/0278 |
| | | | | 701/1 |
| 2017/0168501 | A1* | 6/2017 | Ogura | G05D 1/0016 |
| 2018/0206390 | A1 | 7/2018 | Sakaguchi et al. | |
| 2019/0016184 | A1* | 1/2019 | Billich | B60D 1/06 |
| 2019/0101931 | A1 | 4/2019 | Ogura et al. | |
| 2020/0296878 | A1* | 9/2020 | Dix | A01B 69/008 |
| 2020/0348690 | A1 | 11/2020 | Ogura et al. | |
| 2021/0271255 | A1* | 9/2021 | Dix | B60W 30/045 |
| 2021/0389771 | A1 | 12/2021 | Nishii | |
| 2023/0225237 | A1 | 7/2023 | Morimoto et al. | |

FOREIGN PATENT DOCUMENTS

| | | |
|---|---|---|
| JP | 2018-116615 | 7/2018 |
| WO | 2015/119263 A1 | 8/2015 |
| WO | 2020/039786 A1 | 2/2020 |
| WO | 2022/059734 A1 | 3/2022 |

OTHER PUBLICATIONS

Official Communication issued in International Patent Application No. PCT/JP2022/040137, mailed on Dec. 6, 2022.

Official Communication issued in corresponding Chinese Patent Application No. 202280073374.9, mailed on Dec. 5, 2025, 12 pages.

Official Communication issued in corresponding European Patent Application No. 22915500.7, mailed on Nov. 19, 2025, 11 pages.

* cited by examiner

Home

52

D1

Agricultural field  B1

Automatic driving  B2

History  B3

Setting  B0

Figure 10B:
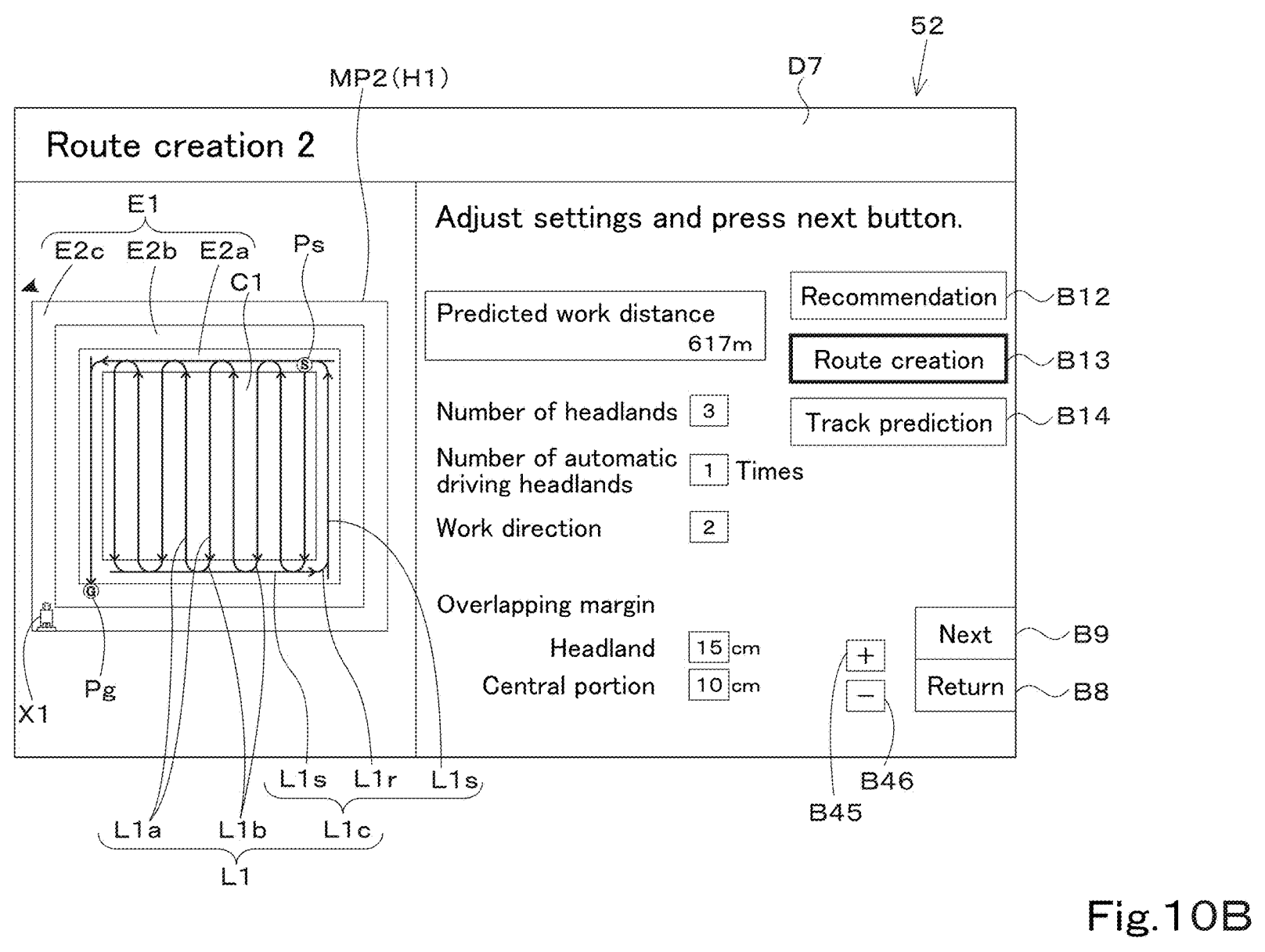

Route creation 2

Adjust settings and press next button.

Recommendation — B12

Route creation — B13

Track prediction — B14

Predicted work distance

617m

Number of headlands    3

Number of automatic
driving headlands    1

Work direction    2

Overlapping margin

Headland    15 cm

Central portion    10 cm

Next — B9

Return — B8

Times

+

−

B46

B45

<Turning margin determination processing>

AGRICULTURAL WORK ASSISTANCE SYSTEM, AGRICULTURAL MACHINE, AND AGRICULTURAL WORK ASSISTANCE DEVICE

CROSS REFERENCE TO RELATED APPLICATIONS

This application is a continuation application of International Application No. PCT/JP2022/040137, filed on Oct. 27, 2022, which claims the benefit of priority to Japanese Patent Application No. 2021-214364, filed on Dec. 28, 2021. The entire contents of each of these applications are hereby incorporated herein by reference.

BACKGROUND OF THE INVENTION

1. Field of the Invention

The present invention relates to agricultural work assistance systems and devices that each assist an agricultural machine in performing agricultural work while traveling in an agricultural field, and agricultural machines including such agricultural work assistance systems and devices.

2. Description of the Related Art

Japanese Unexamined Patent Application Publication No. 2018-39 discloses a technique of assisting an agricultural machine in performing agricultural work by a working device coupled to the agricultural machine while automatically traveling in an agricultural field. A controller included in the agricultural machine disclosed in Japanese Unexamined Patent Application Publication No. 2018-39 sets a ridge edge line, a headland line, and a work start/end line on the basis of outer peripheral position data of an agricultural field and a lateral width of the agricultural machine. Then, the controller sets a plurality of work traveling lines in parallel at predetermined intervals in a central portion of the agricultural field surrounded by the work start/end line and the headland line. Furthermore, the controller sets a turning line from a work end position of one work traveling line to a work start position of an adjacent work traveling line. The agricultural machine performs agricultural work on the central portion of the agricultural field by a working device while automatically traveling on the basis of the work traveling line and turns on the basis of the turning line. Furthermore, the agricultural machine performs agricultural work on a headland around the central portion by the working device while traveling on the basis of the ridge edge line, the work start/end line, and the headland line.

SUMMARY OF THE INVENTION

When a controller or the like creates a route (line) along which an agricultural machine travels, a turning space in which the agricultural machine turns needs to be set within an agricultural field, for example, in consideration of a case where a cliff or a wall is present by an outer periphery of the agricultural field. However, in a case where the turning space is set within the agricultural field, it is sometimes impossible to secure a turning space that is large enough for the agricultural machine and the working device to normally turn depending on a combination of a contour of the agricultural field, a dimension of the agricultural machine, setting conditions of the lines, and the like. In this case, a user has no clue as to how to handle this. This is inconvenient.

Example embodiments of the present invention improve convenience in creation of a traveling route of an agricultural machine.

Example embodiments of the present invention may include the following features.

An agricultural work assistance system according to an example embodiment of the present invention includes an input to input agricultural field information indicative of a contour of an agricultural field, dimension information of an agricultural machine or a working device coupled to the agricultural machine, and a work condition for performing agricultural work on the agricultural field by the agricultural machine and the working device, a controller configured or programmed to include a route creator to create a traveling route along which the agricultural machine travels within a map indicative of the agricultural field on the basis of the agricultural field information, the dimension information, and the work condition and secure a turning space where the agricultural machine turns, a turning margin calculator to calculate a turning margin, which is a size of the turning space, and determine that the turning margin is insufficient in a case where the turning margin is less than a predetermined threshold value, and a notifier to provide a notification concerning a portion where the turning margin determined as being insufficient by the turning margin calculator is present.

The turning margin calculator may be configured or programmed to make the traveling route ineffective in a case where the turning margin is less than the threshold value, and the notifier may be configured or programmed to provide a notification that the traveling route has not been created due to insufficiency of a width of the portion where the turning margin determined as being insufficient by the turning margin calculator is present.

The controller may be configured or programmed to further include an area setter to set a first area within the map and a second area located within the first area on the basis of the dimension information and the work condition, in which the route creator may be configured or programmed to create, as the traveling route, a work route along which work is performed by the working device while the agricultural machine is traveling in at least one of the first area and the second area and secure the turning space and create a turning route along which the agricultural machine turns in the first area, and the notifier may be configured or programmed to provide a notification that a width of the first area is insufficient in a case where it is determined by the turning margin calculator that the turning margin is insufficient.

The agricultural work assistance system may further include a display to display the map and the traveling route, in which in a case where there is a turning margin determined as being insufficient by the turning margin calculator, the notifier is configured or programmed to cause the portion where the turning margin determined as being sufficient is present to be displayed without displaying the traveling route on the map displayed on the display, and the display is operable to display the map and the traveling route in a case where there is no turning margin determined as being insufficient by the turning margin calculator.

The agricultural work assistance system may further include an output to output the traveling route, a position detector to detect a position of the agricultural machine, and an automatic controller configured or programmed to drive the working device to perform the agricultural work on the agricultural field while automatically performing traveling or steering of the agricultural machine on the basis of the position of the agricultural machine detected by the position detector and the traveling route output from the output, in which the output is operable to output the traveling route to the automatic controller in a case where there is no turning margin determined as being insufficient by the turning margin calculator.

In a case where there are a plurality of turning margins determined as being insufficient by the turning margin calculator, the notifier may be configured or programmed to cause a portion where a turning margin whose difference from the threshold value is largest among the plurality of turning margins is present to be displayed together with the map on the display and cause the largest difference to be displayed as an insufficient amount on the display.

To turn the agricultural machine from a first route included in the traveling route toward a second route whose traveling direction is different from the first route, the turning margin calculator may be configured or programmed to calculate, as the turning margin, a width of the turning space that expands from a terminal end of the first route to an end of the map that is present in a traveling direction of the first route or a width of the turning space that expands from a start end of the second route to an end of the map that is present in an opposite direction to the traveling direction of the second route.

The agricultural work assistance system may be configured such that in a case where the agricultural machine is a manned agricultural machine that is operable by a driver on the agricultural machine, the turning margin calculator may be configured or programmed to calculate, as the threshold value, a value obtained by adding an entire length of an agricultural work apparatus including the agricultural machine and the working device coupled to the agricultural machine and a predetermined safety margin.

In a case where the agricultural machine is an unmanned agricultural machine that is capable of automatically operating without person's operation, the turning margin calculator may be configured or programmed to calculate, as the threshold value, a value obtained by adding an entire length of an agricultural work apparatus including the agricultural machine and the working device coupled to the agricultural machine, a detection distance in a traveling direction of the agricultural work apparatus from a front end of the agricultural machine to a position in which an object is capable of being detected by an object detector provided in the agricultural machine, and a predetermined safety margin.

In a case where the turning margin calculator determines that the turning margin is insufficient, the notifier may be configured or programmed to provide a notification prompting change of the work condition.

An agricultural machine according to an example embodiment of the present invention is an agricultural machine to perform agricultural work while being assisted by the agricultural work assistance system and includes a traveling body that is capable of traveling, a coupler that is capable of coupling a working device to the traveling body, an input to input agricultural field information indicative of a contour of an agricultural field, dimension information of the agricultural machine or the working device coupled to the traveling body, and a work condition for performing agricultural work on the agricultural field by the working device while the traveling body is traveling, a controller configured or programmed to include a route creator to create a traveling route along which the traveling body travels within a map indicative of the agricultural field on the basis of the agricultural field information, the dimension information, and the work condition and secure a turning space where the traveling body turns, a turning margin calculator to calculate a turning margin, which is a size of the turning space, and determine that the turning margin is insufficient in a case where the turning margin is less than a predetermined threshold value, and a notifier to provide a notification concerning a portion where the turning margin determined as being insufficient by the turning margin calculator is present.

The agricultural machine may further include a position detector to detect a position of the traveling body, an automatic controller configured or programmed to drive the working device to perform the agricultural work on the agricultural field while automatically performing traveling or steering of the traveling body on a basis of the position of the traveling body detected by the position detector and the traveling route, and a display to display the map and the traveling route, in which the notifier may be configured or programmed to cause a portion where the turning margin determined as being insufficient by the turning margin calculator is present to be displayed on the map displayed on the display.

An agricultural work assistance device according to an example embodiment of the present invention is an agricultural work assistance device included in the agricultural work assistance system and includes an input to input agricultural field information indicative of a contour of an agricultural field, dimension information of an agricultural machine or a working device coupled to the agricultural machine, and a work condition for performing agricultural work on the agricultural field by the agricultural machine and the working device, a controller configured or programmed to include a route creator to create a traveling route along which the agricultural machine travels within a map indicative of the agricultural field on the basis of the agricultural field information, the dimension information, and the work condition and secure a turning space where the agricultural machine turns, a turning margin calculator to calculate a turning margin, which is a size of the turning space, and determine that the turning margin is insufficient in a case where the turning margin is less than a predetermined threshold value, and a notifier to provide a notification concerning a portion where the turning margin determined as being insufficient by the turning margin calculator is present.

The agricultural work assistance device may further include a display to display the map and the traveling route, and an output to output the traveling route to the agricultural machine, in which the notifier may be configured or programmed to cause a portion where the turning margin determined as being insufficient by the turning margin calculator is present to be displayed on the map displayed on the display, and the output is operable to output the traveling route to the automatic controller in a case where there is no turning margin determined as being insufficient by the turning margin calculator.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 10B illustrates an example of the route creation 2 screen.

DETAILED DESCRIPTION OF THE EXAMPLE EMBODIMENTS

Figure 1:
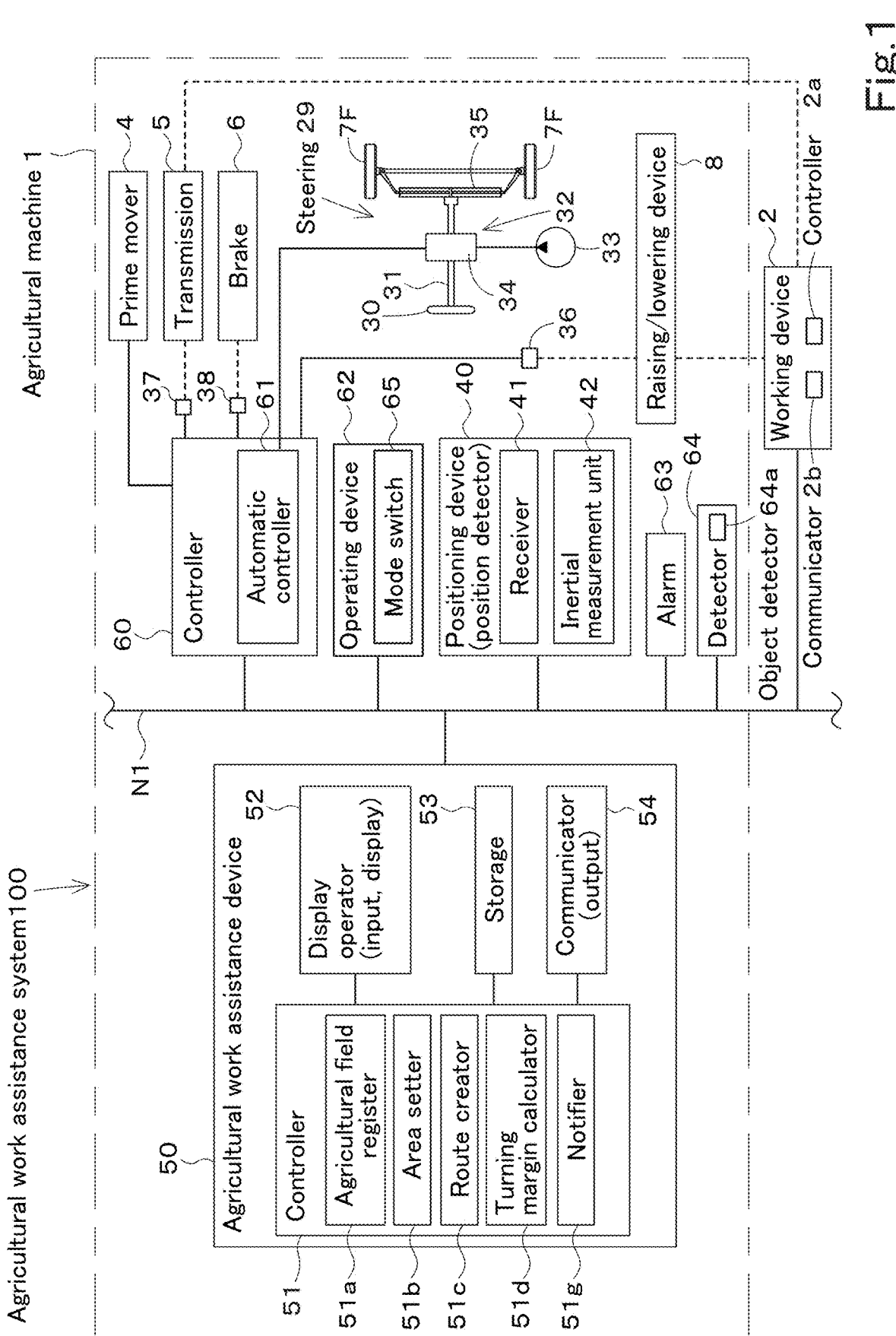
FIG. 1 is a configuration diagram of an agricultural work assistance system.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 18:
FIG. 18 is a side view of the agricultural machine.

First, an agricultural machine 1 of the present example embodiment is described. FIG. 18 is a side view of the agricultural machine 1. The agricultural machine 1 is a tractor. Note that the agricultural machine 1 is not limited to a tractor and may be another agricultural machine such as a rice planter or a combine or may be a working vehicle other than a tractor that performs agricultural work.

The agricultural machine 1 includes a traveling body 3, a prime mover 4, a transmission 5, and a traveling device 7. The traveling device 7 includes a front wheel 7F and a rear wheel 7R. The front wheel 7F may be a tire type or may be a crawler type. Similarly, the rear wheel 7R may be a tire type or may be a crawler type. The prime mover 4 is a diesel engine, an electric motor, or the like. In the present example embodiment, the prime mover 4 is a diesel engine. The transmission 5 can switch propulsion force of the traveling device 7 by changing speed stages and can switch forward traveling and rearward traveling of the traveling device 7. Driving force of the prime mover 4 is transmitted to the traveling device 7 by the transmission 5 and drives the traveling device 7, and thereby the traveling body 3 travels forward or rearward. Note that the leftward direction of FIG. 18 is a forward direction for the traveling body 3, and the rightward direction of FIG. 18 is a rearward direction for the traveling body 3.

The traveling body 3 is provided with a cabin 9. An operator's seat 10 is provided in the cabin 9. A raising/lowering device 8 that is a three-point linkage or the like is provided on a rear portion of the traveling body 3. The raising/lowering device 8 is provided with couplers 8g and 8h that can couple a working device 2 for performing agricultural work. By coupling the working device 2 to the couplers 8g and 8h, the working device 2 and the traveling body 3 (the agricultural machine 1) are coupled, and thereby the working device 2 can be towed by the traveling body 3.

The working device 2 performs ground work on an agricultural field. Examples of the working device 2 include a cultivator (rotary cultivator) that performs cultivating work on the agricultural field, a stubble cultivator that performs stubble cultivation, a puddling device (drive harrow) that performs puddling, a spreader that spreads a fertilizer, an agricultural chemical, or the like, a seeding device that sows seeds, a transplanter that transplants seedlings, and a harvester for harvesting.

Next, an agricultural work assistance system 100 according to the present example embodiment is described. FIG. 1 is a configuration diagram of the agricultural work assistance system 100. The agricultural work assistance system 100 includes an agricultural work assistance device 50. The agricultural work assistance system 100 and the agricultural work assistance device 50 assist the agricultural machine 1 in performing agricultural work by the working device 2 while traveling in an agricultural field.

The agricultural machine 1 includes a controller 60, an operating device 62, the prime mover 4, the transmission 5, a brake 6, a steering 29, the raising/lowering device 8, a positioning device 40, an alarm 63, and a detector 64. An in-vehicle network N1 such as a LAN or a CAN is constructed in the agricultural machine 1. The controller 60, the operating device 62, the positioning device 40, the alarm 63, and the detector 64 are connected to the in-vehicle network N1. Each of these units of the agricultural machine 1 is included in the agricultural work assistance system 100.

The controller 60 includes an electric circuit including a CPU (or a microcomputer) and a memory. The memory of the controller 60 includes a volatile memory and a nonvolatile memory. The controller 60 is configured or programmed to control operation of each unit of the agricultural machine 1. The controller 60 includes an automatic controller 61 configured or programmed to control traveling of the agricultural machine 1 and operation of the working device 2. The operating device 62 includes a switch, a lever, a pedal, and other keys that can be operated by a user such as a driver sitting on the operator's seat 10 or a worker present close to the agricultural machine 1. The operating device 62 includes a mode switch 65. The mode switch 65 is operated to switch a mode of the agricultural machine 1.

Driving, stoppage, and a rotational speed of the prime mover 4 (engine) are controlled by the controller 60. The transmission 5 is connected to a control valve 37. The control valve 37 is a solenoid valve that operates on the basis of a control signal transmitted from the controller 60. A hydraulic fluid delivered from a hydraulic pump 33 is supplied to the control valve 37. Although the control valve 37 is illustrated as a single block in FIG. 1, an appropriate number of control valves 37 are provided corresponding to the number of hydraulic devices such as a hydraulic clutch or a hydraulic cylinder provided in the transmission 5.

The automatic controller 61 is configured or programmed to control driving of the transmission 5 by electrically controlling a switching position and an opening of the control valve 37. The transmission 5 transmits driving force of the prime mover 4 to the traveling device 7, and thereby the traveling device 7 operates. As a result, the traveling body 3 travels forward or rearward. For example, in a case where the working device 2 is a ground working device, the transmission 5 transmits the driving force of the prime mover 4 to the working device 2. This increases an operating force of the working device 2.

The automatic controller 61 communicates with the working device 2 over the in-vehicle network N1. Specifically, the working device 2 includes a controller 2a and a communicator 2b. The automatic controller 61 transmits a work command to the working device 2 over the in-vehicle network N1. Upon receipt of the work command by the communicator 2b, the controller 2a of the working device 2 controls operation of each unit of the working device 2 on the basis of the work command to perform agricultural work (ground work). Furthermore, the controller 2a causes the communicator 2b to transmit information or data indicative of a work state or the like to the controller 60 over the in-vehicle network N1. The automatic controller 61 detects the work state or the like of the working device 2 on the basis of the information or data received from the working device 2 over the in-vehicle network N1.

The brake 6 is connected to a control valve 38. The control valve 38 is a solenoid valve that operates on the basis of a control signal transmitted from the controller 60. To the control valve 38, a hydraulic fluid delivered from the hydraulic pump 33 is supplied. The automatic controller 61 causes the brake 6 to operate by electrically controlling a switching position and an opening of the control valve 38 and thereby brakes the traveling body 3.

The steering 29 includes a steering wheel 30, a steering shaft (rotary shaft) 31, and an assist mechanism (power steering mechanism) 32. The steering wheel 30 is provided in the cabin 9. The steering shaft 31 rotates in accordance with rotation of the steering wheel 30. The assist mechanism 32 assists steering using the steering wheel 30.

The assist mechanism 32 includes a control valve 34 and a steering cylinder 35. The control valve 34 is a solenoid valve that operates on the basis of a control signal transmitted from the controller 60. Specifically, the control valve 34 is a three-position switching valve that can be switched by movement of a spool or the like. To the control valve 34, a hydraulic fluid delivered from the hydraulic pump 33 is supplied. The controller 60 adjusts a hydraulic pressure supplied to the steering cylinder 35 by electrically controlling a switching position and an opening of the control valve 34 and thereby extends and contracts the steering cylinder 35. The steering cylinder 35 is connected to knuckle arms (not illustrated) that change a direction of the front wheel 7F.

The control valve 34 can also be switched by steering of the steering shaft 31. Specifically, by operating the steering wheel 30, the steering shaft 31 rotates in accordance with a state of the operation, and thus the switching position and the opening of the control valve 34 are switched. The steering cylinder 35 extends or contracts leftward or rightward of the traveling body 3 in accordance with the switching position and the opening of the control valve 34. By this extending or contracting action of the steering cylinder 35, a steering direction of the front wheel 7F is changed. Note that the steering 29 described above is an example and is not limited to the above configuration.

The traveling body 3 of the agricultural machine 1 can be steered manually by manual operation of the steering wheel 30 and can be steered automatically by the automatic controller 61. The transmission 5 or the brake 6 is driven in accordance with manual operation of an accelerator or a brake (both of which are not illustrated) included in the operating device 62, and thereby the traveling body 3 can travel and stop. Furthermore, the traveling body 3 can automatically travel and stop in accordance with control of the transmission 5 and the brake 6 by the automatic controller 61.

Figure 2:
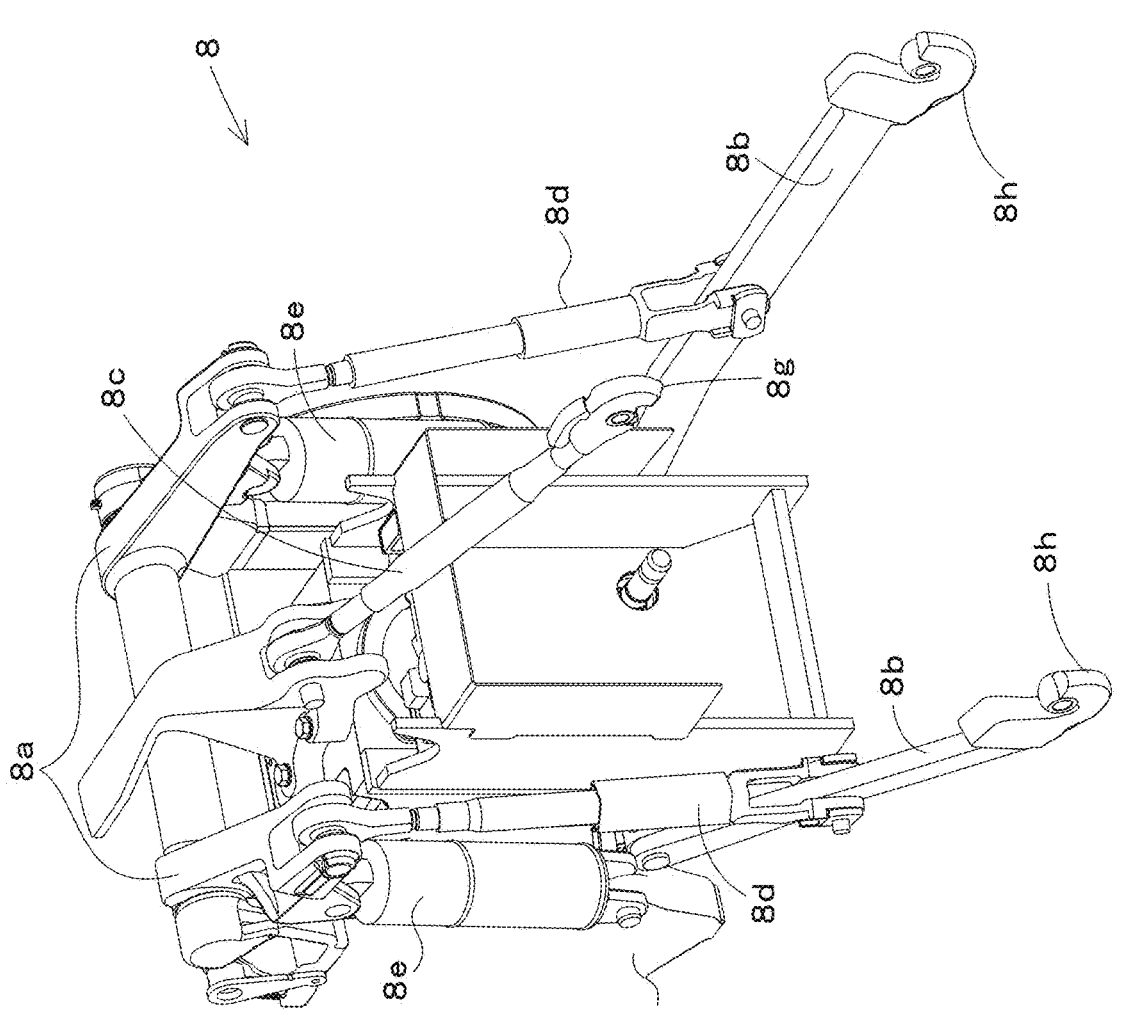
FIG. 2 is a perspective view of a raising/lowering device.

FIG. 2 is a perspective view of the raising/lowering device 8. The raising/lowering device 8 includes a lift arm 8a, a lower link 8b, a top link 8c, a lift rod 8d, and a lift cylinder 8e. A front end portion of the lift arm 8a is supported on an upper rear portion of a case (transmission case) in which the transmission 5 is located so as to be swingable up or down. The lift arm 8a is swung (raised and lowered) by driving of the lift cylinder 8e. The lift cylinder 8e is a hydraulic cylinder. The lift cylinder 8e is connected to a control valve 36 (FIG. 1). The control valve 36 is a solenoid valve that operates on the basis of a control signal transmitted from the controller 60. To the control valve 36, a hydraulic fluid delivered from the hydraulic pump 33 is supplied.

A front end portion of the lower link 8b illustrated in FIG. 2 is supported on a lower rear portion of the transmission 5 (FIGS. 1 and 18) so as to be swingable up or down. A front end portion of the top link 8c is supported on a rear portion of the transmission 5 above the lower link 8b so as to be swingable up or down. The lift rod 8d couples the lift arm 8*a* and the lower link 8*b*. The couplers 8*g* and 8*h* that can couple the working device 2 are provided at rear end portions of the lower link 8*b* and the top link 8*c*.

The automatic controller 61 illustrated in FIG. 1 adjusts a hydraulic pressure supplied to the lift cylinder 8*e* illustrated in FIG. 2 by electrically controlling a switching position and an opening of the control valve 36 and thereby extends or contracts the lift cylinder 8*e*. When the lift cylinder 8*e* extends or contracts, the lift arm 8*a* rises or lowers, and the lower link 8*b* coupled to the lift arm 8*a* with the lift rod 8*d* interposed therebetween rises or lowers. As a result, the working device 2 swings up or down (rises or lowers) about a front portion (opposite to the couplers 8*g* and 8*h*) of the lower link 8*b*.

The positioning device 40 illustrated in FIG. 1 includes a receiver 41 and an inertial measurement unit (IMU) 42. The receiver 41 receives a satellite signal (a position of a positioning satellite, a transmission time, correction information, and the like) transmitted from a satellite positioning system (positioning satellite) such as D-GPS, GPS, GLONASS, BeiDou, Galileo, or Michibiki. The positioning device 40 detects a current position (e.g., latitude and longitude) on the basis of the satellite signal received by the receiver 41. That is, the positioning device 40 is a position detector that detects a position of the traveling body 3 of the agricultural machine 1. The inertial measurement unit 42 includes an acceleration sensor, a gyroscope sensor, and the like. The inertial measurement unit 42 detects a roll angle, a pitch angle, a yaw angle, and the like of the traveling body 3.

The alarm 63 includes a buzzer, a speaker, a warning light, or the like provided in the traveling body 3. The alarm 63 issues an alarm to surroundings of the traveling body 3 by sound or light. The detector 64 includes a sensor and the like (which may include a camera) installed at portions of the agricultural machine 1 and the working device 2. The detector 64 detects operating states (driving and stoppage states, an operation position, and the like) of the units such as the transmission 5, the brake 6, the traveling device 7, the raising/lowering device 8, the steering 29, and the operating device 62 of the agricultural machine 1 on the basis of an output signal from the sensor or the like. Furthermore, the detector 64 detects an operating state of the working device 2 on the basis of an output signal from the sensor or the like. Furthermore, the detector 64 includes an object detector 64*a*, a laser sensor such as LiDAR, an ultrasonic sensor, and the like. The laser sensor, the ultrasonic sensor, and the like are installed on a front portion, a rear portion, and left and right side portions of the traveling body 3. The object detector 64*a* detects presence or absence of a target around the agricultural machine 1, a distance to the target, and the like on the basis of an output signal from the laser sensor or the ultrasonic sensor.

The agricultural work assistance device 50 is, for example, a mobile tablet terminal device. The agricultural work assistance device 50 is, for example, mounted inside the cabin 9 of the agricultural machine 1 and is attachable and detachable to and from the agricultural machine 1. That is, the agricultural machine 1 includes the agricultural work assistance device 50.

The agricultural work assistance device 50 includes a controller 51, a display operator 52, a storage 53, and a communicator 54. The controller 51 includes a CPU (or a microcomputer), a volatile memory, and a nonvolatile memory. The controller 51 is configured or programmed to control each unit of the agricultural work assistance device 50. The controller 51 includes an agricultural field register 51*a*, an area setter 51*b*, a route creator 51*c*, a turning margin calculator 51*d*, and a notifier 51*g*. Although each of these units is a software program in this example, each of these units may be hardware such as a semiconductor element such as an ASIC or an electric circuit in another example.

The display operator 52 includes a touch panel and displays various kinds of information on a screen. Furthermore, by performing a predetermined operation on a display screen of the display operator 52, various inputs can be performed. The display operator 52 includes a display and an input. Instead of the display operator 52, an independent display and an operator (input) may be provided in the agricultural work assistance device 50.

The storage 53 is a nonvolatile memory or the like. In the storage 53, information or data for assisting traveling and work of the agricultural machine 1 are stored in a readable and writable manner. The communicator 54 is an interface for connection with the in-vehicle network N1. The controller 51 communicates with the controller 60, the operating device 62, the positioning device 40, the alarm 63, the detector 64, and the working device 2 over the in-vehicle network N1 by using the communicator 54. The communicator 54 is an output that outputs information and data to the controller 60 of the agricultural machine 1.

The agricultural field register 51*a* registers information concerning an agricultural field where agricultural work is performed by the agricultural machine 1 and the working device 2. The area setter 51*b* sets a predetermined area in the agricultural field registered by the agricultural field register 51*a*. The route creator 51*c* creates a traveling route along which the agricultural machine 1 travels on the agricultural field registered by the agricultural field register 51*a*. Furthermore, in this process, the route creator 51*c* secures a turning space where the agricultural machine 1 and the working device 2 turn on the registered agricultural field. The turning margin calculator 51*d* determines whether or not a turning margin, which is a size of the turning space secured by the route creator 51*c*, is insufficient. The notifier 51*g* displays, for notification, contents of predetermined information and data on the display operator 52. Furthermore, the notifier 51*g* may output, for notification, sound indicative of the contents of the predetermined information and data from a speaker of the alarm 63.

Next, operation of each unit of the agricultural work assistance system 100 is described. When the agricultural work assistance device 50 is activated, the controller 51 causes a home screen D1 illustrated in FIG. 3 to be displayed on the display operator 52. Data of the home screen D1 and data of screens that will be described later are stored in the storage 53. The controller 51 reads out data from the storage 53 as needed and causes a screen based on the data to be displayed on the display operator 52.

On the home screen D1, an agricultural machine mark X1, an agricultural field key B1, an automatic driving key B2*a*, an automatic steering key B2*b*, a history key B3, and a setting key B0 are displayed. The setting key B0 is a key for various settings. Selection (tapping) of the setting key B0 enables setting and registration of a predetermined item. Examples of the predetermined item include matters concerning the agricultural machine 1 on which the agricultural work assistance device 50 is mounted, the working device 2 coupled to the agricultural machine 1, agricultural work performed by the agricultural machine 1 and the working device 2, an agricultural field where the agricultural work is performed, and the display operator 52.

The history key B3 is a key for displaying a work history of the agricultural machine 1. The agricultural field key B1 is a key for registering an agricultural field where agricultural work is performed by the agricultural machine 1. The automatic driving key B2a is a key for setting or prediction concerning an automatic traveling work mode of the agricultural machine 1. The automatic steering key B2b is a key for setting or prediction concerning an automatic steering work mode of the agricultural machine 1.

The automatic traveling work mode is a mode in which the agricultural machine 1 performs agricultural work (ground work) by the working device 2 while causing the traveling body 3 to automatically travel. The automatic driving of the agricultural machine 1 is to automatically change a traveling speed of the traveling body 3 and automatically steer the traveling body 3. The automatic steering work mode is a mode in which agricultural work (ground work) is performed by the working device 2 while automatically steering the traveling body 3. In a case where the agricultural machine 1 is in the automatic steering work mode, the traveling speed of the traveling body 3 is changed in response to driver's operation of the accelerator and the brake included in the operating device 62 (FIG. 1). That is, in the automatic steering work mode, the traveling speed of the traveling body 3 is changed on the basis of manual operation.

The agricultural machine 1 can also travel on the basis of manual driving, and ground work can be performed by the working device 2 during the traveling. The manual driving of the agricultural machine 1 means that the driver changes the traveling speed of the traveling body 3 by operating the accelerator or the brake of the operating device 62 and steers the traveling body 3 by operating the steering wheel 30 (FIG. 1).

Figure 3:
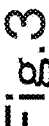
FIG. 3 illustrates an example of a home screen.
Figure 4:
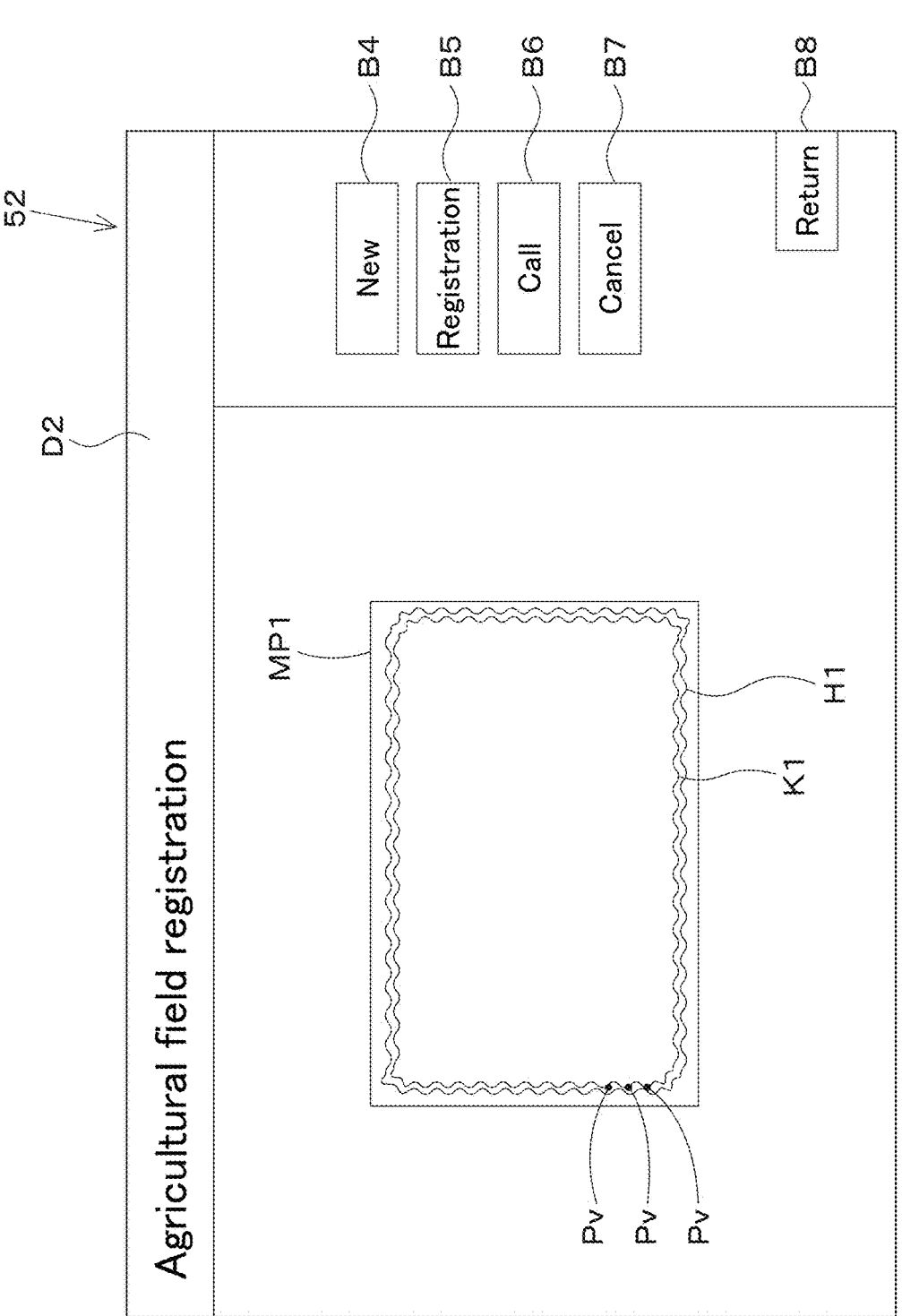
FIG. 4 illustrates an example of an agricultural field registration screen.

When a user selects the agricultural field key B1 on the home screen D1 of FIG. 3, the controller 51 causes an agricultural field registration screen D2 illustrated in FIG. 4 to be displayed on the display operator 52. On the agricultural field registration screen D2, a map MP1, a position Pv of the traveling body 3 of the agricultural machine 1, a new key B4, a registration key B5, a call key B6, a cancel key B7, and a return key B8 are displayed. In the map MP1, an image showing a map around a position where the agricultural machine 1 is present is displayed. Data of the map is acquired by the controller 51 by using the positioning device 40 or stored in advance in the storage 53. Furthermore, in the map MP1, an agricultural field where the agricultural machine 1 performs agricultural work is displayed, and positional information such as latitude and longitude is associated with the agricultural field. When the user performs predetermined operation on the map MP1, a map displayed in the map MP1 is zoomed in or out or a displayed portion of the map is moved.

Figure 5A:
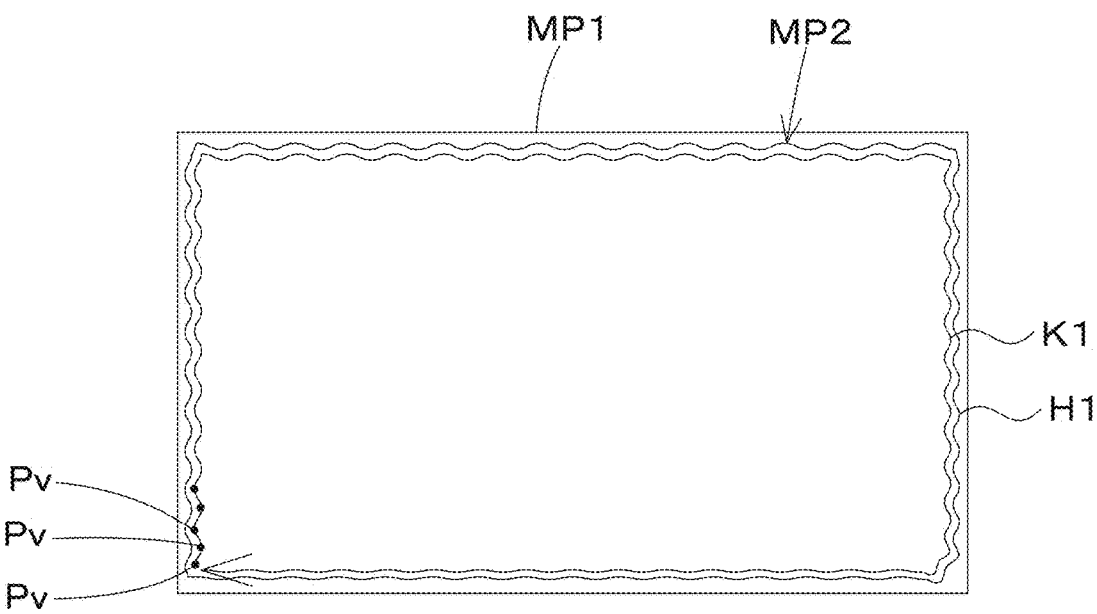
FIG. 5A is a view for explaining a method for registering an agricultural field.

FIG. 5A is a view for explaining a method for registering an agricultural field. For example, the user (the driver of the agricultural machine 1) selects the new key B4 on the agricultural field registration screen D2 illustrated in FIG. 4, and manually drives the agricultural machine 1 to circle within the agricultural field. In this process, no agricultural work may be performed on the agricultural field by the working device 2 by causing the raising/lowering device 8 to raise the working device 2 or agricultural work may be performed on the agricultural field by the working device 2 by causing the raising/lowering device 8 to lower the working device 2. The controller 51 of the agricultural work assistance device 50 (FIG. 1) acquires the position Pv detected by the positioning device 40 on a predetermined cycle by using the communicator 54, records the detected position Pv in an internal memory as needed, and displays the detected position Pv on the map MP1 as needed (only some positions Pv are displayed for convenience of illustration in FIGS. 4 and 5A).

When the circling of the agricultural machine 1 within the agricultural field is finished, the user selects the registration key B5. As a result, the agricultural field register 51a calculates a traveling track K1 of the traveling body 3 on the basis of a plurality of detected positions Pv that have been recorded. As illustrated in FIG. 5A, the controller 51 causes the traveling track K1 to be displayed on the map MP1. In the example of FIG. 5A, a line K1 passing the plurality of detected positions Pv in an order of detection (order of acquisition) and returning to an initially detected position Pv is regarded as a traveling track of the traveling body 3.

The detected position Pv is a GPS position of the positioning device 40, and the traveling track K1 is a track of movement of the GPS position. Accordingly, the agricultural field register 51a forms a line H1 between the traveling track K1 and an external line of the map MP1 by offsetting the traveling track K1 outward by a predetermined amount equivalent to an interval in the width direction from the GPS position of the agricultural machine 1 to an outer end of the circling working device 2 (in FIG. 5A, a left end of the working device 2 since the agricultural machine 1 circles in the agricultural field in a clockwise direction).

Since the GPS position of the positioning device 40 is at a center of the traveling body 3 and the center of the traveling body 3 in the width direction and a center of the working device 2 in the width direction match in this example, the offset amount is set identical to a half of an entire width (a length in the width direction) of the working device 2 or a half of a work width (a length in the width direction) of the working device 2 where ground work can be performed. In another example, the line H1 may be formed between the traveling track K1 and the external line of the map MP1 while setting, as the offset amount, a value that is smaller by a predetermined degree or larger by a predetermined degree than the interval in the width direction from the GPS position of the agricultural machine 1 to the outer end of the circling working device 2. Alternatively, the user may enter any offset amount by selecting the setting key B0 of the home screen D1 and performing predetermined input operation.

The agricultural field register 51a regards the line H1 thus formed as a contour (external shape) of the agricultural field and registers (stores) the agricultural field map MP2 (data indicative of the contour of the agricultural field) expressed by the contour H1 in the storage 53. When registering the agricultural field map MP2, the agricultural field register 51a registers, in the storage 53, a name and identification information of the agricultural field in association with the agricultural field map MP2. Note that, for example, the identification information of the agricultural field may be allocated by the agricultural field register 51a, may be input by the user by operating the display operator 52, or may be stored in advance in the storage 53. A plurality of sets of agricultural field information, examples of which include the agricultural field map MP2, a name of an agricultural field, and identification information of the agricultural field, can be registered in the storage 53. When the agricultural field register 51a registers agricultural field information, the controller 51 causes the agricultural field map MP2 (the contour H1 of the agricultural field) included in the agricultural field information to be displayed on the map MP1.

Figure 5B:
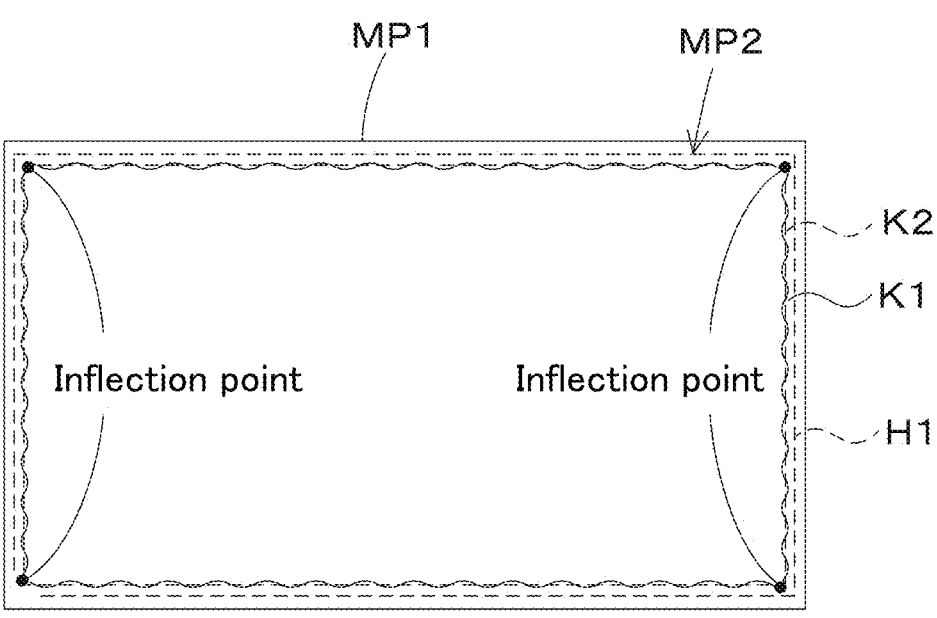
FIG. 5B is a view for explaining another method for registering an agricultural field.

The above method for registering the agricultural field is an example, and a method for registering the agricultural field is not limited to this. In another example, the agricultural field register 51a calculates inflection points from the traveling track K1 of the traveling body 3 and form a line K2 passing the inflection points, as illustrated in FIG. 5B. The agricultural field register 51a may form a line H1 between the traveling track K1 and the external line of the map MP1 by offsetting the line K2 outward by the offset amount, regard the line H1 as a contour H1 of the agricultural field and the agricultural field map MP2, and register the agricultural field map MP2 in the storage 53.

Figure 5C:
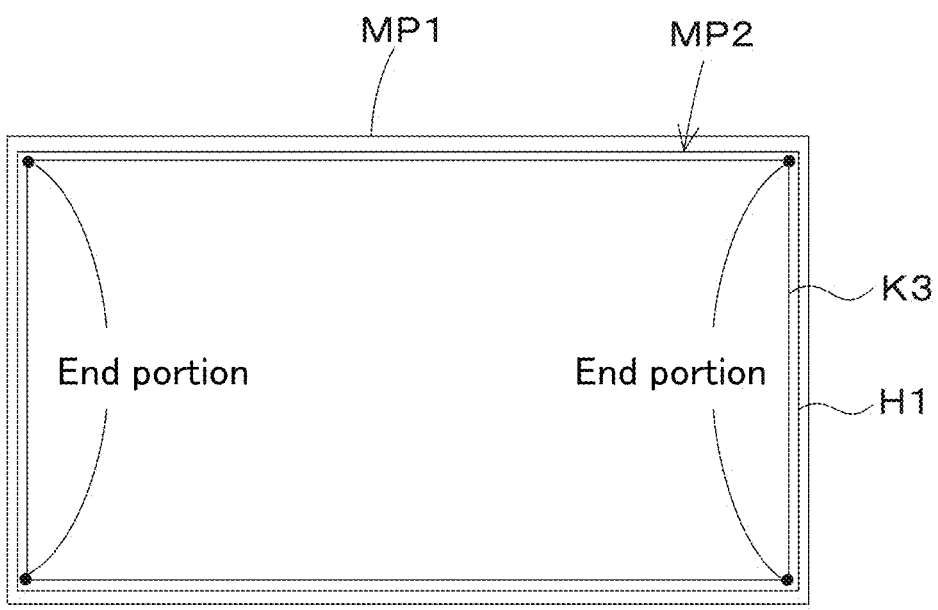
FIG. 5C is a view for explaining another method for registering an agricultural field.

Alternatively, the user may designate end portions of the agricultural field by operating a predetermined switch or the like provided in the operating device 62 while the agricultural machine 1 is circling, as illustrated in FIG. 5C. In this case, the agricultural field register 51a forms a line K3 passing the end portions of the agricultural field in an order of designation and returning to an initially designated end portion. The agricultural field register 51a may form a line H1 between the traveling track K1 and the external line of the map MP1 by offsetting the line K3 outward by the above offset amount, regard the line H1 as the contour H1 of the agricultural field and the agricultural field map MP2, and register the agricultural field map MP2 in the storage 53. Furthermore, the contour H1 of the agricultural field and the agricultural field map MP2 may be, for example, data expressed by a position (latitude and longitude), data expressed by a coordinate (an X-axis and a Y-axis) system, or data expressed in another way.

When the user selects the call key B6 on the agricultural field registration screen D2 illustrated in FIG. 4, the controller 51 reads out data of any agricultural field map MP2 registered in the storage 53 and causes the agricultural field map MP2 to be displayed on the agricultural field registration screen D2 on the basis of the data. When the operator selects the cancel key B7, the agricultural field register 51a deletes the position Pv of the traveling body 3 and the agricultural field map MP2 (the contour H1 of the agricultural field) displayed on the map MP1 at this time and deletes data thereof from the storage 53. That is, registration of the contour H1 of the agricultural field and the agricultural field map MP2 is canceled.

When the user selects the return key B8 after registration of the agricultural field is finished, the controller 51 causes the home screen D1 of FIG. 3 to be displayed on the display operator 52. That is, the return key B8 is a key for returning a display screen of the display operator 52 to a previous screen. When the user selects the automatic driving key B2a on the home screen D1, the controller 51 causes a work selection screen D3 illustrated in FIG. 6 to be displayed on the display operator 52.

On the work selection screen D3, a message indicative of an input operation procedure is displayed. Furthermore, on the work selection screen D3, a plurality of work keys B31 to B35, an up arrow key B41, a down arrow key B42, a next key B9, and a return key B8 are displayed. The work keys B31 to B35 are keys indicative of agricultural work that can be performed by the agricultural machine 1 and the working device 2 coupled to the agricultural machine 1. Although the five work keys B31, B32, B33, B34, and B35 are displayed in FIG. 6, the controller 51 causes a work key indicative of another work to be displayed on the work selection screen D3 in response to operator's selection of the up arrow key B41 or the down arrow key B42 in a case where there are six or more kinds of agricultural work that can be performed by the agricultural machine 1 and the working device 2.

Figure 6:
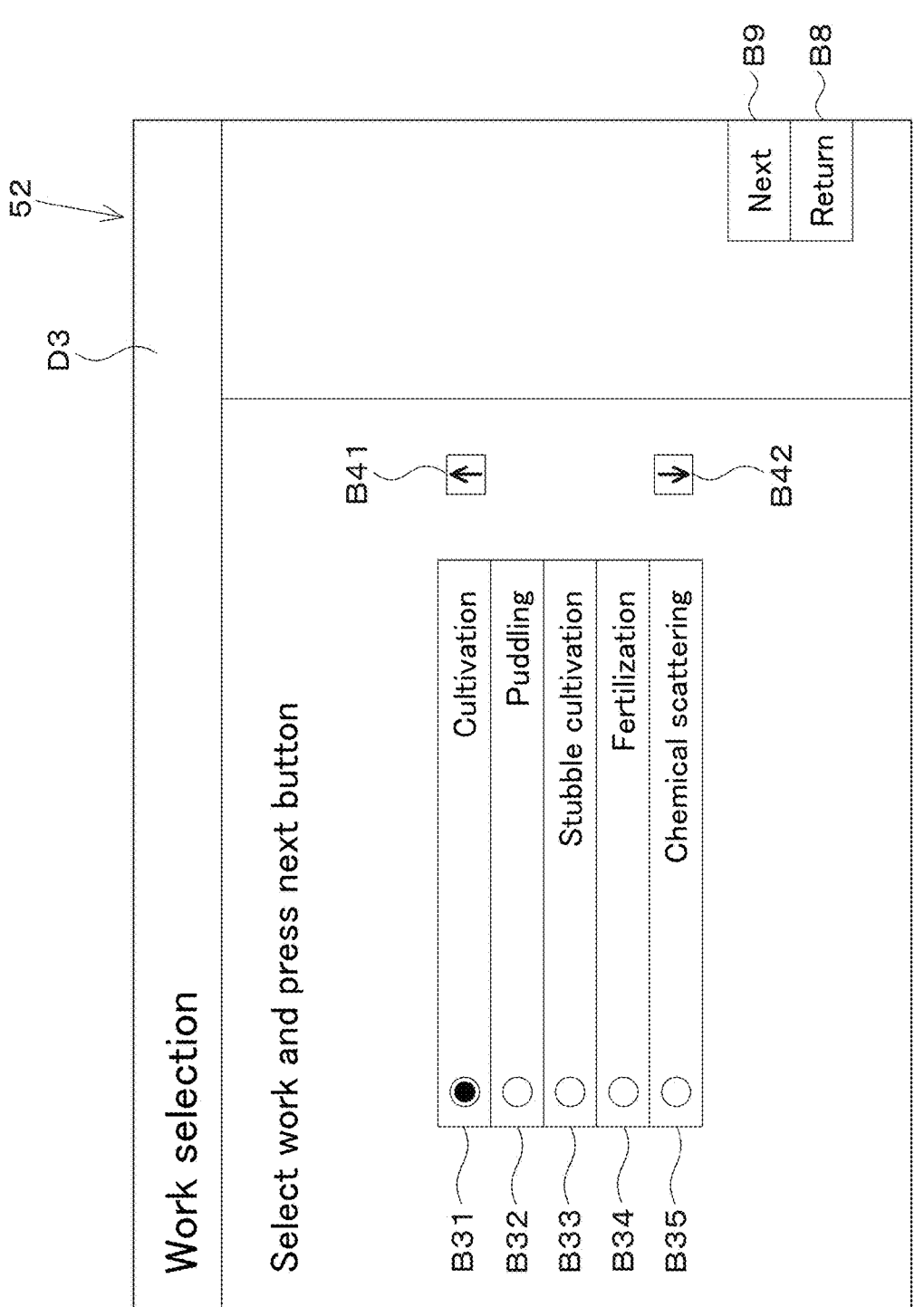
FIG. 6 illustrates an example of a work selection screen.

When the user selects any of the work keys B31 to B35, the controller 51 causes the selected work key to be displayed on the work selection screen D3 in a display form different from other work keys. In the example of FIG. 6, only the selected cultivation work key B31 is given a black circle mark. When the user selects the next key B9 in a state where any of the work keys B31, B32, B33, B34, and B35 is being selected, the controller 51 causes a vehicle confirmation screen D4a illustrated in FIG. 7A to be displayed on the display operator 52. That is, the next key B9 is a key for switching a display screen of the display operator 52 to a next screen. Note that when the user selects the return key B8, the controller 51 causes the home screen D1 of FIG. 3 to be displayed on the display operator 52. That is, the return key B8 is a key for returning a display screen of the display operator 52 to a previous screen.

Figure 7A:
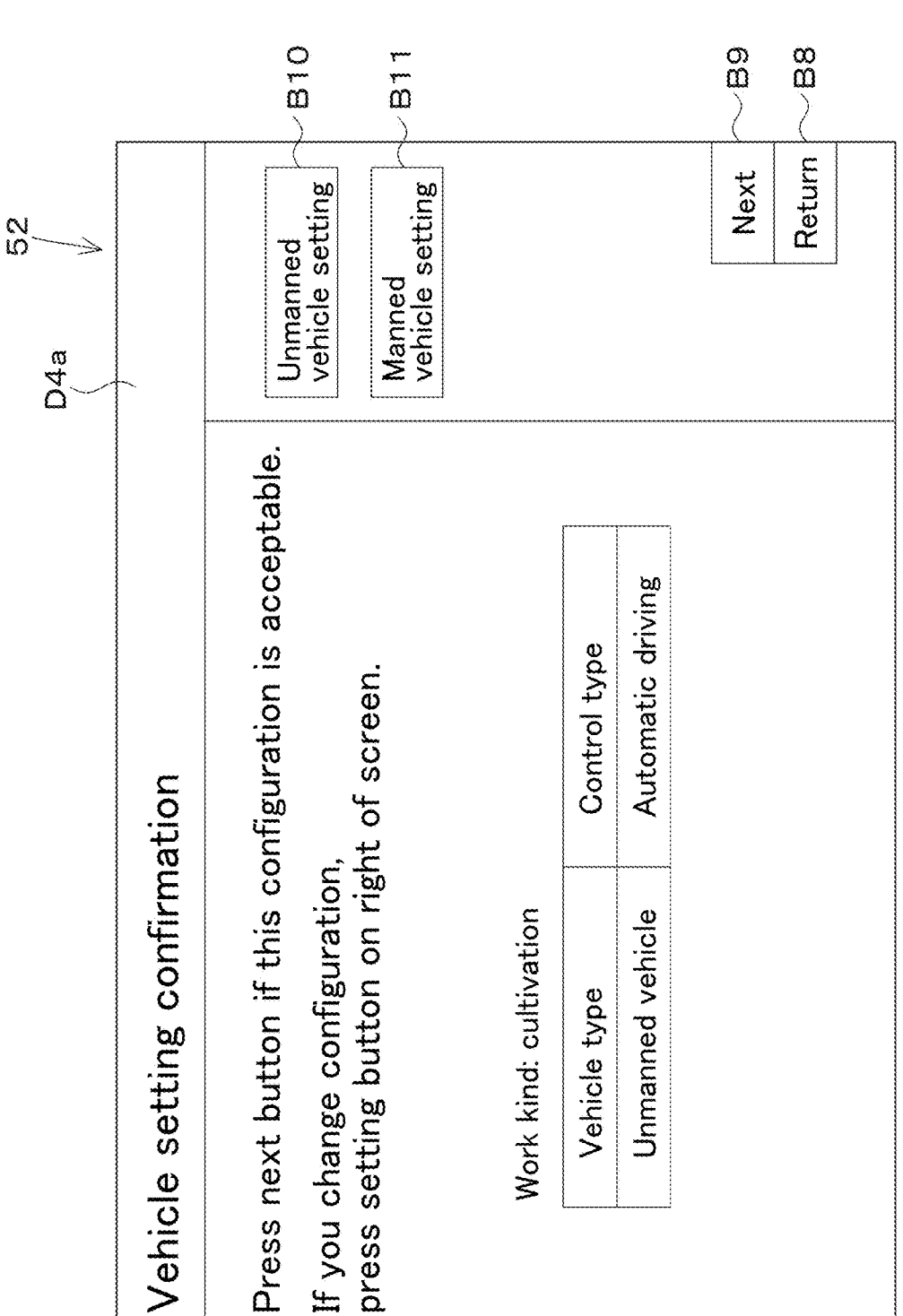
FIG. 7A illustrates an example of a vehicle confirmation screen.

On the vehicle confirmation screen D4a illustrated in FIG. 7A, a message indicative of an input operation procedure, a kind of agricultural work, a type of the agricultural machine 1, an unmanned vehicle setting key B10, a manned vehicle setting key B11, a next key B9, and a return key B8 are displayed. In the kind of agricultural work, the agricultural work selected on the work selection screen D3 is shown. The type of the agricultural machine 1 includes a vehicle type and a control type. In FIG. 7A, a type of the agricultural machine 1 registered (set) in advance is displayed on the vehicle confirmation screen D4a.

Note that the user can input the type of the agricultural machine 1, for example, by selecting the setting key B0 of the home screen D1 (FIG. 3) and performing predetermined input operation on the display operator 52. In this case, the user can input specifications such as a name and a dimension of the agricultural machine 1 by performing predetermined input operation. Furthermore, when the user performs predetermined input operation, the controller 51 causes the input type and specifications of the agricultural machine 1 to be stored in a predetermined region of the storage 53, and thereby registers the type and specifications. Information on the agricultural machine 1 and information on the working device 2 that will be described later can also be registered (stored) in the storage 53 by inputting the information on the home screen D1 by a similar procedure.

The user can change the type of the agricultural machine 1 by selecting the unmanned vehicle setting key B10 or the manned vehicle setting key B11 on the vehicle confirmation screen D4a and performing predetermined input operation. When the user selects the next key B9 of the vehicle confirmation screen D4a, the controller 51 causes setting information (the kind of agricultural work and the type of the agricultural machine 1) displayed on the vehicle confirmation screen D4a to be stored in the internal memory and causes a device selection screen D4b illustrated in FIG. 7B to be displayed on the display operator 52.

On the device selection screen D4b, a message indicative of an input operation procedure, working device keys B36a to B36d, an up arrow key B41, a down arrow key B42, a next key B9, and a return key B8 are displayed. In each of the working device keys B36a to B36d, representative device-specific information of the working device 2 that is registered in advance is shown. The representative device-specific information of the working device 2 includes a name of the working device 2, whether or not there is work previously performed by the working device 2, and a work width. The work width is a width where work can be performed within a horizontal plane perpendicular to the traveling direction of the working device 2. Although the four working device keys B36a to B36d are displayed in FIG. 7B, the user selects the up arrow key B41 or the down arrow key B42 in a case where five or more working devices 2 are registered in the agricultural work assistance device 50. As a result, the controller 51 causes the working device key indicative of another working device 2 to be displayed on the device selection screen D4*b*.

Figure 7B:
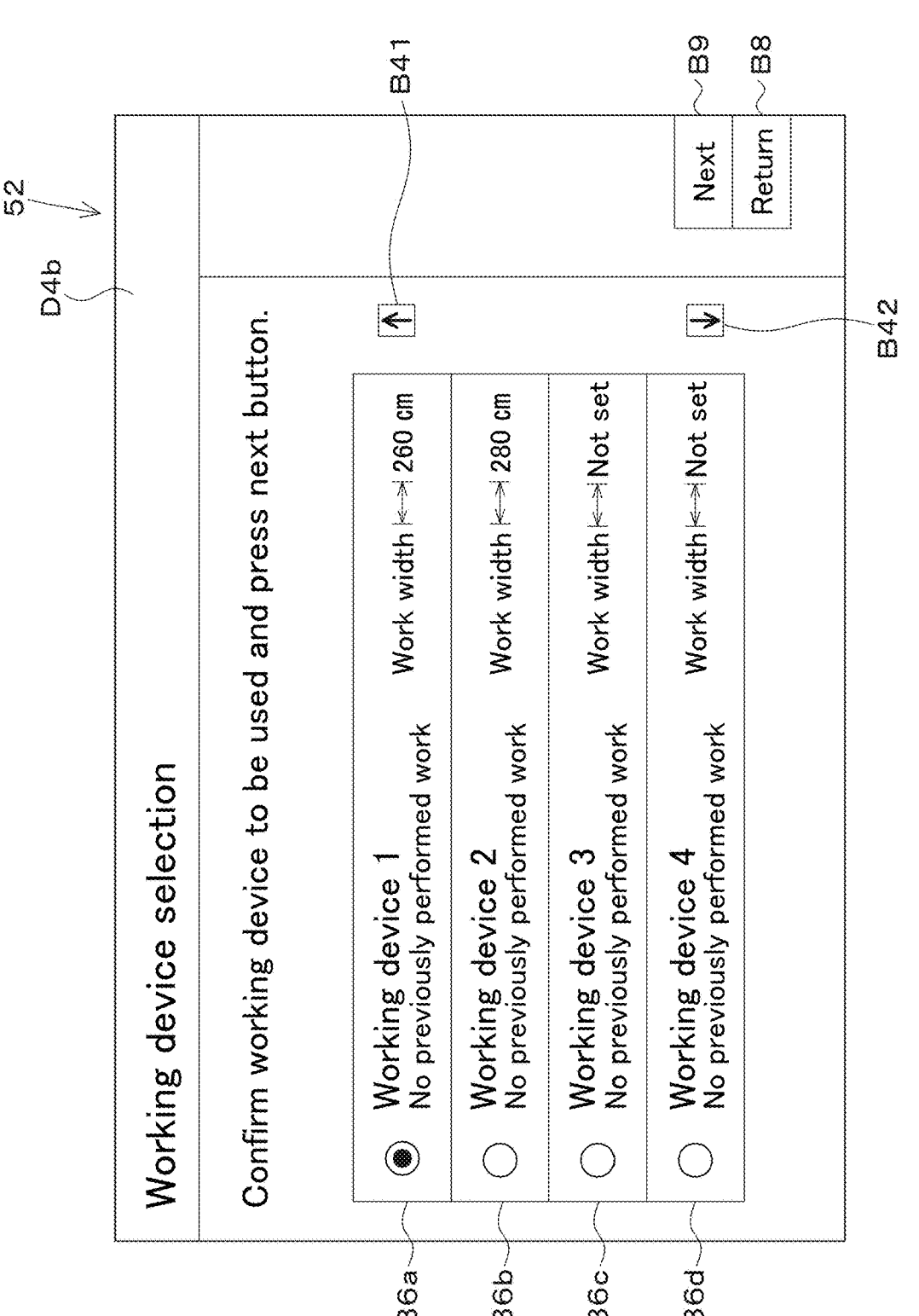
FIG. 7B illustrates an example of a device selection screen.

When the user selects any of the working device keys B36*a* to B36*d*, the controller 51 causes the selected working device key to be displayed on the device selection screen D4*b* in a display form different from other working device keys. In the example of FIG. 7B, only the selected working device key B36*a* is given a black circle mark. When the user selects the next key B9 in a state where any of the working device key B36*a* to B36*d* is being selected, the controller 51 causes a device confirmation screen D4*c* illustrated in FIG. 7C to be displayed on the display operator 52.

Figure 7C:
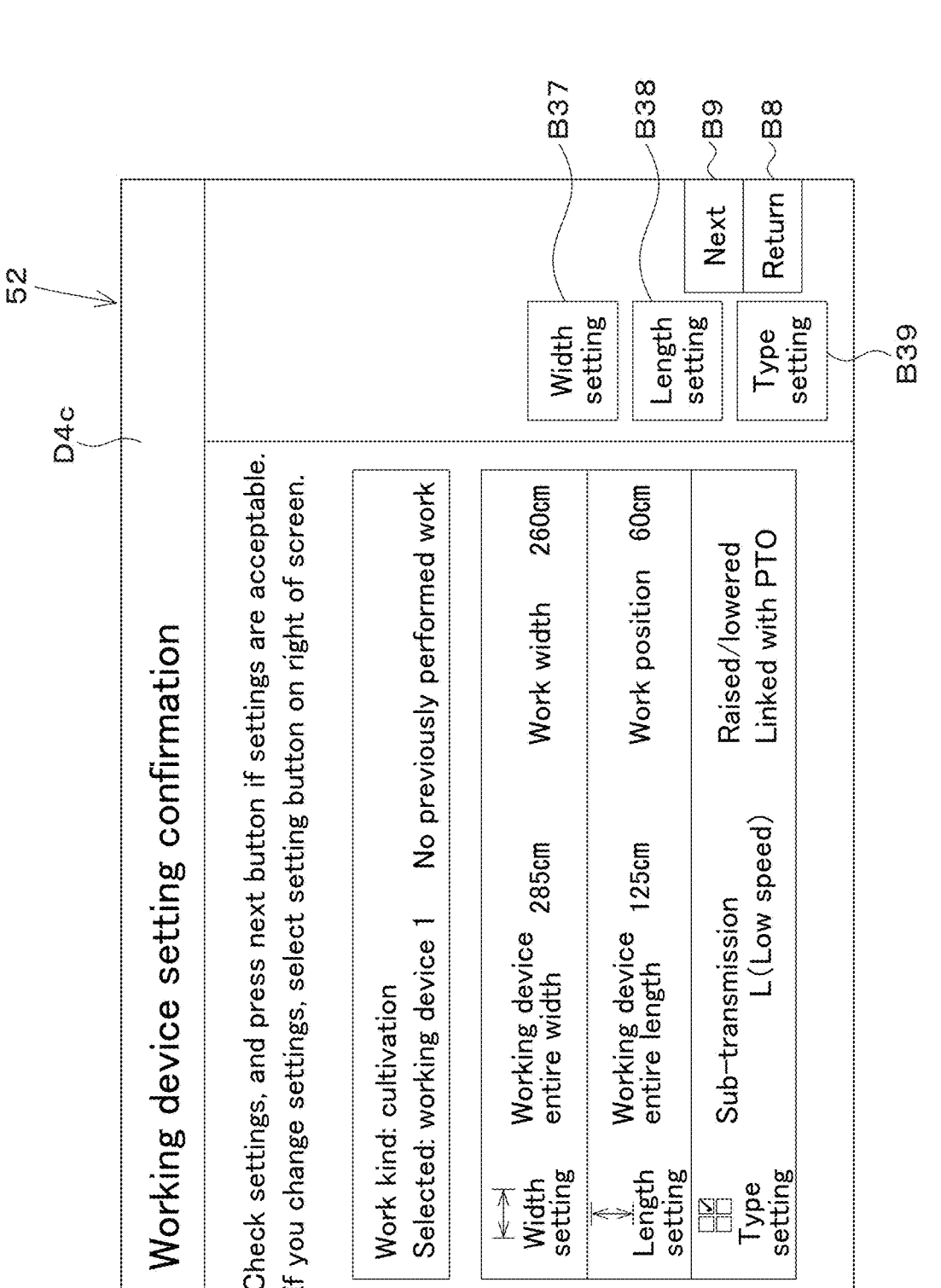
FIG. 7C illustrates an example of a device confirmation screen.

On the device confirmation screen D4*c*, a message indicative of an input operation procedure, device-specific information of the working device 2 selected on the device selection screen D4*b* (FIG. 7B), setting keys B37 to B39, a next key B9, and a return key B8 are displayed. The device-specific information of the working device 2 includes a name of the working device 2, whether or not there is work previously performed by the working device 2, dimension information of the working device 2, and a type of the working device 2. That is, detailed specifications of the working device 2 selected on the device selection screen D4*b* are displayed on the device confirmation screen D4*c*. In FIGS. 7B and 7C, device-specific information of the working device 2 registered in advance is displayed on the screens D4*b* and D4*c*.

As illustrated in FIG. 7C, the dimension information of the working device 2 includes an entire width, a work width, an entire length, and a work position of the working device 2. The type of the working device 2 includes a speed stage of a sub-transmission (not illustrated) for driving the working device 2 that is a cultivator to rotate, whether or not the working device 2 is raised or lowered by the raising/lowering device 8, and whether or not the agricultural machine 1 is linked with PTO (Power take-off).

The setting keys B37 to B39 are keys for setting and changing the dimension information or type of the working device 2. Specifically, the user can input and change setting values of the entire width and the work width of the working device 2 by selecting the width setting key B37 and performing predetermined input operation. Furthermore, the user can input and change setting values of the entire length and the work position of the working device 2 by selecting the length setting key B38 and performing predetermined input operation. The entire length of the working device 2 is a length from a coupling position where the working device 2 is coupled with the lower link 8*b* (FIGS. 1 and 2) of the raising/lowering device 8 to a rear end of the working device 2 (an end opposite to the traveling body 3 of the agricultural machine 1). The work position of the working device 2 is a length from the coupling position where the working device 2 is coupled to the lower link 8*b* to a front-end position where ground work can be performed (an end of a workable portion on the traveling body 3 side).

Furthermore, the user can input and change, as a speed stage of the sub-transmission, a low-speed stage (L (low speed)) or a medium-speed stage (M (medium speed)) by selecting the type setting key B39 and performing predetermined input operation. In this example, whether or not the agricultural machine 1 is linked with the PTO and whether or not the working device 2 is raised or lowered by the raising/lowering device 8 are fixed to "linked" and "raised/lowered" and are unchangeable. In another example, whether or not the agricultural machine 1 is linked with the PTO may be selectable between "linked" and "not linked"

and whether or not the working device 2 is raised or lowered by the raising/lowering device 8 may be selectable between "raised/lowered" and "not raised/lowered".

Figure 8:
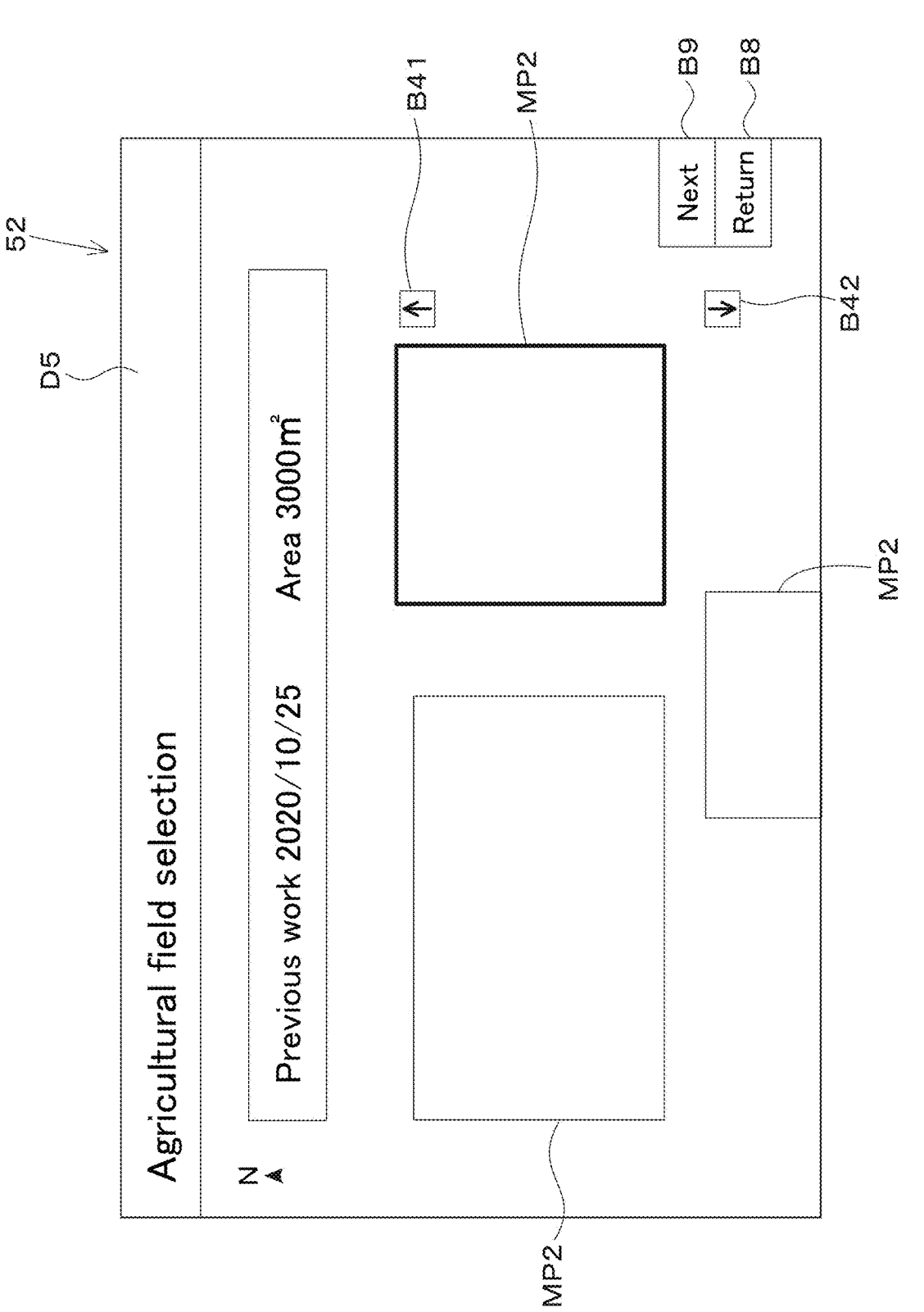
FIG. 8 illustrates an example of an agricultural field selection screen.

When the user selects the next key B9 on the device confirmation screen D4*c*, the controller 51 causes setting information displayed on the device confirmation screen D4*c* to be stored in the internal memory, and causes an agricultural field selection screen D5 illustrated in FIG. 8 to be displayed on the display operator 52. On the agricultural field selection screen D5, one or more registered agricultural field maps MP2, an up arrow key B41, a down arrow key B42, a next key B9, and a return key B8 are displayed. In FIG. 8, three agricultural field maps MP2 are displayed. In a case where four or more agricultural field maps MP2 are registered in advance, the controller 51 causes another agricultural field map MP2 to be displayed on the agricultural field selection screen D5 in response to user's selection of the up arrow key B41 or the down arrow key B42.

When the user selects any of the agricultural field maps MP2, the controller 51 causes the selected agricultural field map MP2 to be displayed in a display form different from the other agricultural field maps MP2. In FIG. 8, only the selected agricultural field map MP2 is surrounded by the thick-line frame. Furthermore, the controller 51 causes date and time of last agricultural work performed in the selected agricultural field map MP2 and an area of the agricultural field map MP2 to be displayed on the agricultural field selection screen D5. When the user selects the next key B9 in a state where any of the agricultural field maps MP2 is being selected, the controller 51 reads out agricultural field information including the selected agricultural field map MP2 from the storage 53, causes the agricultural field information to be stored in the internal memory, and causes a route creation 1 screen D6 illustrated in FIG. 9 to be displayed on the display operator 52. Note that this agricultural field information for setting includes, as information on the agricultural field map MP2, identification information, a contour, and an area of the agricultural field map MP2, and includes, as information on the agricultural field corresponding to the agricultural field map MP2, identification information, a position, and a contour of the agricultural field. Furthermore, the agricultural field information includes date and time of last work.

Figure 9:
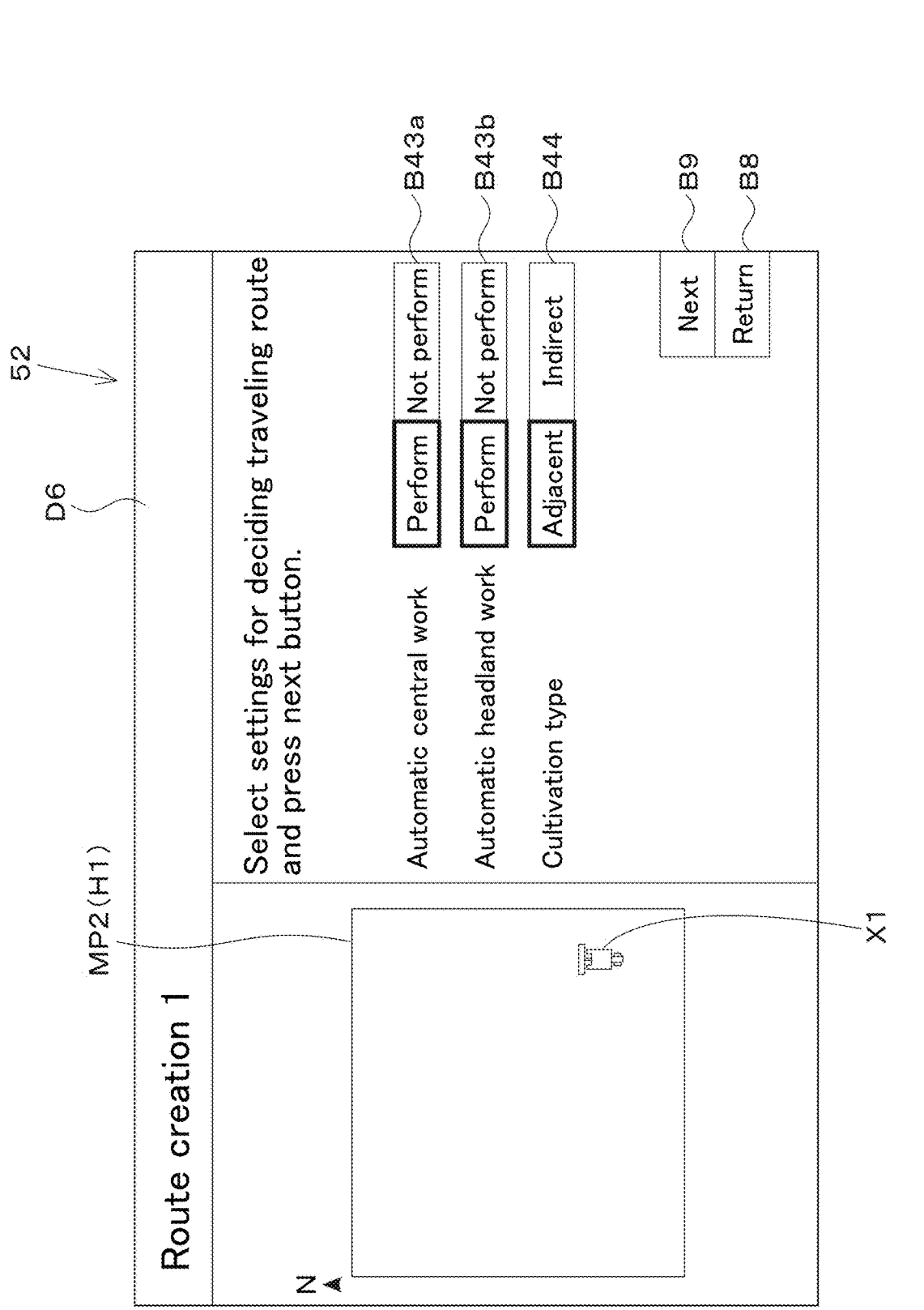
FIG. 9 illustrates an example of a route creation 1 screen.

On the route creation 1 screen D6 illustrated in FIG. 9, the selected agricultural field map MP2 (the contour H1), an agricultural machine mark X1, a message indicative of an input operation procedure, work keys B43*a*, B43*b*, and B44, a next key B9, and a return key B8 are displayed. The work keys B43*a*, B43*b*, and B44 are keys for selecting settings for creating a traveling route of the agricultural machine 1, which will be described later. In other words, the work keys B43*a*, B43*b*, and B44 are keys for setting work conditions for performing agricultural work on the agricultural field by the agricultural machine 1 (the traveling body 3) and the working device 2.

More specifically, an automatic central work key B43*a* is a key for selecting whether or not to perform agricultural work by the working device 2 while allowing the traveling body 3 of the agricultural machine 1 to automatically travel in a central area set in the agricultural field map MP2 as described later. An automatic headland work key B43*b* is a key for selecting whether or not to perform agricultural work by the working device 2 while allowing the traveling body 3 of the agricultural machine 1 to automatically travel in a headland set in the agricultural field map MP2 as described later.

A work type key B44 is a key for selecting a state of work performed by the working device 2. Since a case where the cultivation work has been selected on the work selection screen D3 of FIG. 6 is illustrated as an example in the present example embodiment, the work type key B44 of FIG. 9 is a key for selecting whether a type of the cultivation work is adjacent work or indirect work. In a case where another work is selected on the work selection screen D3 of FIG. 6, the work type key B44 of FIG. 9 is a key for selecting a state of this work.

FIG. 9 illustrates a state where performing agricultural work by the working device 2 while allowing the agricultural machine 1 to automatically travel in the central area of the agricultural field has been selected by the automatic central work key B43a. Furthermore, FIG. 9 illustrates a state where performing agricultural work by the working device 2 while allowing the agricultural machine 1 to automatically travel in the headland of the agricultural field has been selected by the automatic headland work key B43b. Furthermore, FIG. 9 illustrates a state where the adjacent work has been selected as the type of the cultivation work by the work type key B44. When the user selects the next key B9, the controller 51 causes the work conditions (setting contents set by the work keys B43a, B43b, and B44) displayed on the route creation 1 screen D6 to be stored in the internal memory, and causes a route creation 2 screen D7 illustrated in FIG. 10A to be displayed on the display operator 52.

On the route creation 2 screen D7, the selected agricultural field map MP2, the agricultural machine mark X1, a message indicative of an input operation procedure, a plurality of setting items and numerical value input columns thereof, a recommendation key B12, a route creation key B13, a track prediction key B14, a positive key B45, a negative key B46, a next key B9, and a return key B8 are displayed. While the route creation 2 screen D7 is being displayed, the controller 51 may cause the communicator 54 to acquire an actual position of the traveling body 3 detected by the positioning device 40 and cause the agricultural machine mark X1 to be displayed at a position corresponding to the position of the traveling body 3 on the agricultural field map MP2.

The plurality of setting items on the route creation 2 screen D7 are creation conditions for creating a traveling route and work conditions for performing agricultural work on the agricultural field by the agricultural machine 1 and the working device 2. The setting items include a predicted work distance, the number of headlands, the number of automatic driving headlands, a work direction, a headland overlapping margin, and a central portion overlapping margin. A numerical value can be input for these items other than the predicted work distance. The number of headlands is the number of headlands set one or more rounds along the contour H1 (the agricultural field map MP2) of the registered agricultural field inside the contour H1. The number of automatic driving headlands is the number of headlands where agricultural work is performed by the working device 2 while allowing the agricultural machine 1 to travel among the set headlands.

The work direction is a direction in which work is performed by the working device 2 while allowing the traveling body 3 to travel straight back and forth in the central portion inside the headland of the agricultural field. By inputting a predetermined numerical value (e.g., "1" to "4") in the numerical value input column of the work direction, upward, downward, leftward, and rightward directions of the route creation 2 screen D7 corresponding to the numerical value are set. The headland overlapping margin is a margin by which the work width of the working device 2 sticks out to the headland. The central portion overlapping margin is an overlapping margin between work widths in a case where work is performed by the working device 2 while allowing the traveling body 3 to travel straight back and forth in the central portion of the agricultural field.

By selecting a numerical value input column of a setting item and operating the positive key B45 or the negative key B46 on the route creation 2 screen D7, the user can input a numerical value in the numerical value input column. When the user selects the recommendation key B12, the controller 51 reads out a recommended value of each setting item according to the agricultural work selected on the work selection screen D3 (FIG. 6) among recommended values stored in advance in the storage 53 and inputs (displays) the recommended value in a corresponding numerical value input column.

When the user selects the route creation key B13 after inputting a numerical value in each setting item of the route creation 2 screen D7, the controller 51 causes the numerical value of each setting item to be stored in the internal memory. Furthermore, the area setter 51b (FIG. 1) sets a central area (second area) C1 and a headland area (first area) E1 in the agricultural field map MP2, as illustrated in FIG. 10B. Furthermore, the route creator 51c (FIG. 1) creates a traveling route (scheduled traveling route) L1 on the agricultural field map MP2.

Figure 11A:
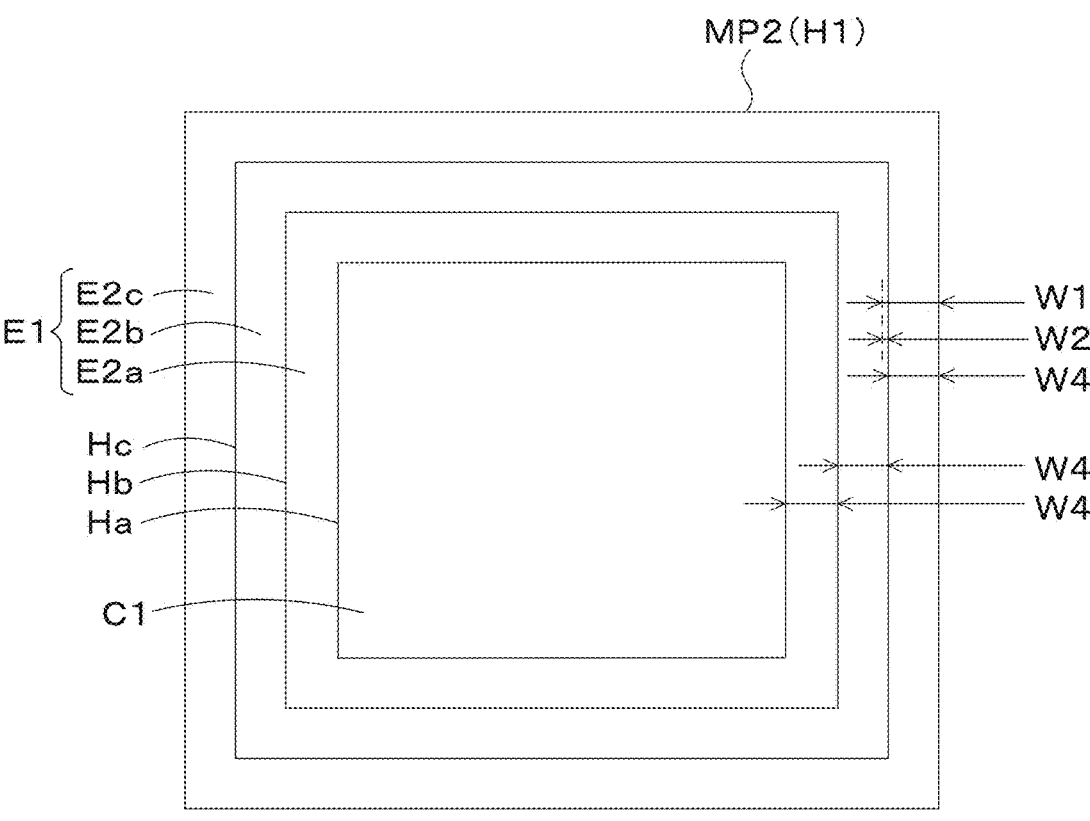
FIG. 11A is a view for explaining a method for setting an area and a traveling route.

FIGS. 11A to 11D are views for explaining a method for setting the areas C1 and E1 and the traveling route L1. When the user selects the route creation key B13, first, the area setter 51b sets the central area C1 and the headland area E1 on the basis of the agricultural field information, the dimension information of the working device 2, and the number of headlands or the headland overlapping margin input on the route creation 2 screen D7. Specifically, for example, the area setter 51b calculates contours Hc, Hb, and Ha formed by offsetting the contour H1 of the agricultural field inward as many times as the number of headlands by a width W4 obtained by subtracting a headland overlapping margin W2 from a work width W1 of the working device 2, as illustrated in FIG. 11A. Then, the area setter 51b sets, as the central area C1, an area (central portion) surrounded by the innermost contour Ha among the contours Hc, Hb, and Ha.

In another example, the area setter 51b may calculate contours formed by offsetting the contour H1 of the agricultural field inward as many times as the number of headlands by the work width of the working device 2 (or the entire width of the working device 2) and set, as a central area, an area (central portion) surrounded by an innermost contour among these contours.

After setting the central area C1 as described above, the area setter 51b sets, as the headland area E1, a frame-shaped area (outer frame portion) outside the central area C1 and inside the contour H1 of the agricultural field. Furthermore, the area setter 51b sets, as headlands E2c, E2b, and E2c, areas between adjacent contours in the headland area E1 among the contour H1 of the agricultural field and the contours Hc, Hb, and Ha formed by offsetting the contour H1. Then, the area setter 51b causes data such as positions of the areas C1 and E1 (including the headlands E2c, E2b, and E2c) to be stored in the storage 53.

Figure 11B:
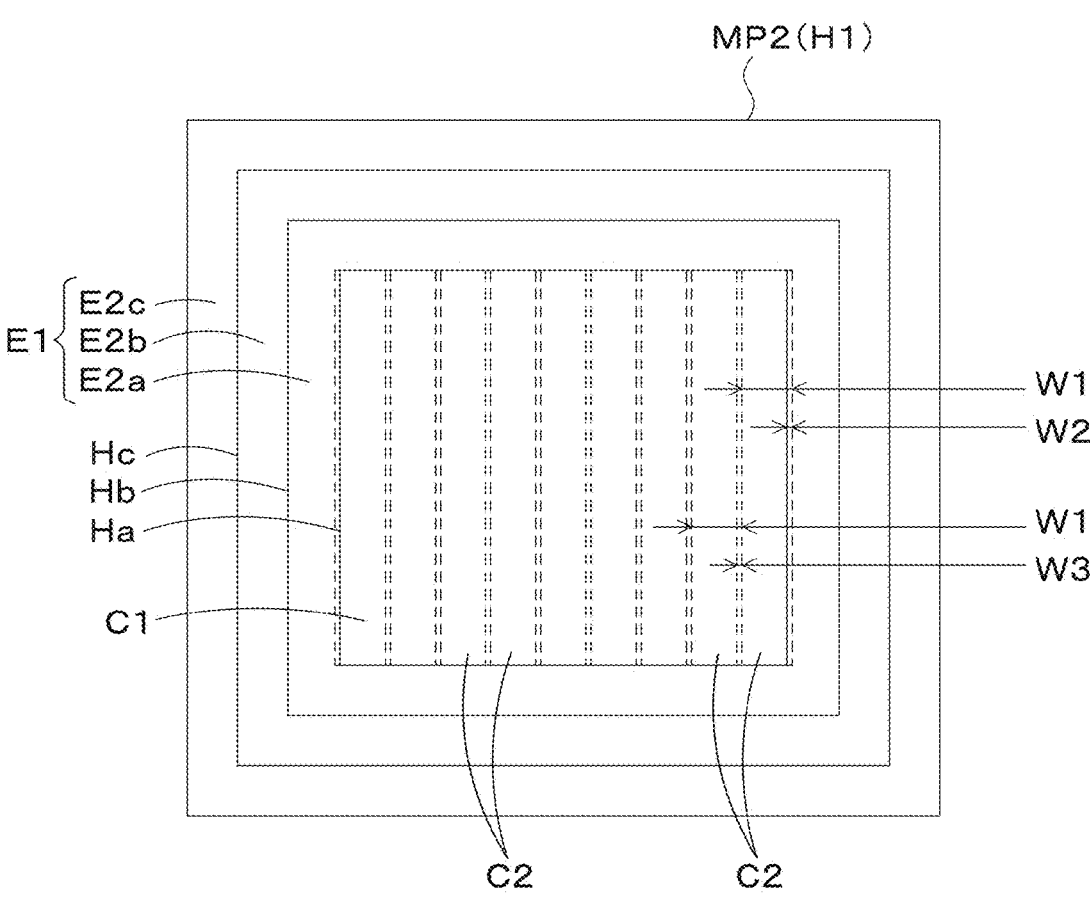
FIG. 11B is a view for explaining a method for setting an area and a traveling route.

The route creator 51c creates the traveling route L1 on the basis of the agricultural information, the areas C1 and E1, the dimension information of the agricultural machine 1 and the working device 2, and the work direction, the headland overlapping margin, and the central portion overlapping margin input on the route creation 2 screen D7. Specifically, first, the route creator 51c creates a plurality of unit work sections C2 within the central area C1 by sequentially dividing the central area C1 by the work width W1 of the working device 2 starting from one end portion (right end portion in FIG. 11B) of the central area C1 parallel to the work direction (the up-down direction in FIG. 11B), as illustrated in FIG. 11B. In this process, as for an initially created unit work section C2, the route creator 51c causes the work width W1 to overlap the headland area E1 by the headland overlapping margin W2. For subsequently created unit work sections C2, the route creator 51c causes the work width W1 to overlap the previously created unit work section C2 by the central portion overlapping margin W3.

Figure 11C:
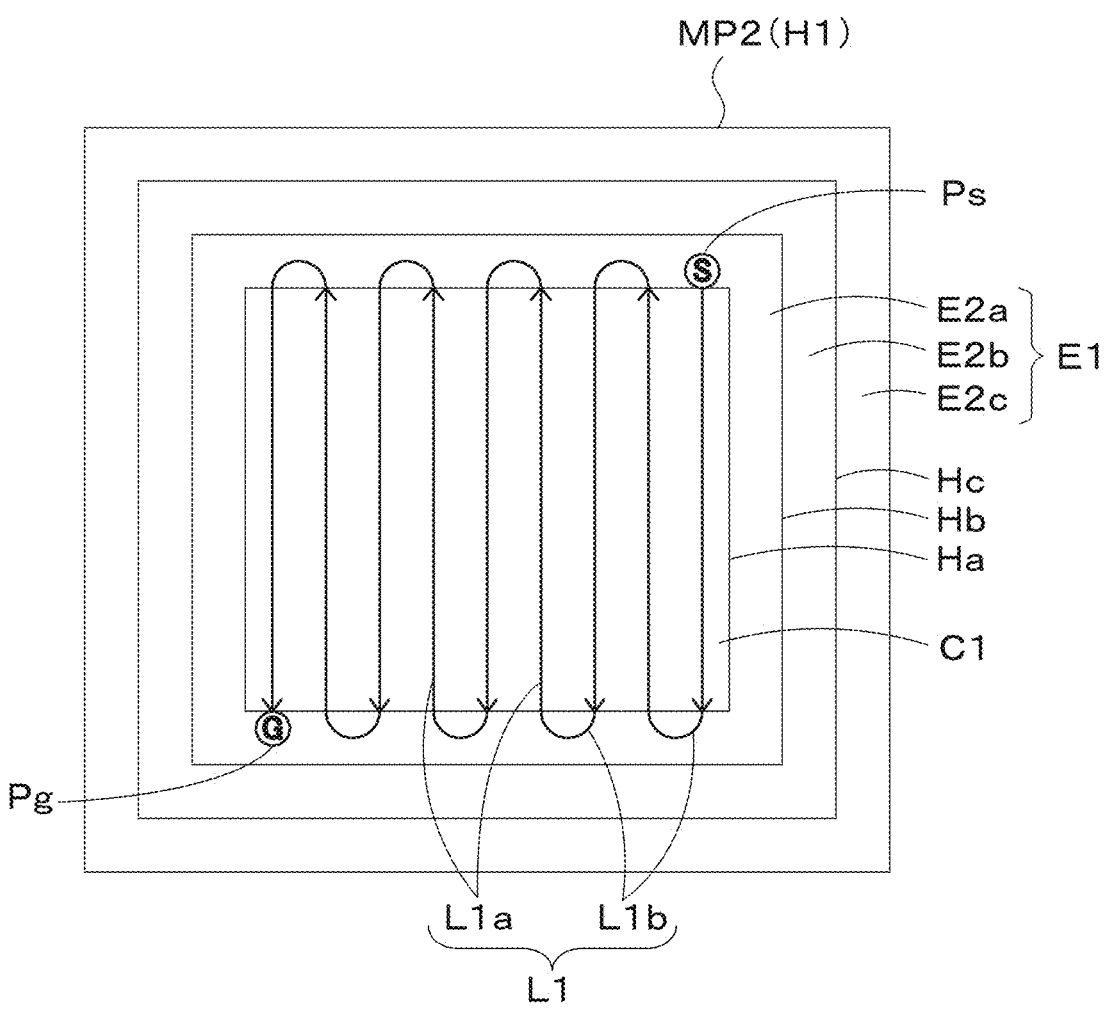
FIG. 11C is a view for explaining a method for setting an area and a traveling route.

Next, the route creator 51c creates, for each unit work section C2, a straight traveling route L1a along which the traveling body 3 travels straight, as illustrated in FIG. 11C. In this process, the route creator 51c creates, on a central line of the unit work section C2 in a width direction (the left-right direction in FIG. 11C), the linear straight traveling route L1a connecting both end portions of the unit work section C2 in a longitudinal direction. Note that in a case where the straight traveling route L1a created in a unit work section C2 created last (a unit work section C2 in a left end portion of the central area C1 in FIG. 11B) is created outside the central area C1, the route creator 51c may exclude the straight traveling route L1a from the traveling route L1.

Next, the route creator 51c creates, in the headland area E1, a route L1b that connects adjacent straight traveling routes L1a. This route L1b is a turning route along which the agricultural machine 1 (the traveling body 3) and the working device 2 turn to travel from one of the adjacent two straight traveling routes L1a to the other. When creating the turning route L1b, the route creator 51c secures, in the headland area E1, a turning space where the agricultural machine 1 and the working device 2 turn. Details of the turning space will be described later.

Although a simple semi-circular turning route L1b is illustrated in FIG. 11C, this shape is merely used for convenience such as easier displaying on the display screen of the display operator 52 and easier viewing of the traveling route L1 on the display screen. When the traveling body 3 of the agricultural machine 1 and the working device 2 actually turn toward the other straight traveling route L1a after traveling on the basis of the one straight traveling route L1a, the traveling vehicle 3 and the like sometimes draw a track of a more complicated shape than the semi-circular shape by not only traveling forward, but also traveling backward or turning plural times. That is, the turning route L1b is a route for display on the display operator 52, and the agricultural machine 1 does not necessarily turn on the basis of the turning route L1b. The route creator 51c may create the turning route L1b in a shape other than the semi-circular shape.

While the traveling body 3 is traveling on the basis of the straight traveling route L1a, the controller 60 (FIG. 1) of the agricultural machine 1 causes the raising/lowering device 8 (FIG. 2) to lower the working device 2 so that ground work is performed by the working device 2. While the traveling body 3 is turning in a portion corresponding to the turning route L1b, that is, while the traveling body 3 is turning from the one straight traveling route L1a toward the other straight traveling route L1a, the automatic controller 61 causes the raising/lowering device 8 to raise the working device 2 so that the ground work using the working device 2 is stopped. That is, the straight traveling route L1a is a work route along which ground work is performed by the working device 2 while allowing the traveling body 3 of the agricultural machine 1 to automatically travel. The central area C1 where a plurality of straight traveling routes L1a are formed is a work area where ground work is performed by the working device 2 while allowing the traveling body 3 to automatically travel straight back and forth. Note that the work route is not limited to a linear route such as the straight traveling route L1a and may be a curved route. It is only necessary that one or more linear work routes and/or one or more curved work routes be created in the work area.

For example, on the route creation 1 screen D6 of FIG. 9, working in the central area C1 is selected by the automatic central work key B43a, not working in the headland is selected by the automatic headland work key B43b, and the adjacent work is selected by the work type key B44. In this case, the route creator 51c creates the traveling route L1 including the straight traveling route L1a and the turning route L1b, as illustrated in FIG. 11C. Furthermore, among end portions of straight traveling routes L1a on both sides of the central area C1, the route creator 51c sets a start position Ps at an end portion of one straight traveling route L1a that is not connected to the turning route L1b (an upper end portion of a right-end straight traveling route L1a in FIG. 11C) and sets a goal position Pg at an end portion of the other straight traveling route L1a (a lower end portion of a left-end straight traveling route L1a in FIG. 11C). Then, the route creator 51c causes information indicative of the areas C1 and E1, the traveling route L1, the start position Ps, the goal position Pg, and the turning space to be stored as route information in the internal memory.

Figure 10A:
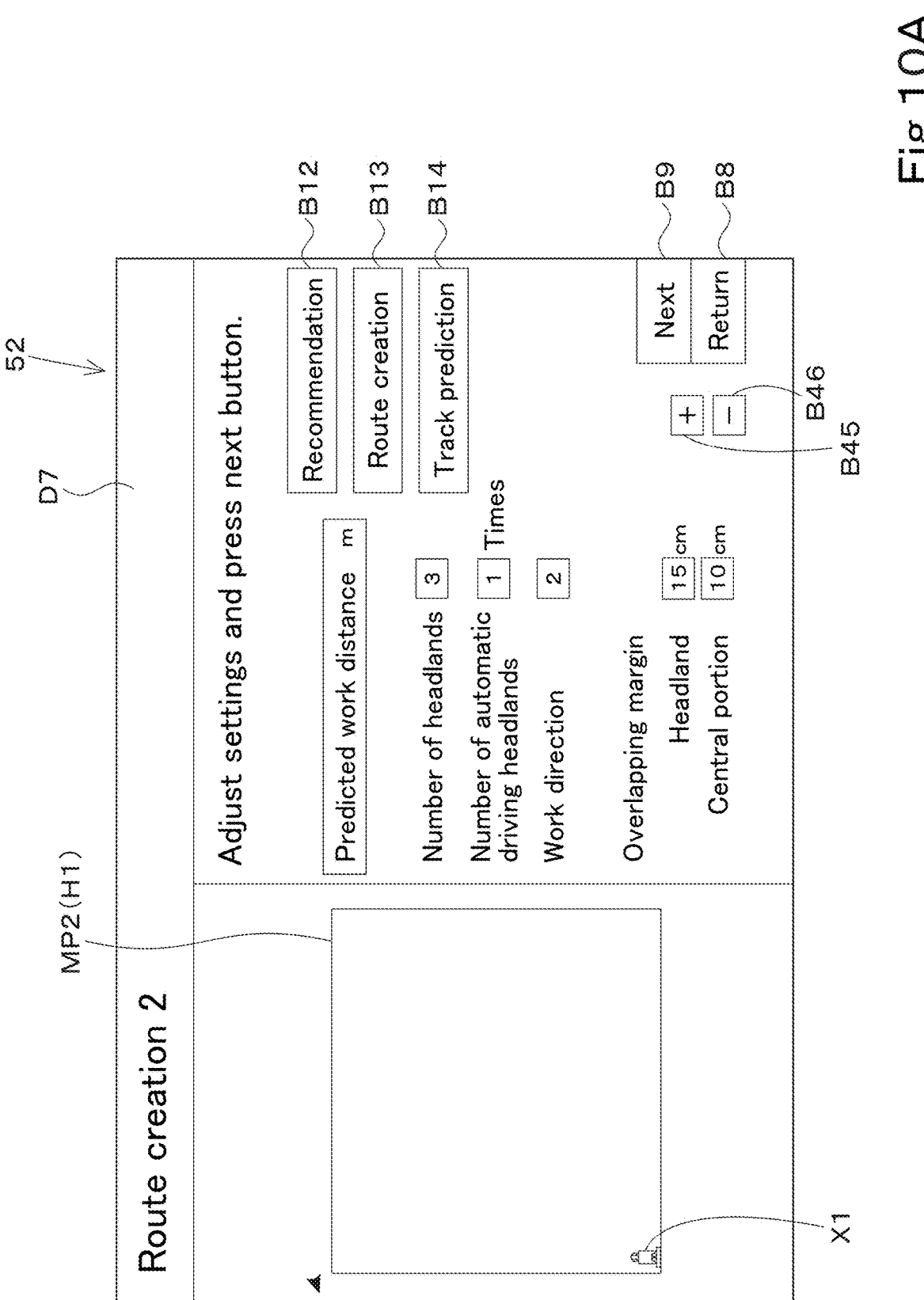
FIG. 10A illustrates an example of a route creation 2 screen.
Figure 11D:
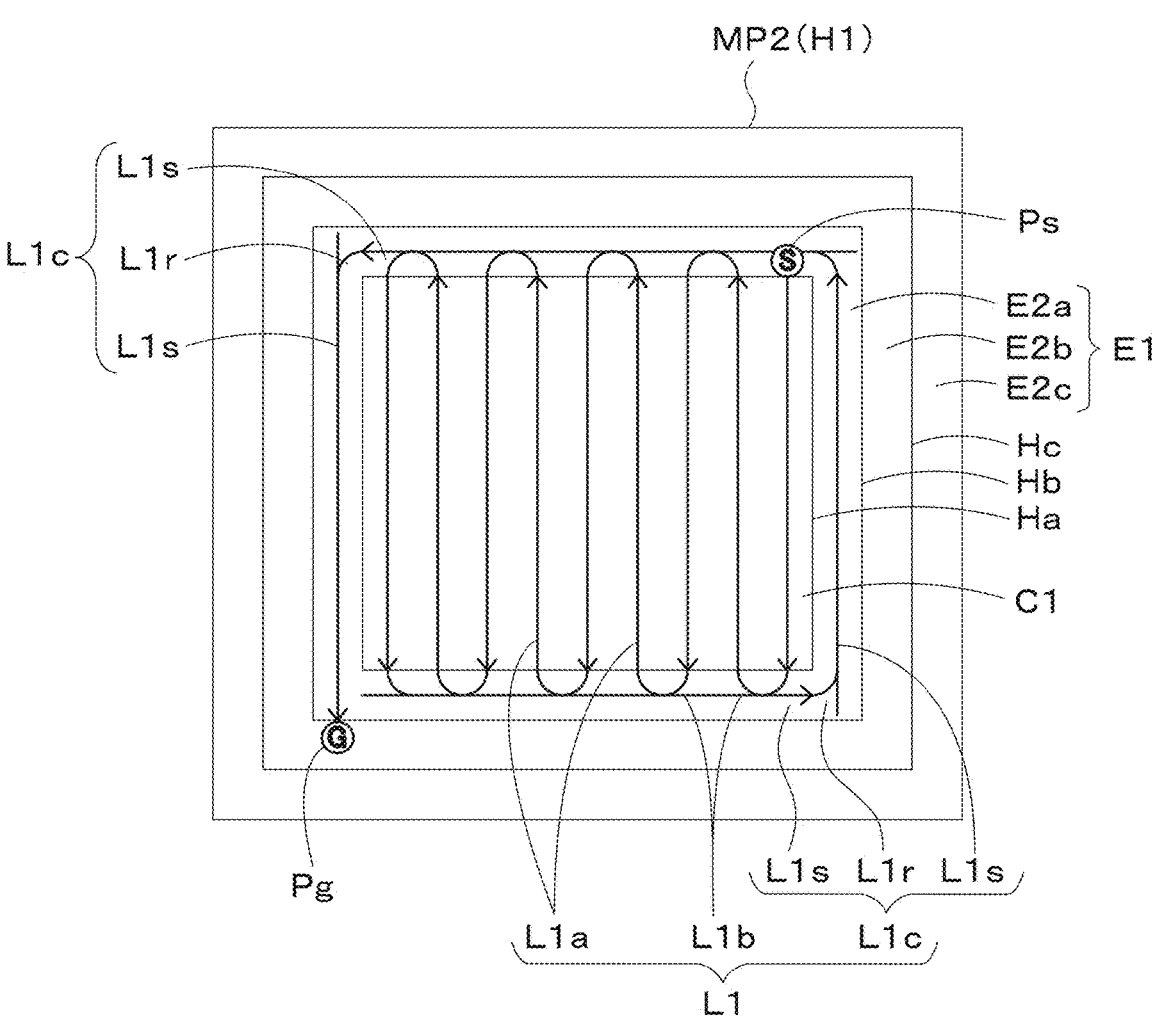
FIG. 11D is a view for explaining a method for setting an area and a traveling route.

On the other hand, on the route creation 1 screen D6 of FIG. 9, working in the central area C1 is selected by the automatic central work key B43a, working in the headland is selected by the automatic headland work key B43b, and the adjacent work is selected by the work type key B44. In this case, the route creator 51c creates, in the headland area E1, a circling route L1c circling outside the central area C1 as illustrated in FIG. 11D in addition to the straight traveling route L1a and the turning route L1b. For example, as illustrated in FIG. 10A, in a case where the number of automatic driving headlands is set to 1 on the route creation 2 screen D7, the route creator 51c creates the circling route L1c in the headland E2a closest to the central area C1 among the headlands E2a, E2b, and E2c set one or more rounds outside the central area C1 by the area setter 51b.

The circling route L1c is a work route along which ground work is performed by the working device 2 while the traveling body 3 of the agricultural machine 1 automatically travels. The circling route L1c includes a plurality of straight traveling routes L1s, which are substantially linear, and a plurality of turning routes L1r, which are curved with a predetermined radius of curvature or more. The plurality of straight traveling routes L1s are created on a central line of the headland E2a in a width direction so as to correspond to linear portions of the contour Ha of the central area C1. The turning route L1r is a route along which the agricultural machine 1 (the traveling body 3) and the working device 2 turn from one straight traveling route L1s toward another straight traveling route L1s adjacent to the one straight traveling route L1s in an extending direction of the one straight traveling route L1s. The one straight traveling route L1s and the other straight traveling route L1s have different extending directions, but a terminal end of the one straight traveling route L1s and a start end of the other straight traveling route L1s are connected by the turning route L1r. Also when creating the turning route L1r, the route creator 51c secures, in the headland area E1, a turning space in which the traveling body 3 of the agricultural machine 1 and the working device 2 turn. Details of this turning space will also be described later.

In FIG. 11D and other drawings, a simple arc-shaped turning route L1*b* is illustrated for convenience of illustration. The agricultural machine 1 and the like may draw a track having a more complicated shape than the arc shape by not only traveling forward but also traveling rearward or turning plural times when actually turning from the one straight traveling route L1*s* toward the other straight traveling route L1*s*. That is, the turning route L1*r* is a route for display on the display operator 52, and the agricultural machine 1 does not necessarily turn on the basis of the turning route L1*r*. The route creator 51*c* may create the turning route L1*r* in a shape other than the arc shape.

A gradually curved portion (a curved route, not illustrated) with less than a predetermined radius of curvature may be included in the circling route L1*c* in addition to the straight traveling route L1*s* and the turning route L1*r* depending on a shape of the contour H1 of the agricultural field (for example, in a case where the contour H1 of the agricultural field is distorted). In this case, the automatic controller 61 may cause the working device 2 to perform ground work while the traveling body 3 is automatically traveling on the basis of the straight traveling route L1*s* or the gradual curved portion of the circling route L1*c*. That is, the straight traveling route L1*s* and the gradual curved portion are work routes.

The automatic controller 61 causes the raising/lowering device 8 to raise the working device 2 so that ground work using the working device 2 is stopped when causing the traveling body 3 to turn in a portion corresponding to the turning route L1*r*, that is, when causing the traveling body 3 to turn from the one straight traveling route L1*s* toward the other straight traveling route L1*s*. The automatic controller 61 also causes the raising/lowering device 8 to raise the working device 2 so that ground work using the working device 2 is stopped when causing the traveling body 3 to turn from one straight traveling route L1*a* in the central area C1 toward one straight traveling route L1*s* in the headland area E1.

The headland E2*a* in which the circling route L1*c* has been created as described above is a work area where ground work is performed by the working device 2 while the traveling body 3 circles outside the central area C1. In another example, the route creator 51*c* may also create a circling route in the other headlands E2*b* and E2*c* outside the headland E2*a*. Furthermore, a key for inputting the number of headlands where a circling route is to be created may be prepared on the route creation 2 screen D7.

Furthermore, the route creator 51*c* may create a circling route that circles plural times in at least one of the plurality of headlands E2*a*, E2*b*, and E2*c* or may create a circling route so that the circling route passes both of one headland and another headland that are adjacent. That is, the route creator 51*c* may create, in the headland area E1, a circling route that circles around the central area C1 the number of times equal to or larger than the number of headlands.

After creating the circling route L1*c*, the route creator 51*c* sets a start position Ps at an end portion of one straight traveling route L1*a* that is not connected to the turning route L1*b* (an upper end portion of a right-end straight traveling route L1*a* in FIG. 11D) among end portions of the straight traveling routes L1*a* at both ends (left and right ends in FIG. 11D) of the central area C1, and connects the circling route L1*c* to an end portion of the other straight traveling route L1*a* (a lower end portion of a left-end straight traveling route L1*a* in FIG. 11D). Furthermore, the route creator 51*c* sets a goal position Pg at an end portion of the circling route L1*c* that is not connected to the straight traveling route L1*a*. Then, the route creator 51*c* causes information indicative of the areas C1 and E1, the traveling route L1, the start position Ps, the goal position Pg, and the turning space to be stored as route information in the internal memory.

Figure 12:
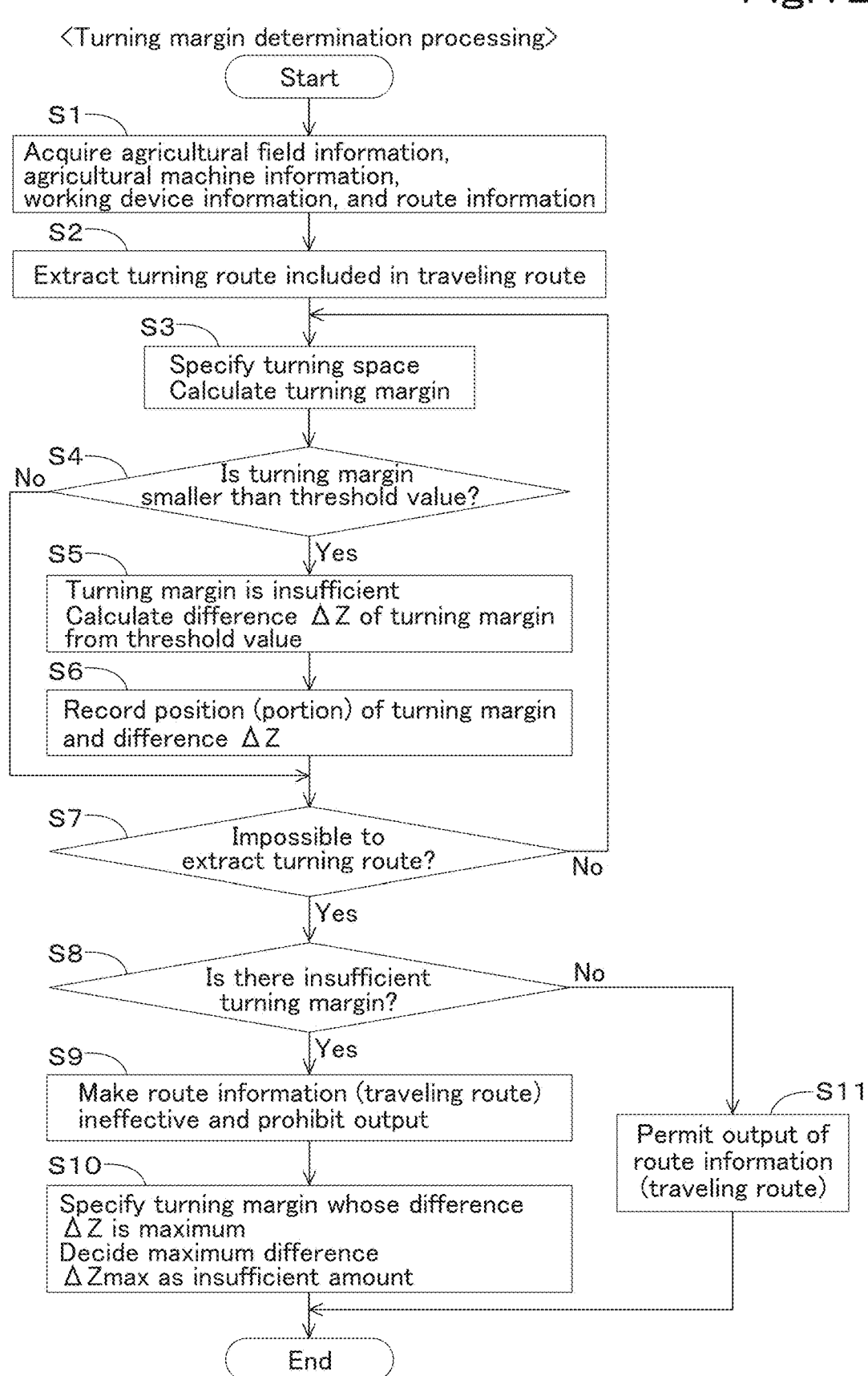
FIG. 12 is a flowchart of turning margin determination processing.

When the traveling route L1 is created by the route creator 51*c*, the turning margin calculator 51*d* performs turning margin determination processing. The turning margin determination processing is processing to determine whether or not a turning margin, which is a size of the turning space, is insufficient. FIG. 12 is a flowchart illustrating a procedure of the turning margin determination processing.

In FIG. 12, first, the turning margin calculator 51*d* acquires (reads out) agricultural field information, information on the agricultural machine 1, information on the working device 2, and route information from the internal memory of the controller 51 or the storage 53 (S1). Next, the turning margin calculator 51*d* extracts the turning route L1*b* or L1*r* by tracing the traveling route L1 included in the route information starting from the start position Ps (S2). Then, every time the turning route L1*b* or L1*r* is extracted, the turning margin calculator 51*d* specifies a turning space where the turning route L1*b* or L1*r* has been formed, and calculates a turning margin indicative of a size of the turning space thus specified (S3). In this step, the turning margin calculator 51*d* calculates the turning margin of the specified turning space on the basis of the dimension information of the agricultural machine 1 and the working device 2 included in the information acquired in step S1, position information of the specified turning space, and the like.

Figure 13A:
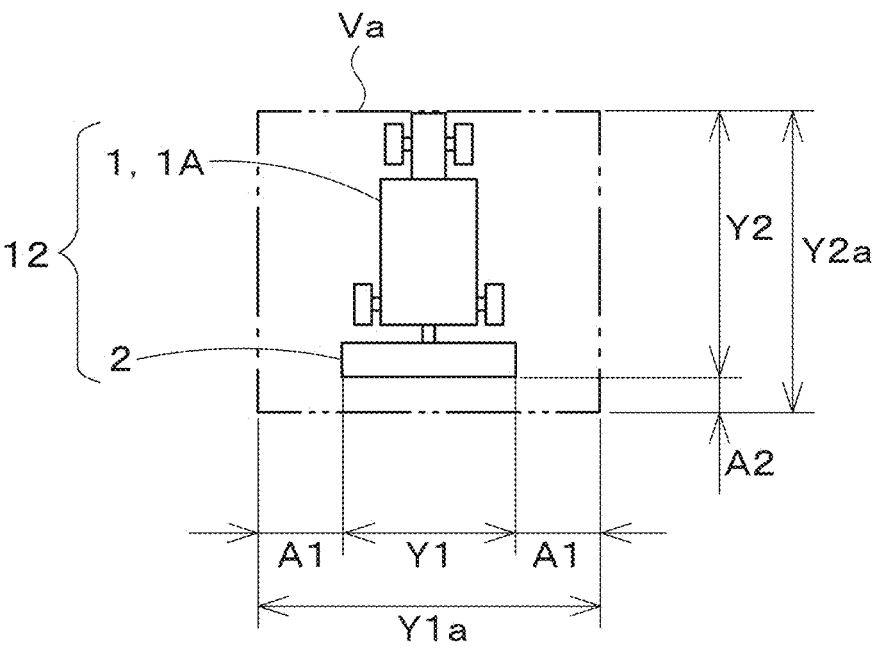
FIG. 13A illustrates a safe space of a manned agricultural machine.
Figure 13B:
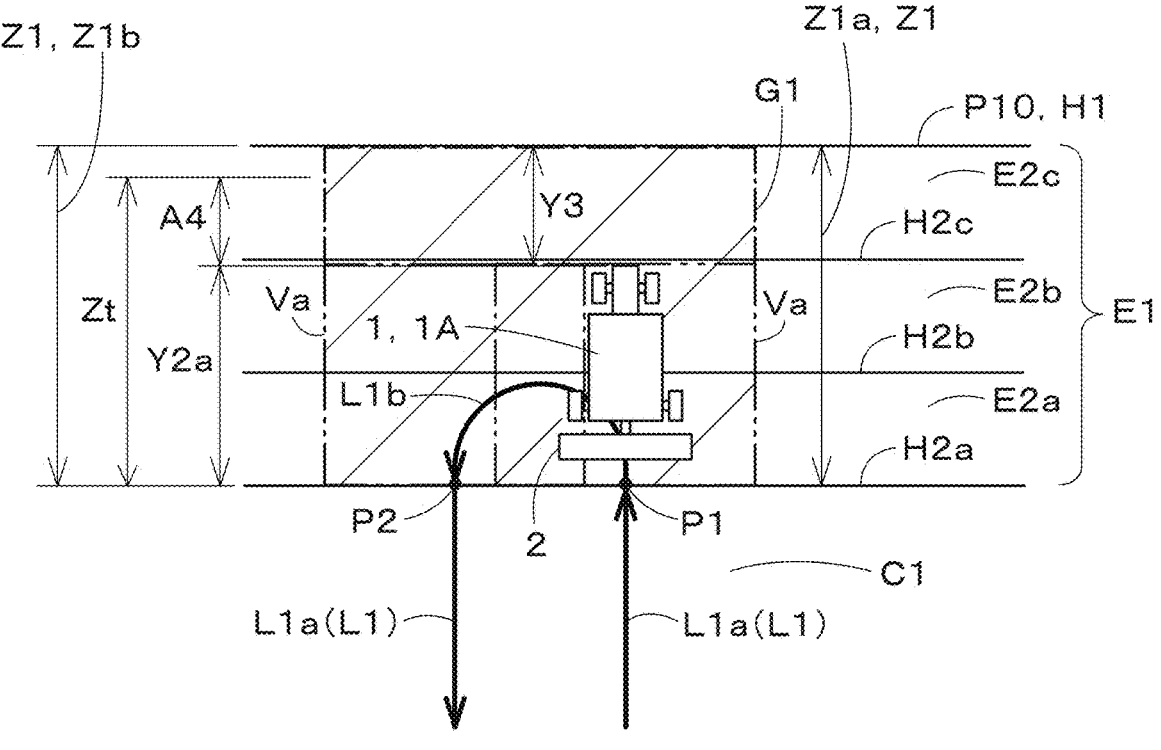
FIG. 13B illustrates a turning space and a turning margin for the manned agricultural machine.
Figure 13C:
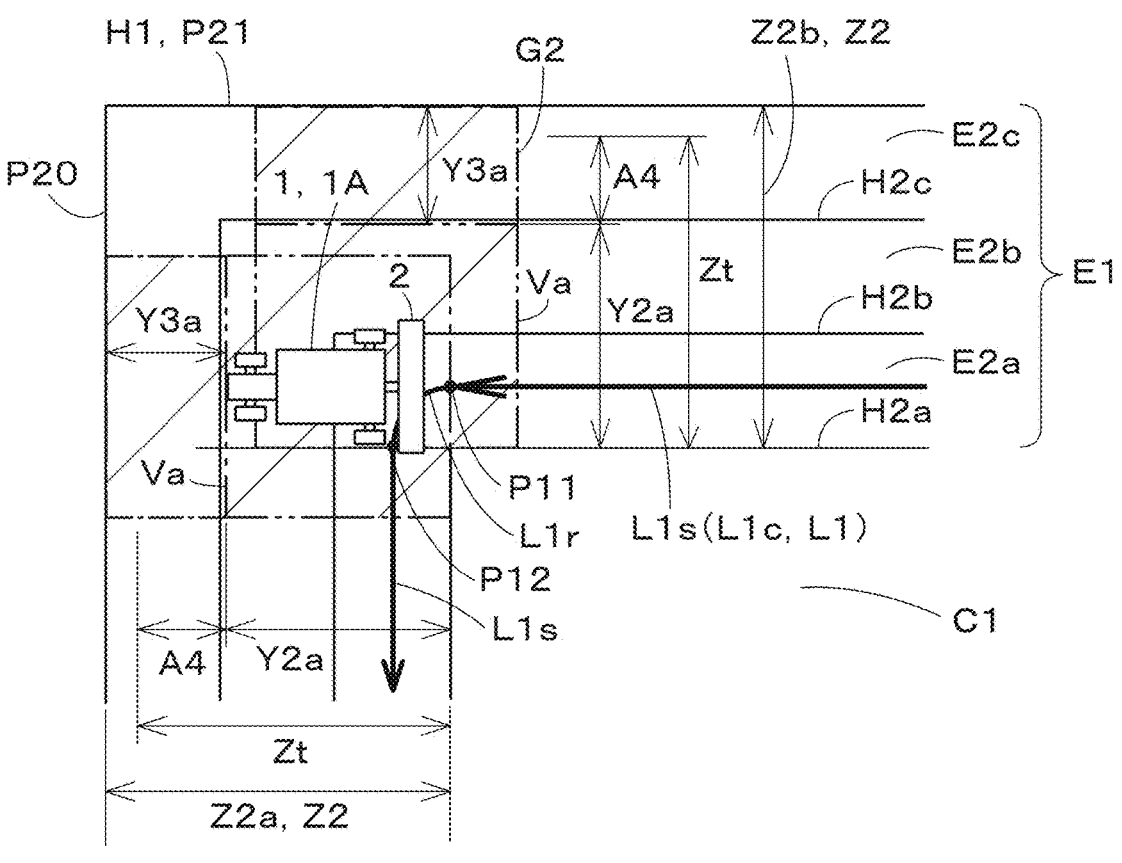
FIG. 13C illustrates another turning space and another turning margin for the manned agricultural machine.

FIG. 13A illustrates a safe space Va in a case where the agricultural machine 1 is a manned agricultural machine 1A. FIG. 13B illustrates a turning space G1 and a turning margin Z1 for creating the turning route L1*b* protruding from the central area C1 in a case where the agricultural machine 1 is the manned agricultural machine 1A. FIG. 13C illustrates a turning space G2 and a turning margin Z2 for creating the turning route L1*r* included in the circling route L1*c* in a case where the agricultural machine 1 is the manned agricultural machine 1A.

In a case where the agricultural machine 1 is the manned agricultural machine 1A that can operate on the basis of operation of the operation device 62 by a driver on the operator's seat 10 (FIG. 18), the route creator 51*c* calculates a virtual width Y1*a* by enlarging an entire width (in FIG. 13A, the entire width of the working device 2) Y1 of an agricultural work apparatus 12 leftward and rightward by a predetermined first safety margin A1 (Y1*a*=Y1+A1×2), for example, as illustrated in FIG. 13A. Note that the agricultural work apparatus 12 includes the agricultural machine 1, 1A and the working device 2 coupled to the agricultural machine 1, 1A. Furthermore, the route creator 51*c* calculates a virtual length Y2*a* by enlarging an entire length Y2 of the agricultural work apparatus 12 rearward by a predetermined second safety margin A2 (Y2*a*=Y2+A2). Note that in FIG. 13A, the entire length Y2 is a length from a front end (an end of the traveling body 3 on an opposite side to the working device 2) of the traveling body 3 of the agricultural machine 1 to a rear end (an end of the working device 2 on an opposite side to the traveling body 3) of the working device 2 coupled to a rear side of the traveling body 3 by the couplers 8*h* and 8*g*. The route creator 51*c* calculates a rectangular safe space Va defined by the virtual width Y1*a* and the virtual length Y2*a*. The safe space Va is a space secured between the agricultural work apparatus 12 and a surrounding object for a safety reason (the same can be said as for a safe space Vb, which will be described later).

As illustrated in FIG. 13B, in a case where the turning route L1$b$ is created from one straight traveling route L1$a$ to another straight traveling route L1$a$ created in the central area C1, the route creator 51$c$ disposes the safe space Va from a terminal end P1 of the one straight traveling route L1$a$ toward a closest end P10 of the agricultural field map MP2 that is present in a traveling direction of this straight traveling route L1$a$. Furthermore, the route creator 51$c$ disposes the safe space Va from a start end P2 of the other straight traveling route L1$a$ toward the closest end P10 of the agricultural field map MP2 that is present on an opposite direction to the traveling direction of this straight traveling route L1$a$. Then, the route creator 51$c$ secures, as the turning space G1 (the hatched range), a portion which at least one of the two disposed safe spaces Va covers (within the safe space Va) and a range to the end P10 of the agricultural field map MP2. In this way, the turning space G1 is secured in the headland area E1. Furthermore, the route creator 51$c$ creates, in the turning space G1, the turning route L1$b$ from the one straight traveling route L1$a$ toward the other straight traveling route L1$a$.

Then, the turning margin calculator 51$d$ calculates, as the turning margin Z1 of the turning space G1, a width Z1$a$ of the turning space G1 that expands from the terminal end P1 of the one straight traveling route L1$a$ toward the traveling direction of the one straight traveling route L1$a$ or a width Z1$b$ of the turning space G1 that expands from the start end P2 of the other straight traveling route L1$a$ toward the opposite direction to the traveling direction of the other straight traveling route L1$a$. Specifically, the turning margin calculator 51$d$ calculates, as the width Z1$a$ or Z1$b$ of the turning space G1 and the turning margin Z1, a value obtained by adding the virtual length Y2$a$ of the safe space Va and an excess margin Y3, which is a distance from the safe space Va to the end P10 of the agricultural field map MP2 (Z1$a$=Y2$a$+Y3=Z1, Z1$b$=Y2$a$+Y3=Z1). In the example of FIG. 13B, the width Z1$a$ and the width Z1$b$ of the turning space G1 are the same value (Z1$a$=Z1$b$=Z1) since a distance from the terminal end P1 of the one straight traveling route L1$a$ to the closest end P10 of the agricultural field map MP2 and a distance from the start end P2 of the other straight traveling route L1$a$ to the closest end P10 of the agricultural field map MP2 are the same.

As illustrated in FIG. 13C, in a case where the turning route L1$r$ is created from one straight traveling route L1$s$ toward another straight traveling route L1$s$ on the circling route L1$c$ created in the headland area E1, the route creator 51$c$ disposes the safe space Va from a terminal end P11 of the one straight traveling route L1$s$ toward a closest end P20 of the agricultural field map MP2 that is present in a traveling direction of this straight traveling route L1$s$. Furthermore, the route creator 51$c$ disposes the safe space Va from a start end P12 of the other straight traveling route L1$s$ toward a closest end P21 of the agricultural field map MP2 that is present in an opposite direction to the traveling direction of this straight traveling route L1$s$. Then, the route creator 51$c$ secures, as the turning space G2 (the hatched range), a portion which at least one of the two disposed safe spaces Va covers and a range from this portion to the ends P20 and P21 of the agricultural field map MP2. In this case, the turning space G2 is secured in the headland area E1. Furthermore, the route creator 51$c$ creates, in the turning space G2, the turning route L1$r$ from the one straight traveling route L1$s$ toward the other straight traveling route L1$s$.

Then, the turning margin calculator 51$d$ calculates, as the turning margin Z2 of the turning space G2, a width Z2$a$ of the turning space G2 that expands from the terminal end P11 of the one straight traveling route L1$s$ toward the traveling direction of the one straight traveling route L1$s$ or a width Z2$b$ of the turning space G2 that expands from the start end P12 of the other straight traveling route L1$s$ toward the opposite direction to the traveling direction of the other straight traveling route L1$s$. Specifically, the turning margin calculator 51$d$ calculates, as the width Z2$a$ or Z2$b$ of the turning space G2 and the turning margin Z2, a value obtained by adding the virtual length Y2$a$ of the safe space Va and an excess margin Y3$a$, which is a distance from the turning space G2 to the end P20, P21 of the agricultural field map MP2 (Z2$a$=Y2$a$+Y3$a$=Z2, Z2$b$=Y2$a$+Y3$a$=Z2). Also in the example of FIG. 13, the width Z2$a$ and the width Z2$b$ of the turning space G2 are the same value (Z2$a$=Z2$b$=Z2) since a distance from the terminal end P11 of the one straight traveling route L1$s$ to the closest end P20 of the agricultural field map MP2 and a distance from the start end P12 of the other straight traveling route L1$s$ to the closest end P21 of the agricultural field map MP2 are the same.

Figure 14A:
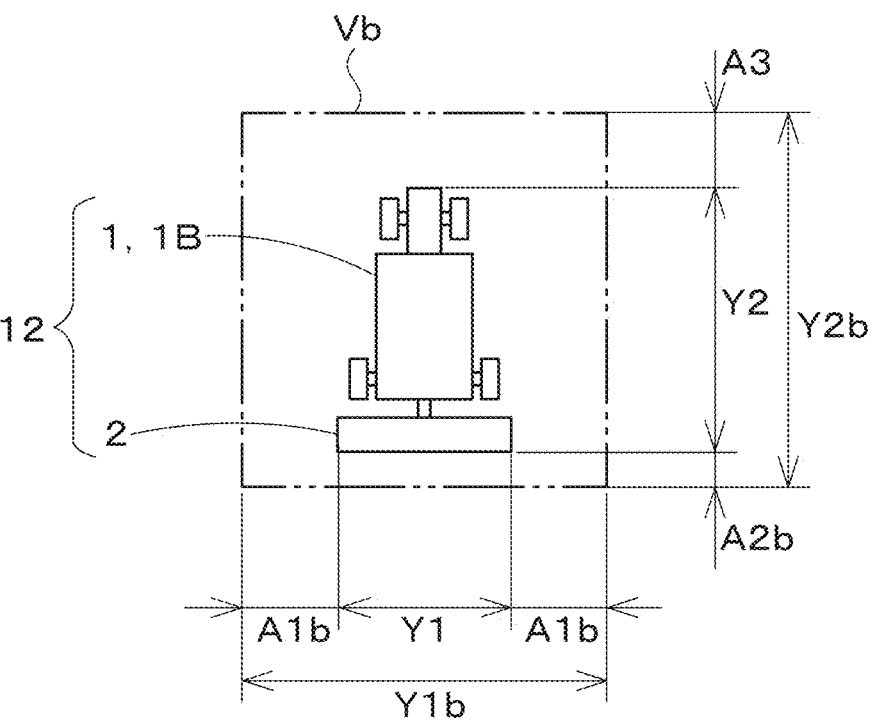
FIG. 14A illustrates a safe space for an unmanned agricultural machine.
Figure 14B:
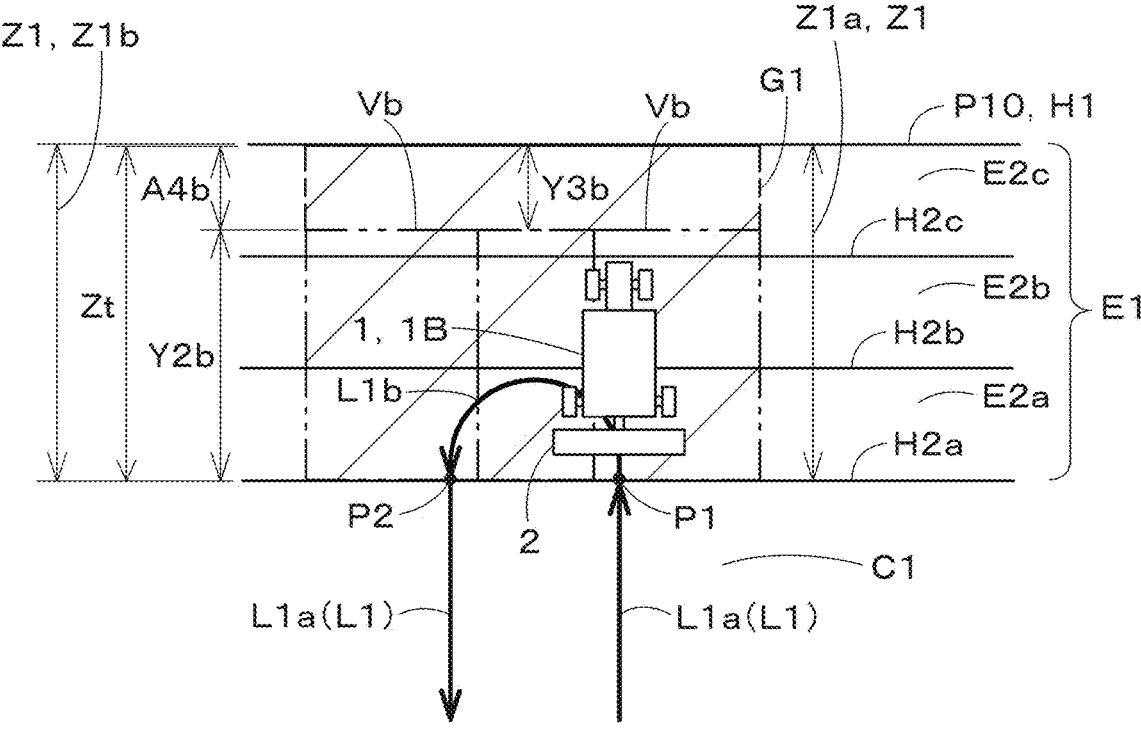
FIG. 14B illustrates a turning space and a turning margin for the unmanned agricultural machine.
Figure 14C:
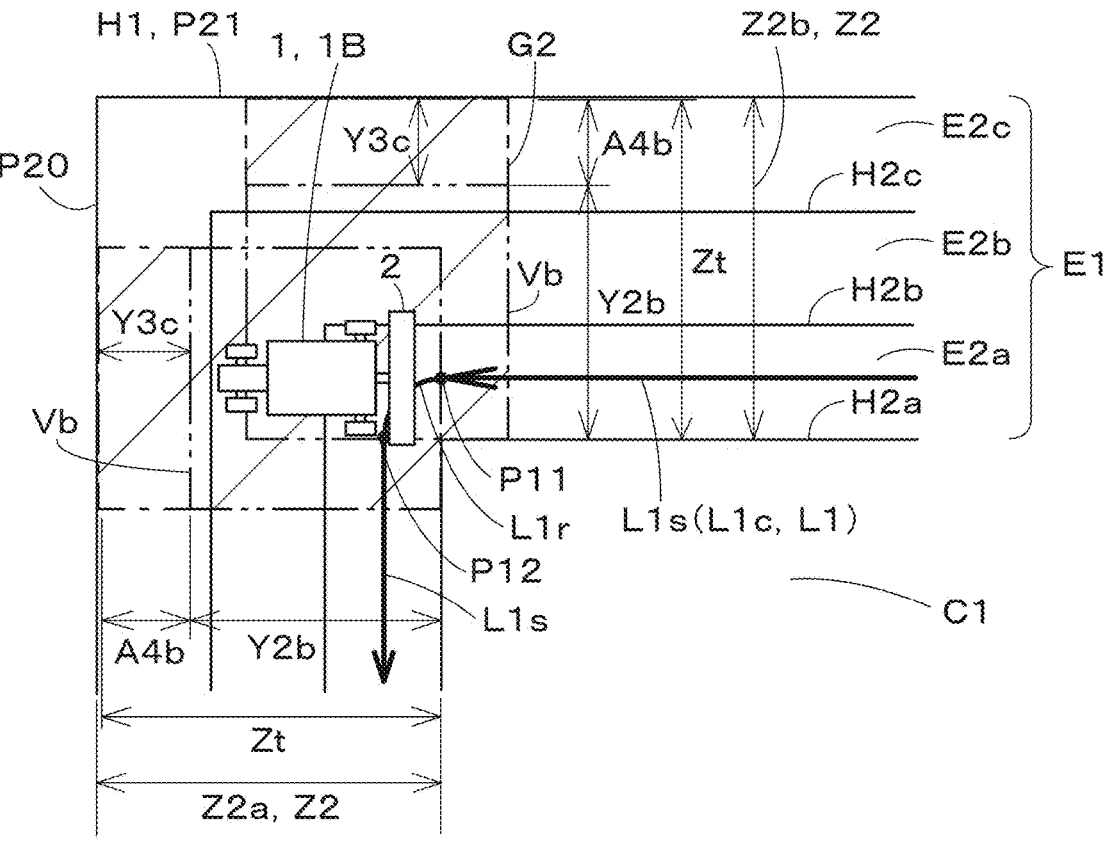
FIG. 14C illustrates another turning space and another turning margin for the unmanned agricultural machine.

FIG. 14A illustrates the safe space Vb in a case where the agricultural machine 1 is an unmanned agricultural machine 1B. FIG. 14B illustrates the turning space G1 and the turning margin Z1 in a case where the agricultural machine 1 is the unmanned agricultural machine 1B. FIG. 14C illustrates another turning space G2 and another turning margin Z2 in a case where the agricultural machine 1 is the unmanned agricultural machine 1B.

In a case where the agricultural machine 1 is the unmanned agricultural machine (autonomous agricultural machine) 1B that can automatically operate without person's operation, the route creator 51$c$ calculates a virtual width Y1$b$ by expanding the entire width Y1 of the agricultural work apparatus 12 leftward and rightward by a predetermined first safety margin A1$b$, for example, as illustrated in FIG. 14A (Y1$b$=Y1+A1$b$×2). Furthermore, the route creator 51$c$ calculates a virtual length Y2$b$ by expanding the entire length Y2 of the agricultural work apparatus 12 rearward by a predetermined second safety margin A2$b$ and expanding the entire length Y2 of the agricultural work apparatus 12 forward by a predetermined third safety margin A3 (Y2$b$=Y2+A2$b$+A3).

The safety margins A1$b$ and A2$b$ of the unmanned agricultural machine 1 are set larger than the safety margins A1 and A2 of the manned agricultural machine 1A. As the third safety margin A3, a detection distance from a front end of the unmanned agricultural machine 1B to a position where an object detector 64$a$ (FIG. 1) provided in the agricultural machine 1B can detect an object present in the traveling direction (ahead) of the agricultural machine 1B is set. Similarly, as the other safety margins A1$b$ and A2$b$, a detection distance from a left or right end or a rear end of the unmanned agricultural machine 1B to a position where the object detector 64$a$ can detect an object on the left or right or behind the agricultural machine 1B may be set. The route creator 51$c$ calculates a rectangular safe space Vb defined by the virtual width Y1$b$ and the virtual length Y2$b$.

In a case where the turning route L1$b$ is created as illustrated in FIG. 14B, the route creator 51$c$ disposes the safe space Vb from the terminal end P1 of the one straight traveling route L1$a$ toward the end P10 of the agricultural field map MP2 that is present in the traveling direction of the straight traveling route L1$a$. Furthermore, the route creator 51$c$ disposes the safe space Vb from the start end P2 of the other straight traveling route L1$a$ toward the end P10 of the agricultural field map MP2 that is present in an opposite direction to the traveling direction of this straight traveling route L1$a$. Then, the route creator 51$c$ secures, as the turning space G1 (the hatched range), a portion which at least one of the two disposed safe spaces Vb covers (within the safe space Vb) and a range to the closest end P10 of the agricultural field map MP2. The turning margin calculator 51$d$ calculates a width Z1$a$ or a width Z1$b$ of the turning space G1 as the turning margin Z1. Specifically, the turning margin calculator 51$d$ calculates, as the width Z1$a$ or Z1$b$ of the turning space G1 and the turning margin Z1, a value obtained by adding the virtual length Y2$b$ of the safe space Vb and an excess margin Y3$b$, which is a distance from the safe space Vb to the end P10 of the agricultural field map MP2 (Z1$a$=Y2$b$+Y3$b$=Z1, Z1$b$=Y2$b$+Y3$b$=Z1).

In a case where the turning route L1$r$ is created as illustrated in FIG. 14C, the route creator 51$c$ disposes the safe space Vb from the terminal end P11 of the one straight traveling route L1$s$ toward the end P20 of the agricultural field map MP2. Furthermore, the route creator 51$c$ disposes the safe space Vb from the start end P12 of the other straight traveling route L1$s$ toward the end P21 of the agricultural field map MP2. Then, the route creator 51$c$ secures, as turning space G2 (the hatched range), a range from a portion which at least one of the two safe spaces Va covers to the ends P20 and P21 of the agricultural field map MP2. The turning margin calculator 51$d$ calculates a width Z2$a$ or a width Z2$b$ of the turning space G2 as the turning margin Z2. Specifically, the turning margin calculator 51$d$ calculates, as the width Z2$a$ or Z2$b$ of the turning space G2 and the turning margin Z2, a value obtained by adding the virtual length Y2$b$ of the safe space Vb and an excess margin Y3$c$, which is a distance from the safe space Vb to the end P20 or P21 of the agricultural field map MP2 (Z2$a$=Y2$b$+Y3$c$=Z2, Z2$b$=Y2$b$+Y3$c$=Z2).

In the above example, the route creator 51$c$ virtually disposes the safe space Va, Vb between the terminal end P1, P11 of one of adjacent straight traveling routes L1$a$, L1$s$ and the end P10, P20 of the agricultural field map MP2 and between the start end P2, P12 of the other one of the adjacent straight traveling routes L1$a$, L1$s$ and the end P21 of the agricultural field map MP2. Alternatively, the route creator 51$c$ may virtually dispose the safe space Va, Vb between the terminal end P1, P11 of the one straight traveling route L1$a$, L1$s$ and the end P10, P20 of the agricultural field map MP2 or between the start end P2, P12 of the other straight traveling route L1$a$, L1$s$ and the end P21 of the agricultural field map MP2.

Furthermore, the route creator 51$c$ may secure a turning space by combining the safe space Va, Vb and a space from the safe space Va, Vb to the end P10, P20, P21 of the agricultural field map MP2. Furthermore, the turning margin calculator 51$d$ may calculate, as turning margin Z1, Z2, a width of the turning space (i.e., the width Z1$a$ or the width Z1$b$ of the turning space where the turning route L1$b$ is created or the width Z2$a$ or the width Z2$b$ of the turning space where the turning route L1$r$ is created).

Figure 15A:
FIG. 15A illustrates a turning space and a turning margin in an irregular agricultural field map for the manned agricultural machine.
Figure 15B:
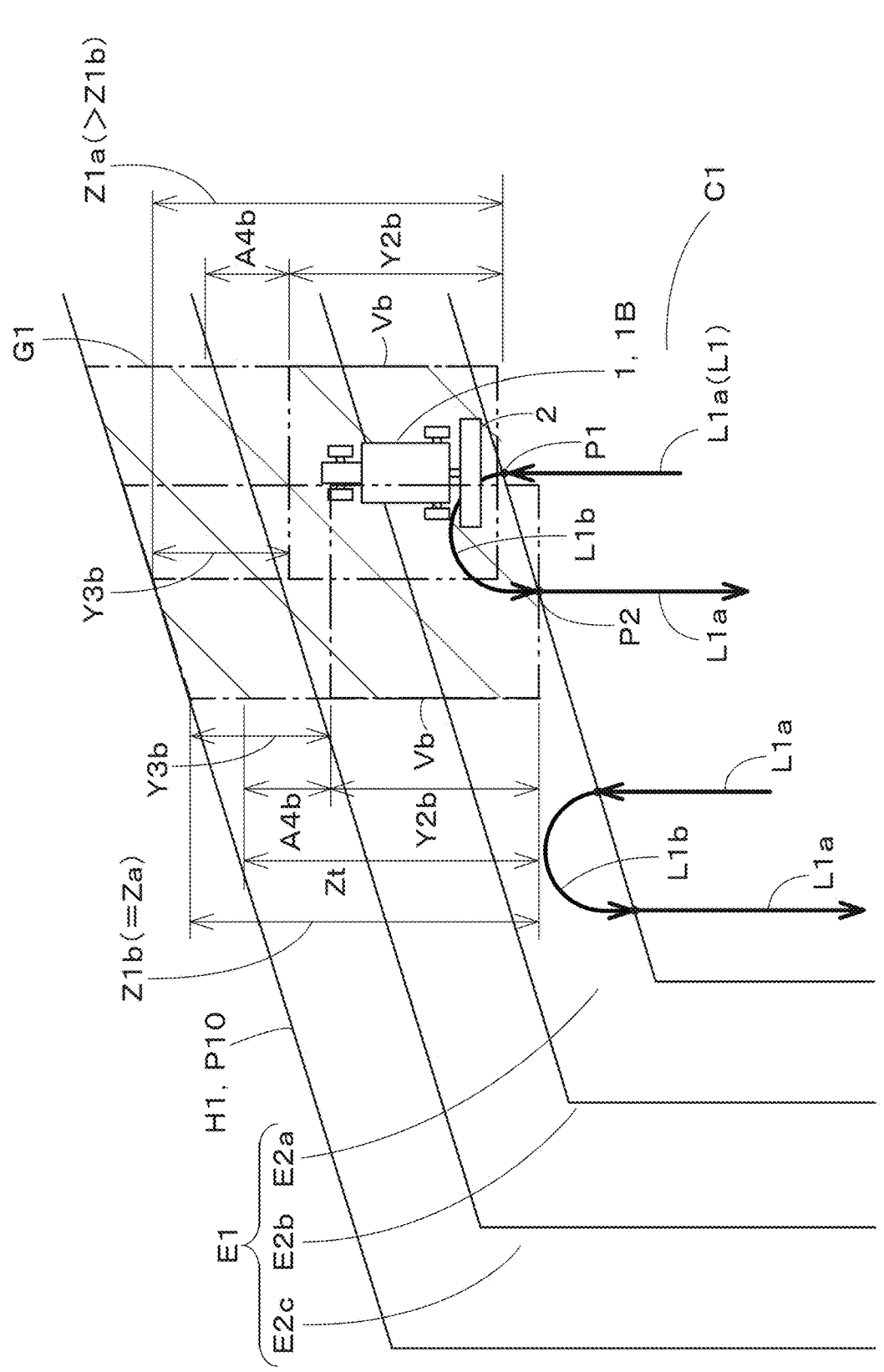
FIG. 15B illustrates a turning space and a turning margin in an irregular agricultural field map for the unmanned agricultural machine.

In a case where the contour H1 of the agricultural field map MP2 (the agricultural field) is not rectangular but an irregular shape, the route creator 51$c$ sometimes creates the straight traveling route L1$a$ so that the straight traveling route L1$a$ is inclined at an angle smaller than 90° with respect to one side of the contour H1 of the agricultural field map MP2 depending on a direction in which the traveling route L1 is created (a work direction of the route creation 2 screen D of FIG. 10A and other drawings), for example, as illustrated in FIGS. 15A and 15B.

FIG. 15A illustrates a turning space G1 and a turning margin Z1 on an agricultural field map having an irregular shape in a case where the agricultural machine 1 is the manned agricultural machine 1A. FIG. 15B illustrates a turning space G1 and a turning margin Z1 on an agricultural field map having an irregular shape in a case where the agricultural machine 1 is the unmanned agricultural machine 1B. One side of the contour H1 of the agricultural field map MP2 (the agricultural field) illustrated in FIGS. 15A and 15B is inclined at a predetermined angle with respect to an adjacent side. Also for such an irregular agricultural field map MP2 (the agricultural field), the turning space G1 is created by the route creator 51$c$, and the turning margin Z1 is calculated by the turning margin calculator 51$d$ in accordance with the manned or unmanned agricultural machine 1, in a similar manner to that described with reference to FIGS. 13A, 13B, 14A, and 14B.

In the above case, a first distance from the terminal end P1 of the one straight traveling route L1$a$ to a closest end P10 of the agricultural field map MP2 and a second distance from the start end P2 of the other straight traveling route L1$a$ to the closest end P10 of the agricultural field map MP2 are different. Accordingly, a width Z1$a$ of the turning space G1 corresponding to the first distance and a width Z1$b$ of the turning space G1 corresponding to the second distance are also different. In such a case, for example, the turning margin calculator 51$d$ may calculate, as the turning margin Z1, a smaller one of the widths Z1$a$ and Z1$b$ of the turning space G1. In the example illustrated in FIG. 15A, the turning margin calculator 51$d$ calculates the width Z1$b$ of the turning space G1 as the turning margin Z1 since the width Z1$b$ is smaller than the width Z1$a$.

Although a case where the turning space G1 and the turning margin Z1 for creating the turning route L1$b$ that protrudes from the central area C1 of the irregular agricultural field map MP2 are secured has been described above, the turning space G2 is secured by the route creator 51$c$ and the turning margin Z2 is calculated by the turning margin calculator 51$d$ (detailed description is omitted) in a similar manner to that described with reference to FIGS. 13 and 14 also in a case where the turning space G2 and the turning margin Z2 for creating the turning route L1$r$ are secured in the headland area E1 of the irregular agricultural field map MP2.

As described above, when the turning margin calculator 51$d$ calculates the turning margin Z1 or Z2 of the specified turning space G1 or G2 (S3 in FIG. 12), the turning margin calculator 51$d$ compares the turning margin Z1 or Z2 with a predetermined threshold value Zt. As the threshold value Zt, for example, a value (an ideal turning margin) that allows the agricultural machine 1 and the working device 2 to normally turn without going beyond the contour H1 of the agricultural field map MP2 (the agricultural field) or becoming unable to turn is set in advance on the basis of a result of design, a test, a simulation, or the like.

Specifically, in a case where the agricultural machine 1 is the manned agricultural machine 1A, a value obtained by adding the virtual length Y2$a$ of the safe space Va and a predetermined fourth safety margin A4 is set as the threshold value Zt (Zt=Y2$a$+A4=Y2+A2+A4), as illustrated in FIGS. 13B and 13C. On the other hand, in a case where the agricultural machine 1 is the unmanned agricultural machine 1B, a value obtained by adding the virtual length Y2$b$ of the safe space Vb and a predetermined fourth safety margin A4$b$ is set as the threshold value Zt (Zt=Y2$b$+A4$b$=Y2+A2+A3+A4$b$), as illustrated in FIGS. 14B and 14C. The fourth safety margins A4 and A4$b$ are, for example, values that vary depending on the entire length of the agricultural machine 1 (the traveling body 3). In this example, the fourth safety margins A4 and A4*b* are the same predetermined value (e.g., 1 m). In another example, the fourth safety margin A4 in a case where the agricultural machine 1 is the manned agricultural machine 1A and the fourth safety margin A4*b* in a case where the agricultural machine 1 is the unmanned agricultural machine 1B may be different values.

As illustrated in FIGS. 13B, 13C, 14B, and 14C, the turning margin Z1 or Z2 is a value obtained by adding the virtual length Y2*a* or Y2*b* and the excess margin Y3, Y3*a*, Y3*b*, or Y3*c* from the safe space Va or Vb to the end P10, P20, or P21 of the agricultural field map MP2. Accordingly, comparison between the turning margin Z1 or Z2 and the threshold value Zt by the turning margin calculator 51*d* is substantially comparison between the excess margin Y3, Y3*a*, Y3*b*, or Y3*c* and the fourth safety margin A4 or A4*b*.

In a case where the turning margin Z1 or Z2 is equal to or larger than the threshold value Zt (S4: NO in FIG. 12), the turning margin calculator 51*d* searches for a next turning route L1*b* or L1*r* included in the traveling route L1. In a case where the turning margin calculator 51*d* can extract a next turning route L1*b* or L1*r* (S7: NO), step S3 and subsequent steps are performed again.

On the other hand, in a case where the turning margin Z1 or Z2 is less than the threshold value Zt (S4: YES), the turning margin calculator 51*d* determines that the turning margin Z1 or Z2 is insufficient, and calculates a difference $\Delta Z$ ($\Delta Z=Zt-Z1$ or $\Delta Z=Zt-Z2$) of the turning margin Z1 or Z2 from the threshold value Zt (S5). Then, the turning margin calculator 51*d* detects a position (portion) where the turning margin Z1 or Z2 determined as being insufficient is present on the agricultural field map MP2 and causes the position and the calculated difference $\Delta Z$ to be stored in the internal memory of the controller 51 (S6). Then, the turning margin calculator 51*d* searches for a next turning route L1*b* or L1*r* included in the traveling route L1, and in a case where the turning margin calculator 51*d* can extract a next turning route L1*b* or L1*r* (S7: NO), step S3 and subsequent steps are performed again.

Then, when the turning margin calculator 51*d* finishes the determination about insufficiency for all turning routes L1*b* and L1*r* included in the traveling route L1 and extracts the goal position Pg, the turning margin calculator 51*d* determines that a next turning route L1*b* or L1*r* cannot be extracted (S7: YES). Then, the turning margin calculator 51*d* checks whether or not there is a turning margin Z1 or Z2 determined as being insufficient (whether or not there is a record of an insufficient turning margin Z1 or Z2) by referring to storage contents of the internal memory of the controller 51.

In a case where there is a turning margin Z1 or Z2 determined as being insufficient (S8: YES), the turning margin calculator 51*d* makes route information including the traveling route L1 ineffective, and prohibits output of the route information (S9). In this case, for example, the turning margin calculator 51*d* prohibits output of the route information by deleting the route information from the internal memory of the controller 51 and turning on a route output prohibition flag (not illustrated) provided in a predetermined storage region of the internal memory. Furthermore, the turning margin calculator 51*d* specifies a turning margin Z1 or Z2 whose difference $\Delta Z$ from the threshold value Zt is maximum ($\Delta Zmax$) from among the turning margin Z1 or Z2 determined as being insufficient, decides the maximum difference $\Delta Zmax$ as an insufficient amount, and causes a portion (position) where the specified turning margin Z1 or Z2 is present and the insufficient amount $\Delta Zmax$ to be stored in a predetermined region of the internal memory of the controller 51 (S10).

On the other hand, in a case where there is no turning margin Z1 or Z2 determined as being insufficient (S8: NO), the turning margin calculator 51*d* permits output of the route information including the traveling route L1 (S11). In this case, for example, the turning margin calculator 51*d* permits output of the route information by turning off the route output prohibition flag.

Figure 10C:
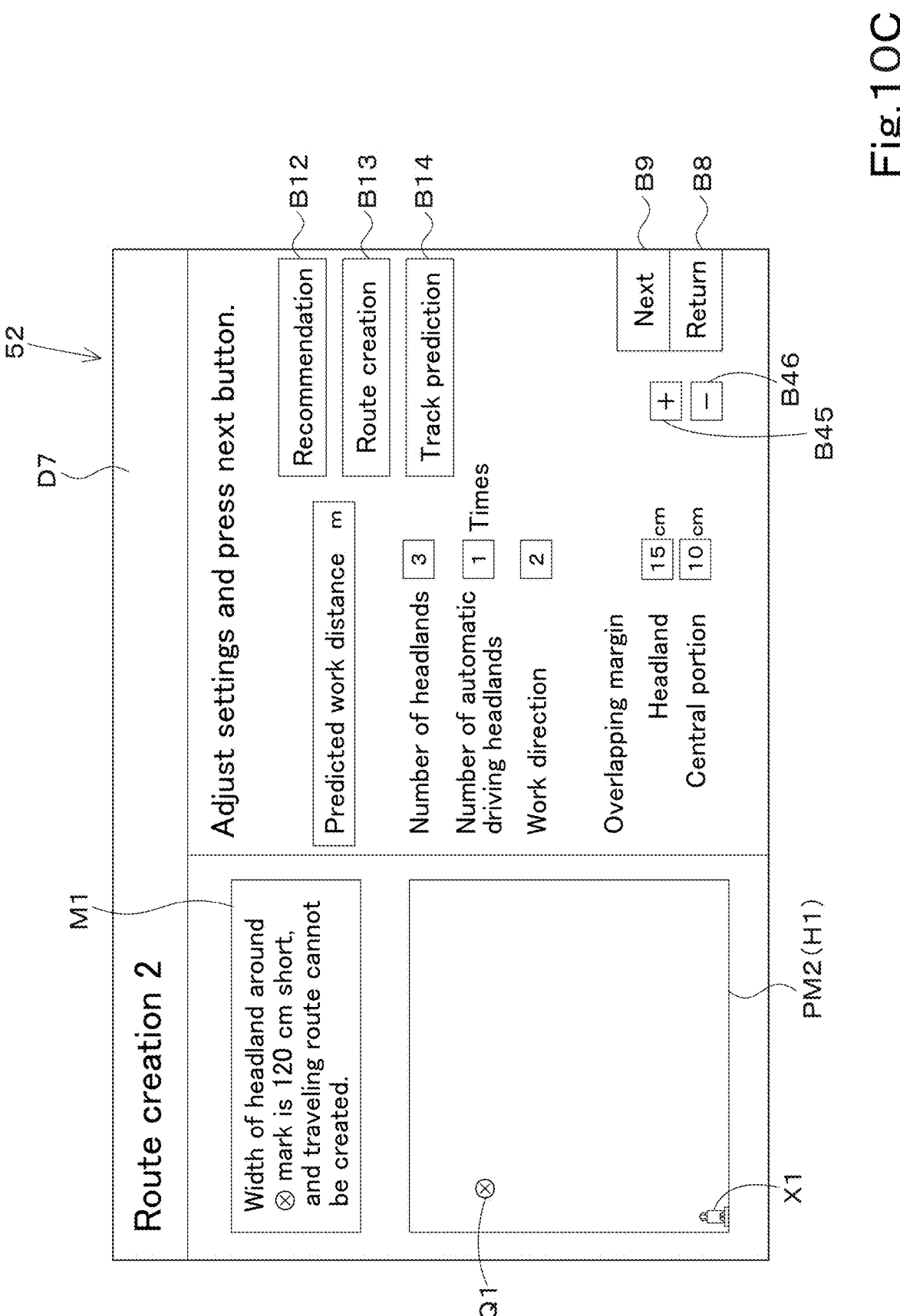
FIG. 10C illustrates notification on the route creation 2 screen.

After the turning margin determination processing is finished as described above, the notifier 51*g* reads out the position where the specified turning margin Z1 or Z2 is present and the insufficient amount $\Delta Zmax$ stored in the internal memory of the controller 51 in a case where the route information has been made ineffective and output of the route information has been prohibited (the route output prohibition flag has been turned on) (in a case where S9 and S10 of FIG. 12 have been executed). Then, the notifier 51*g* displays, for notification, a portion Q1 (the X mark in FIG. 10C) where the specified turning margin Z1 or Z2 is present on the agricultural field map MP2 of the route creation 2 screen D7, as illustrated in FIG. 10C. Furthermore, for notification, the notifier 51*g* displays, on the route creation 2 screen D7, a message M1 indicative of the insufficient amount $\Delta Zmax$ of the specified turning margin Z1 or Z2 and indicating that the traveling route L1 cannot be created due to insufficiency of the specified turning margin Z1 or Z2. In the example of FIG. 10C, a message M1 indicating that a width of a headland corresponding to the portion Q1 where the specified turning margin Z1 or Z2 is present among the headlands E2*a* to E2*c* (the headland area E1) is insufficient by 120 cm ($=\Delta Z$) and the traveling route L1 cannot be created is displayed on the route creation 2 screen D7. In this case, the traveling route L1 is not displayed on the route creation 2 screen D7.

The user understands the portion Q1 where the turning margin Z1 or Z2 is insufficient and that the traveling route L1 cannot be created due to insufficiency of the turning margin Z1 or Z2 by seeing the notifications Q1 and M1 displayed on the route creation 2 screen D7. Then, the user takes a measure such as widening the width of the headland area E1 (an interval between the contour Ha of the central area C1 and the contour H1 of the agricultural field map MP2), for example, by markedly changing a numerical value input in the input column for the number of headlands on the route creation 2 screen D7 so that the traveling route L1 is created again by the agricultural work assistance device 50. In addition to increasing the number of headlands, the user can take measures such as slightly changing a numerical value input in the input column for the headland lapping margin on the route creation 2 screen D7 and changing the dimension information of the agricultural machine 1 or the working device 2 on the previous screen D4*a* (FIG. 7A), or D4*c* (FIG. 7C).

On the other hand, in a case where output of the route information has been permitted (the route output prohibition flag has been turned off) (in a case where S11 of FIG. 12 has been performed), the controller 51 reads out the route information recorded in the internal memory, and causes the areas C1 and E1, the traveling route L1, the start position Ps, and the goal position Pg included in the route information to be displayed on the route creation 2 screen D7, as illustrated in FIG. 10B. Furthermore, the route creator 51*c* calculates a predicted work distance over which ground work is performed by the working device 2 while the traveling body 3 is traveling on the basis of all of the straight traveling routes L1*a* and L1*s* included in the traveling route L1. Then, the controller 51 causes the predicted work distance to be displayed on the route creation 2 screen D7.

After the traveling route L1 and others are displayed on the route creation 2 screen D7, the user selects the track prediction key B14. As a result, the controller 51 calculates a work portion where ground work is predicted to be performed by the working device 2 while the traveling body 3 is automatically traveling on the basis of the traveling route L1, that is, a predicted work track of the working device 2. Then, the controller 51 causes the predicted work track to be displayed on the traveling route L1 of the agricultural field map MP2 on the route creation 2 screen D7 (not illustrated).

Figure 16:
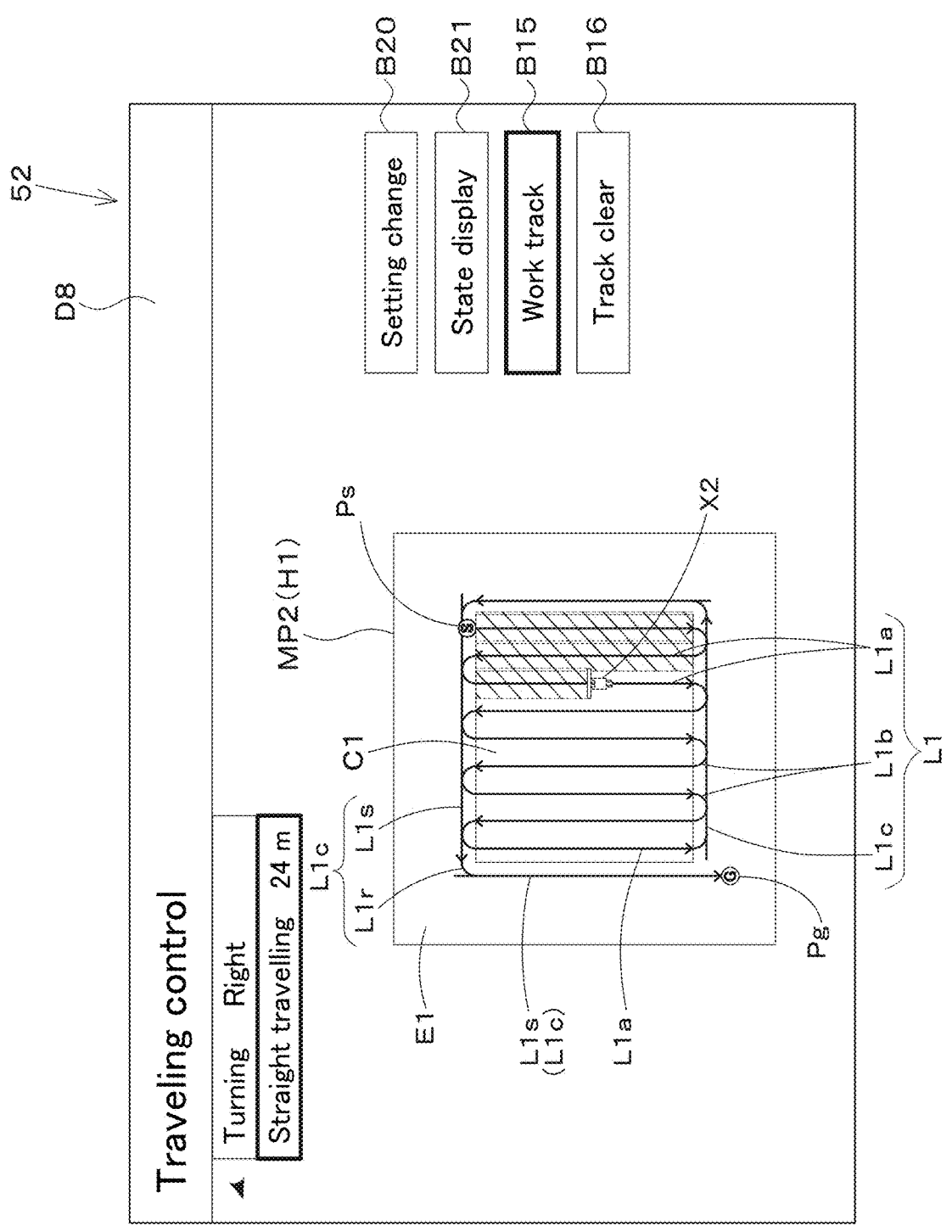
FIG. 16 illustrates an example of a traveling control screen.

When the user selects the next key B9 after the traveling route L1 and others are displayed on the route creation 2 screen D7, the controller 51 causes a traveling control screen D8 illustrated in FIG. 16 to be displayed on the display operator 52. Furthermore, the controller 51 generates automatic traveling data on the basis of the setting information stored in the internal memory and causes the communicator 54 to transmit (output) the automatic traveling data to the controller 60 of the agricultural machine 1. The automatic traveling data includes route information, the type of the working device 2, and automatic driving work information. Information on the traveling route L1 included in the route information includes information indicative of positions of the straight traveling routes L1*a* and L1*s*, which are work routes, and does not necessarily include information indicative of positions of the turning routes L1*b* and L1*r*.

The traveling control screen D8 illustrated in FIG. 16 is a screen on which a traveling state of the agricultural machine 1 and a work state of the working device 2 in the automatic traveling work mode are displayed. Note that in FIG. 16, the traveling state and the work state of the agricultural machine 1 some time after start of the automatic traveling work mode are displayed on the traveling control screen D8. On the traveling control screen D8, the agricultural field map MP2, the traveling route L1, the start position Ps, the goal position Pg, the agricultural machine mark X2, the traveling state of the agricultural machine 1, a setting change key B20, a state display key B21, a work track key B15, and a track clear key B16 are displayed.

The controller 51 causes the communicator 54 to acquire an actual position of the traveling body 3 detected by the positioning device 40 on a predetermined cycle, and causes the agricultural machine mark X2 to be displayed as needed at a position corresponding to the position of the traveling body 3 on the agricultural field map MP2. That is, the agricultural machine mark X2 on the traveling control screen D8 indicates the actual position of the traveling body 3 of the agricultural machine 1.

For example, the user manually drives the agricultural machine 1 to the start position Ps while viewing the traveling control screen D8 and then performs predetermined operation for shifting to the automatic traveling work mode by the mode switch 65 (FIG. 1). As a result, the automatic controller 61 (FIG. 1) shifts to the automatic traveling work mode and causes the working device 2 to perform ground work while allowing the traveling body 3 to automatically travel on the basis of the automatic traveling data received from the agricultural work assistance device 50 and the position of the traveling body 3 detected by the positioning device 40.

Specifically, the automatic controller 61 first reads the route information included in the automatic traveling data and understands the traveling route L1 (the work routes L1*a* and L1*s*), the start position Ps, and the goal position Pg. Then, the automatic controller 61 causes the working device 2 to perform ground work while allowing the traveling body 3 to automatically travel from the start position Ps on the basis of the straight traveling route L1*a* of the traveling route L1. When the traveling body 3 (the agricultural machine 1) reaches a terminal end of one straight traveling route L1*a*, the automatic controller 61 stops the ground work using the working device 2 once, raises the working device 2, and causes the traveling body 3 to turn toward a start end of adjacent another straight traveling route L1*a*. That is, the automatic controller 61 causes the agricultural machine 1 and the working device 2 to turn in a position corresponding to the turning route L1*b*. In this process, the automatic controller 61 causes the agricultural machine 1 and the working device 2 to turn on the basis of the position information of the areas C1 and E1, position information of the straight traveling route L1*a*, dimension information of the agricultural machine 1 and the working device 2, a position of the traveling body 3 detected by the positioning device 40, a detection result of the detector 64, and the like.

Then, when the traveling body 3 reaches the start end of the other straight traveling route L1*a*, the automatic controller 61 lowers the working device 2, and resumes the ground work using the working device 2 when the traveling body 3 starts to automatically travel on the basis of the other straight traveling route L1*a*. In this way, the traveling body 3 automatically travels straight back and forth in the central area C1, and ground work is performed on the central area C1 by the working device 2.

Then, the automatic controller 61 causes the working device 2 to perform ground work while allowing the traveling body 3 to automatically travel on the basis of the circling route L1*c* and the position of the traveling body 3. In this process, the automatic controller 61 causes the working device 2 to perform ground work while allowing the traveling body 3 to automatically travel on the basis of the straight traveling route L1*s*, and stops the ground work using the working device 2 by raising the working device 2 while the traveling body 3 is turning in a portion corresponding to the turning route L1*r*. In this turning, the automatic controller 61 causes the agricultural machine 1 and the working device 2 to turn on the basis of the position information of the areas C1 and E1, the position information of the straight traveling route L1*s*, the dimension information of the agricultural machine 1 and the working device 2, the position of the traveling body 3 detected by the positioning device 40, a detection result of the detector 64, and the like. In this way, the traveling body 3 automatically circles outside the central area C1, and the working device 2 performs ground work on the headland E2*a* (see, for example, FIG. 11D) that surrounds the central area C1.

FIGS. 17A to 17D are views for explaining automatic steering of the agricultural machine 1. In the automatic traveling work mode, the automatic controller 61 calculates a deviation between the position of the traveling body 3 detected by the positioning device 40 and the traveling route L1 (the work routes L1*a* and L1*s*) while allowing the traveling body 3 to automatically travel. In a case where the deviation is less than a threshold value (for example, FIG. 17A), the automatic controller 61 maintains a rotation angle of the steering shaft 31 (FIG. 1). In a case where the deviation between the position of the traveling body 3 and the traveling route L1 is equal to or larger than the threshold value and the traveling body 3 is located on the left relative to the traveling route L1 (for example, FIG. 17B), the automatic controller 61 rotates the steering shaft 31 so that the traveling body 3 is steered rightward. In a case where the deviation between the position of the traveling body 3 and the traveling route L1 is equal to or larger than the threshold value and the traveling body 3 is located on the right relative to the traveling route L1 (for example, FIG. 17C), the automatic controller 61 rotates the steering shaft 31 so that the traveling body 3 is steered leftward.

Figure 17A:
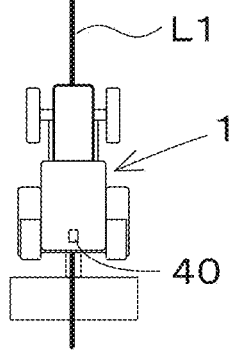
FIG. 17A is a view for explaining automatic driving of the agricultural machine.
Figure 17B:
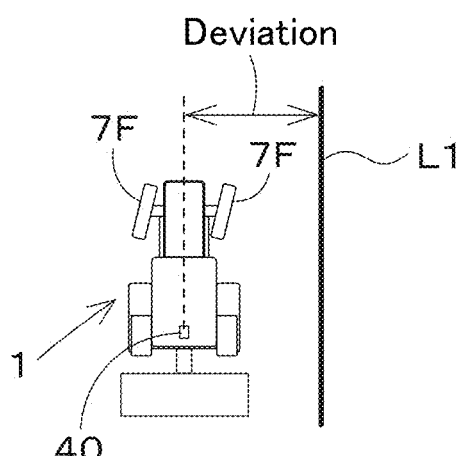
FIG. 17B is a view for explaining automatic driving of the agricultural machine.
Figure 17C:
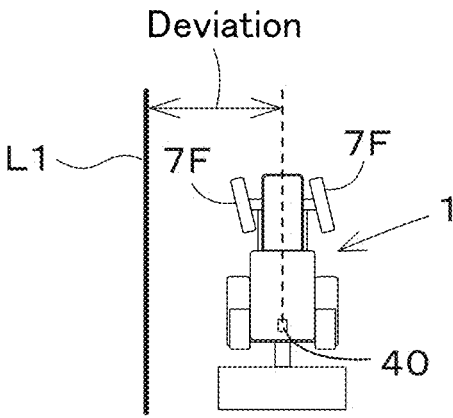
FIG. 17C is a view for explaining automatic driving of the agricultural machine.
Figure 17D:
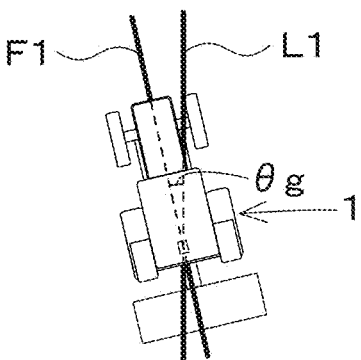
FIG. 17D is a view for explaining automatic driving of the agricultural machine.

Although the steering angle of the steering 29 is changed on the basis of the deviation between the position of the traveling body 3 and the traveling route L1 in the above example, the steering angle of the steering 29 may be changed on the basis of an angle θg of a traveling direction F1 of the traveling body 3 with respect to the traveling route L1 illustrated in FIG. 17D in another example. In this case, for example, the automatic controller 61 calculates the traveling direction F1 of the traveling body 3 from a change of the position of the traveling body 3 and further calculates the angle θg of the traveling direction F1 with respect to the traveling route L1. Then, in a case where the angle θg is equal to or larger than the threshold value, the automatic controller 61 rotates the steering shaft 31 so that the traveling direction F1 of the traveling body 3 matches a direction of the traveling route L1 (that is, θg becomes "0°").

In another example, the automatic controller 61 may calculate a first steering angle on the basis of the deviation between the position of the traveling body 3 and the traveling route L1 and calculate a second steering angle on the basis of the traveling route L1 and the traveling direction F1 of the traveling body 3. Then, the automatic controller 61 may calculate a third steering angle on the basis of the first steering angle and the second steering angle and rotate the steering shaft 31 on the basis of the third steering angle.

Furthermore, the automatic controller 61 calculates an actual vehicle speed of the traveling body 3 on the basis of a change of the position of the traveling body 3 while the traveling body 3 is automatically traveling on the basis of the traveling route L1. The automatic controller 61 controls driving of the transmission 5, the brake 6, and the prime mover 4 so that the actual vehicle speed matches a vehicle speed associated with the straight traveling route L1*a*, the turning route L1*b*, or the circling route L1*c*.

As described above, in the automatic traveling work mode of the agricultural machine 1, the automatic controller 61 automatically steers the traveling body 3 while automatically changing the traveling speed of the traveling body 3 on the basis of the traveling route L1 and the position of the traveling body 3 (the agricultural machine 1). Furthermore, the automatic controller 61 automatically performs and stops the agricultural work (ground work) of the working device 2.

When the user selects the work track key B15, the controller 51 calculates an actual work track where the working device 2 has performed ground work on the basis of the position of the traveling body 3 detected by the positioning device 40 and the work width of the working device 2. Then, as illustrated in FIG. 16, the controller 51 causes the actual work track (the hatched portion) to be displayed on the straight traveling route (work route) L1*a* of the agricultural field map MP2. When the user selects the track clear key B16, the controller 51 hides the actual work track.

The automatic controller 61 of the agricultural machine 1 causes the working device 2 to perform ground work while allowing the traveling body 3 to automatically travel on the basis of the traveling route L1 and the position of the traveling body 3, and thus the working device 2 arrives at the goal position Pg. At this time, the automatic controller 61 stops the automatic traveling work mode, and stops the traveling body 3 and the working device 2. As a result, the agricultural work of the agricultural machine 1 and the working device 2 based on the traveling route L1 in the automatic traveling work mode is completed.

Modes executable in the agricultural machine 1 include the automatic steering work mode in addition to the automatic traveling work mode, as described above. In the automatic traveling work mode and the automatic steering work mode, ground work is automatically performed by the working device 2 as appropriate. Work modes executable in the agricultural machine 1 include a manual driving work mode in addition to the automatic traveling work mode and the automatic steering work mode. In the manual driving work mode, the user of the agricultural machine 1 changes the traveling speed of the traveling body 3 by operating the accelerator or the brake of the operating device 62 and steers the traveling body 3 by operating the steering wheel 30. In the manual driving work mode, execution and stoppage of ground work performed by the working device 2 may be operated by the user by using the operating device 62 or may be controlled by the automatic controller 61 on the basis of the position of the traveling body 3 and the traveling route L1. In addition to the above modes, for example, an automatic traveling mode in which the traveling body 3 automatically travels and an automatic steering mode in which the traveling body 3 is automatically steered although ground work is not automatically performed by the working device 2 are executable in the agricultural machine 1.

For example, in a case where the user selects the automatic steering key B2*b* on the home screen D1 illustrated in FIG. 3, screens similar to the screens D3 to D8, which are displayed in a case where the automatic driving key B2*a* is selected, are sequentially displayed on the display operator 52. On these screens, the user can perform various settings to execute the automatic steering work mode in a similar manner to various settings to execute the automatic driving work mode. Specifically, the controller 51 causes various kinds of setting information to execute the automatic steering work mode to be stored in the internal memory in a similar manner to the various kinds of setting information to execute the automatic driving work mode. The route creator 51*c* creates a traveling route in the automatic steering work mode on the basis of various setting contents stored in the internal memory of the controller 51.

Then, the turning margin calculator 51*d* calculates a turning space and a turning margin for a turning route included in the traveling route, determines whether or not the turning margin is insufficient, and prohibits or permits output of the traveling route. In a case where output of the traveling route is prohibited, the notifier 51*g* causes a position where an insufficient turning margin is present, an insufficient amount of the turning margin, and a message indicating that the traveling route in the automatic steering work mode cannot be created due to the insufficiency to be displayed for notification on the display operator 52. In this case, a traveling route in the automatic steering work mode is not displayed on the display operator 52 nor transmitted to the agricultural machine 1, and the automatic steering work mode is not executed in the agricultural machine 1.

On the other hand, in a case where output of the traveling route is permitted, the controller 51 causes route information including the traveling route to be displayed on the display operator 52, generates automatic steering data including the route information, and causes the communicator 54 to transmit (output) the automatic steering data to the agricultural machine 1. When the automatic steering data is received by the agricultural machine 1, the automatic controller 61 of the controller 60 shifts to the automatic steering work mode, and causes the working device 2 to perform ground work while automatically steering the traveling body 3 on the basis of the traveling route included in the automatic steering data and the position of the traveling body 3.

Although the safe spaces Va and Vb around the agricultural machine 1 are changed depending on whether the agricultural machine 1 is the manned agricultural machine 1A or the unmanned agricultural machine 1B in the above example embodiment, the safe space Vb including the third safety margin A3, which is a forward detection distance of the object detector 64*a*, for example, even in a case where the agricultural machine 1 is the manned agricultural machine 1A. Furthermore, a safe space may be set while omitting the second safety margin A2 or A2*b* that expands the entire length Y2 of the agricultural work apparatus 12 rearward. In a case where the agricultural machine 1 is the manned agricultural machine 1A, the threshold value Zt may be a value identical to that in a case where the agricultural machine 1 is the unmanned agricultural machine 1B or may be a value omitting the second safety margin A2 or A2*b*. In a case where the second safety margin A2 or A2*b* is omitted, the turning margin calculator 51*d* decides, as the threshold value Zt for the manned agricultural machine 1A, for example, a value obtained by adding the entire length Y2 of the agricultural work apparatus 12 and the fourth safety margin A4 (Zt=Y2+A4). The turning margin calculator 51*d* decides, as the threshold value Zt for the unmanned agricultural machine 1B, a value obtained by adding the entire length Y2 of the agricultural work apparatus 12, the third safety margin A3, and the fourth safety margin A4*b* (Zt=Y2+ A3+A4*b*).

Although the notifier 51*g* causes the portion Q1 where the turning margin Z1 or Z2 whose difference ΔZ from the threshold value Zt is maximum is present to be displayed for notification on the agricultural field map MP2 on the route creation 2 screen D7 in the above example embodiment, the notifier 51*g* may cause, for example, all portions where the turning margin Z1 or Z2 less than the threshold value Zt that has been determined as being insufficient by the turning margin calculator 51*d* is present to be displayed for notification on the agricultural field map MP2 of the route creation 2 screen D7.

Figure 10D:
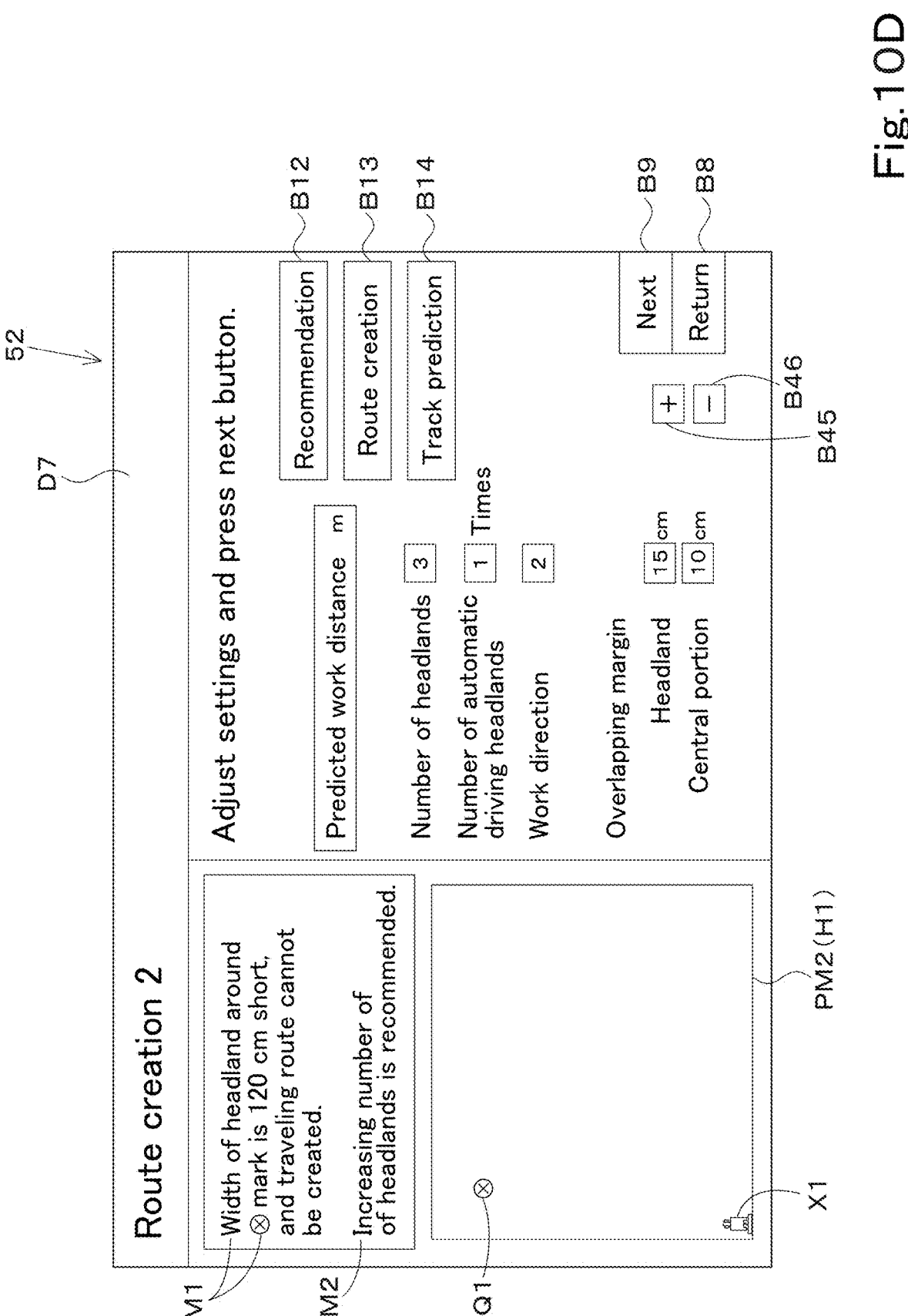
FIG. 10D illustrates another notification on the route creation 2 screen.

The notifier 51*g* may give a notification including a message M2 prompting change of a work condition to overcome insufficiency of the turning margin Z1 or Z2 by the display operator 52 in addition to the portion Q1 where the turning margin Z1 or Z2 determined as being insufficient by the turning margin calculator 51*d* is present and the message M1 indicative of an insufficient amount of the turning margin Z1 or Z2 and indicating that the traveling route L1 cannot be created, for example, as illustrated in FIG. 10D. In the example of FIG. 10D, increasing the number of headlands is recommended as the change of the work condition in the message M2. Alternatively, for example, a message M2 prompting an increase in the work width of the working device 2, a decrease in the headland lapping margin, or the like may be given by the display operator 52.

Although an example in which the agricultural field register 51*a*, the area setter 51*b*, the route creator 51*c*, the turning margin calculator 51*d*, and the notifier 51*g* are configured or programmed to be provided in the controller 51 of the agricultural work assistance device 50 has been illustrated in the above example embodiment, for example, at least one of the units 51*a*, 51*b*, 51*c*, 51*d*, and 51*g* may be configured or programmed to be provided in the controller 60 of the agricultural machine 1 or may be configured or programmed to be provided as a device separate from the controller 60.

In addition to the display operator 52, an input may be provided by a communication circuit or an input interface for input of registration information such as the agricultural field map MP2 (agricultural field), the agricultural machine 1, the working device 2, and the work condition to the agricultural work assistance device 50 from a server or a storage medium in which the registration information and the like are stored. In addition to the display operator 52 and the communicator 54 provided in the agricultural work assistance device 50, an input, a display, or an output may be provided by a communication circuit, an input interface, a display, a touch pad, a key, or an output interface mounted in the agricultural machine 1. The display operator 52 outputs information such as the traveling route L1 in a manner visible for a user by displaying the information and therefore may be regarded as an output.

The agricultural work assistance device 50 is not limited to a mobile tablet terminal device and may be, for example, a smartphone or a terminal device fixed to the agricultural machine 1. Alternatively, for example, the agricultural work assistance device may be an electronic device such as a PC that is not mounted in the agricultural machine 1 such as a server on a cloud. Instead of the agricultural work assistance device, an application program that can be acquired from a cloud and installed, for example, by a user's electronic device may be included in the agricultural work assistance system. In this case, the agricultural field register 51*a*, the area setter 51*b*, the route creator 51*c*, the turning margin calculator 51*d*, and the notifier 51*g* may be realized by the application program, and a notification given by a notifier may be displayed on a display included in an electronic device in which the application program has been installed or on a display connected to the electronic device. Alternatively, the notification given by the notifier may be output as sound from a speaker of the agricultural machine or the electronic device.

The agricultural work assistance system 100, the agricultural machine 1, and the agricultural work assistance device 50 of the example embodiments described above have the following configurations and produce the following effects.

The agricultural work assistance system 100 according to the present example embodiment includes the input (the display operator) 52 to input agricultural field information indicative of a contour H1 of an agricultural field, dimension information of the agricultural machine 1 or the working device 2 coupled to the agricultural machine 1, and a work condition for performing agricultural work on the agricultural field by the agricultural machine 1 and the working device 2, the route creator 51*c* to create a traveling route L1 along which the agricultural machine 1 travels within a map (agricultural field map) MP2 indicative of the agricultural field on the basis of the agricultural field information, the dimension information of the working device 2, and the work condition and secure a turning space G1, G2 where the agricultural machine 1 turns, the turning margin calculator 51*d* to calculate a turning margin Z1, Z2, which is a size of the turning space G1, G2, and determine that the turning margin Z1, Z2 is insufficient in a case where the turning margin Z1, Z2 is less than a predetermined threshold value Zt, and the notifier 51*g* to provide a notification concerning a portion Q1 where the turning margin Z1, Z2 determined as being insufficient by the turning margin calculator 51*d* is present.

The agricultural machine 1 according to the present example embodiment is an agricultural machine that performs agricultural work while being assisted by the agricultural work assistance system 100, and includes the traveling body 3 that is capable of traveling, the coupler 8g, 8h that is capable of coupling the working device 2 to the traveling body 3, the input 52 to input agricultural field information indicative of a contour H1 of an agricultural field, dimension information of the agricultural machine 1 or the working device 2 coupled to the traveling body 3, and a work condition to perform agricultural work on the agricultural field by the working device 2 while the traveling body 3 is traveling, the route creator 51c to create a traveling route L1 along which the traveling body 3 travels within a map MP2 indicative of the agricultural field on the basis of the agricultural field information, the dimension information, and the work condition and secure a turning space G1, G2 where the traveling body 3 turns, the turning margin calculator 51d, and the notifier 51g.

The agricultural work assistance device 50 according to the present example embodiment is an agricultural work assistance device included in the agricultural work assistance system 100, and includes the input 52, the route creator 51c, the turning margin calculator 51d, and the notifier 51g.

According to the above configuration, in a case where the turning margin Z1, Z2 of the turning space G1, G2 for the agricultural machine 1 or the like secured in the map MP2 is insufficient when the traveling route L1 for the agricultural machine 1 is created, a notification concerning the portion Q1 where the turning margin Z1, Z2 is present is given. Upon receipt of the notification concerning the portion Q1 where the insufficient turning margin Z1, Z2 is present, a user can easily take a measure such as changing the agricultural field information, the work condition, or the dimension information of the agricultural machine 1 and the working device 2 in order to overcome the insufficiency. It is therefore possible to improve convenience in creation of the traveling route L1 for the agricultural machine 1.

In the present example embodiment, the turning margin calculator 51d makes the traveling route L1 ineffective in a case where the turning margin Z1, Z2 is less than the threshold value Zt; and the notifier 51g provides a notification that the traveling route L1 has not been created due to insufficiency of a width of the portion Q1 where the turning margin Z1, Z2 determined as being insufficient by the turning margin calculator 51d is present. Since the traveling route L1 is made ineffective in a case where the turning margin Z1, Z2 is insufficient, the agricultural machine 1 does not travel on the basis of the traveling route L1, and it is possible to prevent a situation where the agricultural machine 1 cannot normally turn in the portion Q1 where the insufficient turning margin Z1, Z2 is present. Furthermore, the user can recognize from the notification given by the notifier 51g that the traveling route L1 has not been created due to insufficiency of the width of the portion Q1 on the map MP2, and the user can take an appropriate measure such as changing the work condition so as to widen the width of the portion Q1, and thereby the traveling route L1 can be created again.

In the present example embodiment, the agricultural work assistance system 100 includes the area setter 51b to set a first area (headland area) E1 within the map MP2 and a second area (central area) C1 located within the first area E1 on the basis of the dimension information of the working device 2 and the work condition, in which the route creator 51c creates, as the traveling route L1, a work route (straight traveling route) L1a, L1s along which work is performed by the working device 2 while the agricultural machine 1 is traveling in at least one of the first area E1 and the second area C1 and secures the turning space G1, G2 and creates a turning route L1b, L1r along which the agricultural machine 1 turns in the first area E1, and the notifier 51g provides a notification that a width of the first area E1 is insufficient in a case where it is determined by the turning margin calculator 51d that the turning margin Z1, Z2 is insufficient. This allows the user to take a measure such as changing the work condition so as to widen the width of the first area E1, and thereby the traveling route L1 can be created again by the route creator 51c.

In the present example embodiment, the agricultural work assistance system 100 includes the display (display operator) 52 to display the map MP2 and the traveling route L1, in which in a case where there is a turning margin Z1, Z2 determined as being insufficient by the turning margin calculator 51d, the notifier 51g causes the portion Q1 where the turning margin Z1, Z2 determined as being sufficient is present to be displayed without displaying the traveling route L1 on the map MP2 displayed on the display 52, and the display 52 displays the map MP2 and the traveling route L1 in a case where there is no turning margin Z1, Z2 determined as being insufficient by the turning margin calculator 51d. This allows the user to visually recognize the portion Q1 where the insufficient turning margin Z1, Z2 is present displayed on the map MP2 where agricultural work is performed and take an appropriate measure (action) for overcoming the insufficiency. Furthermore, since the traveling route L1 is displayed on the map MP2 in a case where there is no insufficient turning margin Z1, Z2, the user can visually recognize the traveling route L1 and cause the agricultural machine 1 to operate.

In the present example embodiment, the agricultural work assistance system 100 includes the output (communicator) 54 to output the traveling route L1, the position detector (positioning device) 40 to detect a position of the agricultural machine 1, and the automatic controller 61 configured or programmed to drive the working device 2 to perform the agricultural work on the agricultural field while automatically performing traveling or steering of the agricultural machine 1 on the basis of the position of the agricultural machine 1 detected by the position detector 40 and the traveling route L1 output from the output 54, in which the output 54 outputs the traveling route L1 to the automatic controller 61 in a case where there is no turning margin Z1, Z2 determined as being insufficient by the turning margin calculator 51d. With this configuration, the agricultural work can be normally performed on the agricultural field by the working device 2 while traveling or steering of the agricultural machine 1 is automatically performed by the automatic controller 61 on the basis of the traveling route L1 having no insufficient turning margin Z1, Z2. In a case where there is an insufficient turning margin Z1, Z2, traveling or steering of the agricultural machine 1 is not automatically performed on the basis of the traveling route L1 by the automatic controller 61, and it is possible to prevent a situation where the agricultural machine 1 cannot normally turn in the portion Q1 where the insufficient turning margin Z1, Z2 is present.

In the present example embodiment, in a case where there are a plurality of turning margins Z1, Z2 determined as being insufficient by the turning margin calculator 51d, the notifier 51g causes a portion Q1 where a turning margin Z1, Z2 whose difference ΔZ from the threshold value Zt is largest among the plurality of turning margins Z1, Z2 is present to be displayed together with the map MP2 on the display 52 and causes the largest difference ΔZ to be displayed as an insufficient amount on the display 52. This allows the user to visually recognize the portion Q1 where the turning margin Z1, Z2 that is largest in insufficient amount ΔZ is present and the insufficient amount ΔZ and take a measure such as changing the work condition, the dimension information, or the agricultural field information so that the insufficient amount ΔZ of the portion Q1 becomes 0, and thereby the traveling route L1 can be created again by the route creator 51*c*.

In the present example embodiment, to turn the agricultural machine 1 from a first route (straight traveling route) L1*a*, L1*s* included in the traveling route L1 toward a second route (straight traveling route) L1*a*, L1*s* whose traveling direction is different from the first route L1*a*, L1*s*, the turning margin calculator 51*d* calculates, as the turning margin Z1, Z2, a width Z1*a*, Z2*a* of the turning space G1, G2 that expands from a terminal end P1, P11 of the first route L1*a*, L1*s* to an end P10, P20 of the map MP2 that is present in a traveling direction of the first route L1*a*, L1*s* or a width Z1*b*, Z2*b* of the turning space G1, G2 that expands from a start end P2, P12 of the second route L1*a*, L1*s* to an end P10, P21 of the map MP2 that is present in an opposite direction to the traveling direction of the second route L1*a*, L1*s*. With this configuration, a result of determination as to whether or not the turning margin Z1, Z2 is insufficient can be regarded as a result of determination as to whether or the turning space G1, G2 is appropriate such as whether or not a size (the width Z1*a*, Z2*a*, Z1*b*, Z2*b*) of the turning space G1, G2 having the turning margin Z1, Z2 is sufficient for the agricultural machine 1 and the working device 2 to normally turn. This allows the user to take an appropriate measure such as changing the work condition so as to widen the portion Q1 where the insufficient turning margin Z1, Z2 is present, and thereby the traveling route L1 can be created again, and the turning space G1, G2 can be widened to the sufficient size.

In the present example embodiment, in a case where the agricultural machine 1 is a manned agricultural machine 1A that is operable by a driver on the agricultural machine 1, the turning margin calculator 51*d* calculates, as the threshold value Zt, a value obtained by adding an entire length Y2 of an agricultural work apparatus 12 including the agricultural machine 1 and the working device 2 coupled to the agricultural machine 1 and a predetermined safety margin A2, A2*b*, A4, A4*b* (the second safety margin A2, A2*b*, the fourth safety margin A4, A4*b*). With this configuration, in a case where the agricultural machine 1 is the manned agricultural machine 1A in which case the user on the agricultural machine 1 can view a situation before and behind the agricultural machine 1, the threshold value Zt is set to a value obtained by adding the entire length Y2 of the agricultural work apparatus 12 and the safety margin A4, A4*b*, A2, A2*b* added before and behind the agricultural work apparatus 12, and it can be determined whether or not the turning margin Z1, Z2 is insufficient relative to the threshold value Zt.

In the present example embodiment, in a case where the agricultural machine 1 is an unmanned agricultural machine 1B that is capable of automatically operating without person's operation, the turning margin calculator 51*d* calculates, as the turning margin Z1, Z2, a width Z1*a*, Z2*a* of the turning space G1, G2 that expands from a terminal end P1, P11 of the first route L1*a*, L1*s* to an end P10, P20 of the map MP2 that is present in a traveling direction of the first route L1*a*, L1*s* or a width Z1*b*, Z2*b* of the turning space G1, G2 that expands from a start end P2, P12 of the second route L1*a*, L1*s* to an end P10, P21 of the map MP2 that is present in an opposite direction to the traveling direction of the second route L1*a*, L1*s* and calculates, as the threshold value Zt, a value obtained by adding an entire length Y2 of an agricultural work apparatus 12 including the agricultural machine 1 and the working device 2 coupled to the agricultural machine 1, a detection distance (third safety margin) A3 in a traveling direction of the agricultural work apparatus 12 from a front end of the agricultural work apparatus 12 to a position in which an object is capable of being detected by an object detector 64*a* provided in the agricultural machine 1, and a predetermined safety margin A2, A2*b*, A4, A4*b* (the second safety margin A2, A2*b*, the fourth safety margin A4, A4*b*). With this configuration, in a case of the unmanned agricultural machine 1B, the threshold value Zt is set to a value obtained by adding the entire length Y2 of the agricultural work apparatus 12, the detection distance A3 of the object detector 64*a*, and the safety margin A4, A4*b*, A2, A2*b* added before and behind the agricultural work apparatus 12, and it can be determined whether or not the turning margin Z1, Z2 is insufficient relative to the threshold value Zt.

In the present example embodiment, in a case where the turning margin calculator 51*d* determines that the turning margin Z1, Z2 is insufficient, the notifier 51*g* provides a notification (message) M2 prompting change of the work condition. This allows the user to change the work condition in accordance with contents of the notification M2, and thereby the traveling route L1 can be created again by the route creator 51*c*. This can further improve convenience.

In the present example embodiment, the agricultural machine 1 includes the position detector (positioning device) 40 to detect a position of the traveling body 3, and the automatic controller 61 configured or programmed to drive the working device 2 to perform the agricultural work on the agricultural field while automatically performing traveling or steering of the traveling body 3 on the basis of the position of the traveling body 3 detected by the position detector 40 and the traveling route L1, and the display 52 to display the map MP2 and the traveling route L1, in which the notifier 51*g* causes a portion Q1 where the turning margin Z1, Z2 determined as being insufficient by the turning margin calculator 51*d* is present to be displayed on the map MP2 displayed on the display 52. This allows the user to visually recognize the portion Q1 where the insufficient turning margin Z1, Z2 is present displayed on the map MP2 where agricultural work is performed and take an appropriate measure for overcoming the insufficiency. When the traveling route L1 is displayed on the map MP2, the user can visually recognize the traveling route L1 and perform automatic traveling, automatic steering, or manual driving of the agricultural machine 1.

In the present example embodiment, the agricultural work assistance device 50 includes the display 52 to display the map MP2 and the traveling route L1, and the output 54 to output the traveling route L1 to the agricultural machine 1, in which the notifier 51*d* causes a portion Q1 where the turning margin Z1, Z2 determined as being insufficient by the turning margin calculator 51*d* is present to be displayed on the map MP2 displayed on the display 52, and the output 54 outputs the traveling route L1 to the automatic controller 61 in a case where there is no turning margin Z1, Z2 determined as being insufficient by the turning margin calculator 51*d*. This allows the user to visually recognize the portion Q1 where the insufficient turning margin Z1, Z2 is present displayed on the map MP2 where agricultural work is performed and take an appropriate measure for overcoming the insufficiency. Furthermore, the agricultural work can be normally performed on the agricultural field by the working device 2 while traveling or steering of the agricultural machine 1 is automatically performed by the automatic controller 61 on the basis of the traveling route L1 having no sufficient turning margin Z1, Z2. In a case where there is an insufficient turning margin Z1, Z2, traveling or steering of the agricultural machine 1 is not automatically performed on the basis of the traveling route L1 by the automatic controller 61, and it is possible to prevent a situation where the agricultural machine 1 cannot normally turn in the portion Q1 where the insufficient turning margin Z1, Z2 is present.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural work assistance system comprising:
an input to input agricultural field information indicative of a contour of an agricultural field, dimension information of an agricultural machine or a working device coupled to the agricultural machine, and a work condition for performing agricultural work on the agricultural field by the agricultural machine and the working device; and
a controller configured or programmed to include:
a route creator to create a traveling route along which the agricultural machine travels within a map indicative of the agricultural field on a basis of the agricultural field information, the dimension information, and the work condition and to secure a turning space where the agricultural machine turns;
a turning margin calculator to calculate a turning margin, which is a size of the turning space, and to determine that the turning margin is insufficient in a case where the turning margin is less than a predetermined threshold value; and
a notifier to provide a notification concerning a portion where the turning margin determined as being insufficient by the turning margin calculator is present, wherein
the turning margin calculator is configured or programmed to make the traveling route ineffective in a case where the turning margin is less than the threshold value; and
the notifier is configured or programmed to provide a notification that the traveling route has not been created due to insufficiency of a width of the portion where the turning margin determined as being insufficient by the turning margin calculator is present.

2. The agricultural work assistance system according to claim 1, wherein
the controller is configured or programmed to further include an area setter to set a first area within the map and a second area located within the first area on a basis of the dimension information and the work condition;
the route creator is configured or programmed to create, as the traveling route, a work route along which work is performed by the working device while the agricultural machine is traveling in at least one of the first area and the second area, and secure the turning space and create a turning route along which the agricultural machine turns in the first area; and
the notifier is configured or programmed to provide a notification that a width of the first area is insufficient in a case where it is determined by the turning margin calculator that the turning margin is insufficient.

3. The agricultural work assistance system according to claim 1, further comprising a display to display the map and the traveling route, wherein
in a case where there are a plurality of turning margins determined as being insufficient by the turning margin calculator, the notifier is configured or programmed to cause a portion where a turning margin whose difference from the threshold value is largest among the plurality of turning margins is present to be displayed together with the map on the display and cause the largest difference to be displayed as an insufficient amount on the display.

4. The agricultural work assistance system according to claim 1, wherein;
to turn the agricultural machine from a first route included in the traveling route toward a second route whose traveling direction is different from the first route, the turning margin calculator is configured or programmed to calculate, as the turning margin, a width of the turning space that expands from a terminal end of the first route to an end of the map that is present in a traveling direction of the first route or a width of the turning space that expands from a start end of the second route to an end of the map that is present in an opposite direction to the traveling direction of the second route, and
in a case where the agricultural machine is a manned agricultural machine that is operable by a driver on the agricultural machine, the turning margin calculator is configured or programmed to calculate, as the threshold value, a value obtained by adding an entire length of an agricultural work apparatus including the agricultural machine and the working device coupled to the agricultural machine and a predetermined safety margin.

5. The agricultural work assistance system according to claim 1, wherein:
to turn the agricultural machine from a first route included in the traveling route toward a second route whose traveling direction is different from the first route, the turning margin calculator is configured or programmed to calculate, as the turning margin, a width of the turning space that expands from a terminal end of the first route to an end of the map that is present in a traveling direction of the first route or a width of the turning space that expands from a start end of the second route to an end of the map that is present in an opposite direction to the traveling direction of the second route, and
in a case where the agricultural machine is an unmanned agricultural machine that is capable of automatically operating without person's operation, the turning margin calculator is configured or programmed to calculate, as the threshold value, a value obtained by adding an entire length of an agricultural work apparatus including the agricultural machine and the working device coupled to the agricultural machine, a detection distance over which an object detector provided in the agricultural machine is capable of detecting an object in the traveling direction from a front end with respect to a traveling direction of the agricultural work apparatus, and a predetermined safety margin.

6. The agricultural work assistance system according to claim 1, wherein in a case where the turning margin calculator determines that the turning margin is insufficient, the notifier is configured or programmed to provide a notification prompting change of the work condition.

7. An agricultural work assistance system further comprising:

an input to input agricultural field information indicative of a contour of an agricultural field, dimension information of an agricultural machine or a working device coupled to the agricultural machine, and a work condition for performing agricultural work on the agricultural field by the agricultural machine and the working device;

a controller configured or programmed to include:

a route creator to create a traveling route along which the agricultural machine travels within a map indicative of the agricultural field on a basis of the agricultural field information, the dimension information, and the work condition and to secure a turning space where the agricultural machine turns;

a turning margin calculator to calculate a turning margin, which is a size of the turning space, and to determine that the turning margin is insufficient in a case where the turning margin is less than a predetermined threshold value; and a notifier to provide a notification concerning a portion where the turning margin determined as being insufficient by the turning margin calculator is present; and a display to display the map and the traveling route; wherein in a case where there is a turning margin determined as being insufficient by the turning margin calculator, the notifier is configured or programmed to cause the portion where the turning margin determined as being sufficient is present to be displayed without displaying the traveling route on the map displayed on the display; and the display is operable to display the map and the traveling route in a case where there is no turning margin determined as being insufficient by the turning margin calculator.

8. The agricultural work assistance system according to claim 7, further comprising:

an output to output the traveling route;

a position detector to detect a position of the agricultural machine; and an automatic controller configured or programmed to drive the working device to perform the agricultural work on the agricultural field while automatically performing traveling or steering of the agricultural machine on a basis of the position of the agricultural machine detected by the position detector and the traveling route output from the output, wherein the output is operable to output the traveling route to the automatic controller in a case where there is no turning margin determined as being insufficient by the turning margin calculator.

9. An agricultural work assistance device to assist an agricultural machine in performing agricultural work while traveling, the agricultural machine including: a traveling body that is capable of traveling; a coupler that is capable of coupling a working device to the traveling body; a position detector to detect a position of the traveling body; and an automatic controller configured or programmed to drive the working device to perform the agricultural work on an agricultural field while automatically performing traveling or steering of the traveling body on a basis of the position of the traveling body detected by the position detector and a traveling route, the agricultural work assistance device comprising:

an input to input agricultural field information indicative of a contour of the agricultural field, dimension information of the agricultural machine or the working device coupled to the agricultural machine, and a work condition for performing the agricultural work on the agricultural field by the agricultural machine and the working device; and a controller configured or programmed to include:

a route creator to create the traveling route along which the agricultural machine travels within a map indicative of the agricultural field on a basis of the agricultural field information, the dimension information, and the work condition and secure a turning space where the agricultural machine turns;

a turning margin calculator to calculate a turning margin, which is a size of the turning space, and determine that the turning margin is insufficient in a case where the turning margin is less than a predetermined threshold value; and a notifier to provide a notification concerning a portion where the turning margin determined as being insufficient by the turning margin calculator is present;

a display to display the map and the traveling route; and an output to output the traveling route to the agricultural machine; wherein the notifier is configured or programmed to cause a portion where the turning margin determined as being insufficient by the turning margin calculator is present to be displayed on the map displayed on the display; and the output is operable to output the traveling route to the automatic controller in a case where there is no turning margin determined as being insufficient by the turning margin calculator.

* * * * *